US008187091B2

(12) United States Patent
Kido

(10) Patent No.: US 8,187,091 B2
(45) Date of Patent: May 29, 2012

(54) GAMING MACHINE THAT DISPLAYS INSTRUCTION IMAGE OF GAME INPUT OPERATION ON DISPLAY

(75) Inventor: Katsuhiro Kido, Koto-ku (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 340 days.

(21) Appl. No.: 12/551,085

(22) Filed: Aug. 31, 2009

(65) Prior Publication Data

US 2010/0062851 A1 Mar. 11, 2010

Related U.S. Application Data

(60) Provisional application No. 61/114,337, filed on Nov. 13, 2008, provisional application No. 61/095,804, filed on Sep. 10, 2008.

(51) Int. Cl.
*A63F 13/00* (2006.01)

(52) U.S. Cl. ................ 463/31; 463/25; 463/29; 463/44; 463/45; 463/46

(58) Field of Classification Search .................... 463/25, 463/29, 31, 44, 45, 46
See application file for complete search history.

(56) References Cited

U.S. PATENT DOCUMENTS

| | | | | |
|---|---|---|---|---|
| 5,413,351 | A | 5/1995 | Franklin | |
| 5,434,572 | A | 7/1995 | Smith | |
| 5,779,546 | A * | 7/1998 | Meissner et al. | 463/25 |
| 5,788,574 | A * | 8/1998 | Ornstein et al. | 463/25 |
| 5,934,998 | A * | 8/1999 | Forte et al. | 463/12 |
| 6,659,866 | B2 * | 12/2003 | Frost et al. | 463/17 |
| 6,755,741 | B1 * | 6/2004 | Rafaeli | 463/25 |
| 2002/0111205 | A1 * | 8/2002 | Beavers | 463/12 |
| 2003/0003997 | A1 * | 1/2003 | Vuong et al. | 463/42 |
| 2003/0232651 | A1 * | 12/2003 | Huard et al. | 463/42 |
| 2004/0256804 | A1 * | 12/2004 | Huard et al. | 273/292 |
| 2006/0003828 | A1 * | 1/2006 | Abecassis | 463/16 |
| 2006/0287068 | A1 * | 12/2006 | Walker et al. | 463/25 |
| 2007/0026947 | A1 | 2/2007 | Chun | |
| 2007/0087843 | A1 * | 4/2007 | Steil et al. | 463/47 |
| 2008/0064467 | A1 * | 3/2008 | Reiner | 463/16 |
| 2008/0113767 | A1 * | 5/2008 | Nguyen et al. | 463/25 |
| 2009/0075724 | A1 * | 3/2009 | Breeding et al. | 463/25 |
| 2009/0124323 | A1 * | 5/2009 | Dunn et al. | 463/17 |
| 2009/0186688 | A1 * | 7/2009 | Mourad | 463/22 |
| 2010/0019447 | A1 * | 1/2010 | Wollner | 273/142 R |

FOREIGN PATENT DOCUMENTS

| | | |
|---|---|---|
| JP | 8-21875 | 1/1996 |
| WO | WO 2007/016776 A1 | 2/2007 |

* cited by examiner

*Primary Examiner* — Dmitry Suhol
*Assistant Examiner* — Jason Skaarup
(74) *Attorney, Agent, or Firm* — Lexyoume IP Group, PLLC.

(57) ABSTRACT

A gaming machine displays a bet start instructional image on a dealer used display, displays a bet end instructional image in response to a predetermined lapse of time after receiving a bet start instruction signal from a touch panel, and controls an oscillation motor to cause a playing board to oscillate after receiving a bet end instruction signal from the touch panel.

5 Claims, 35 Drawing Sheets

FIG. 17

INSTRUCTIONAL IMAGE DISPLAY DETERMINATION 1

| DEALER' S LEVEL | BET START INSTRUCTIONAL IMAGE | BET END INSTRUCTIONAL IMAGE | STARTING DICE ROLLING | ENDING DICE ROLLING | RESULT INPUT |
|---|---|---|---|---|---|
| HIGH LEVEL | × | × | × | × | ○ |
| INTERMEDIATE LEVEL | × | ○ | × | ○ | ○ |
| LOW LEVEL | ○ | ○ | ○ | ○ | ○ |

FIG. 18

BET EXISTENCE DETERMINATION TABLE

| | STATION NUMBER | | | | | | | | | |
|---|---|---|---|---|---|---|---|---|---|---|
| | 1 | 2 | 3 | 4 | 5 | 6 | 7 | 8 | 9 | 10 |
| BET | A | P | P | A | A | P | P | P | P | A |

FIG. 19

OSCILLATION MODE DATA TABLE

| OSCILLATION PATTERN | OSCILLATION MODE | | |
|---|---|---|---|
| PATTERN 1 | SMALL OSCILLATION 5 SEC. | LARGE OSCILLATION 5 SEC. | SUBTLE OSCILLATION 5 SEC. |
| PATTERN 2 | SMALL OSCILLATION 4 SEC. | LARGE OSCILLATION 5 SEC. | SUBTLE OSCILLATION 6 SEC. |
| PATTERN 3 | SMALL OSCILLATION 6 SEC. | LARGE OSCILLATION 4 SEC. | SUBTLE OSCILLATION 5 SEC. |
| PATTERN 4 | SMALL OSCILLATION 3 SEC. | LARGE OSCILLATION 8 SEC. | SUBTLE OSCILLATION 4 SEC. |
| ⋮ | ⋮ | ⋮ | ⋮ |

FIG. 20

RENDERED EFFECT TABLE

| OSCILLATION MODE | TYPE OF SOUND |
|---|---|
| SMALL OSCILLATION | SOUND 1 |
| LARGE OSCILLATION | SOUND 2 |
| SUBTLE OSCILLATION | SOUND 3 |

FIG. 21

IC TAG DATA TABLE

| IDENTIFICATION DATA 1 | | IDENTIFICATION DATA 2 | | IDENTIFICATION DATA 3 | |
|---|---|---|---|---|---|
| CLASSIFICATION | NUMBER OF DOTS | CLASSIFICATION | NUMBER OF DOTS | CLASSIFICATION | NUMBER OF DOTS |
| RED | 6 | WHITE | 3 | BLACK | 5 |

FIG. 22

INFRARED CAMERA CAPTURING DATA TABLE

| X | Y | 181 | 182 | 183 | 184 | 185 | 186 | 187 |
|---|---|---|---|---|---|---|---|---|
| −50 | 55 | O | O | × | O | × | O | O |

FIG. 23

DOT PATTERN DATA CLASSIFICATION TABLE

| DOT | EXISTENCE OF INFRARED ABSORPTION INK | | | | | | | |
|---|---|---|---|---|---|---|---|---|
| 181 | × | ○ | × | × | ○ | ○ | × | ○ |
| 182 | × | × | ○ | × | ○ | × | ○ | ○ |
| 183 | × | × | × | ○ | × | ○ | ○ | ○ |
| COLOR | – | – | – | – | RED | WHITE | BLACK | – |

FIG. 24

NUMBER OF DOTS-DOT PATTERN DATA TABLE

| DOT | EXISTENCE OF INFRARED ABSORPTION INK | | | | | | | | | | | | | | | |
|---|---|---|---|---|---|---|---|---|---|---|---|---|---|---|---|---|
| 184 | × | ○ | × | × | × | ○ | ○ | ○ | × | × | × | ○ | ○ | ○ | × | ○ |
| 185 | × | × | ○ | × | × | ○ | × | × | ○ | ○ | × | ○ | ○ | × | ○ | ○ |
| 186 | × | × | × | ○ | × | × | ○ | × | ○ | × | ○ | ○ | × | ○ | ○ | ○ |
| 187 | × | × | × | × | ○ | × | × | ○ | × | ○ | ○ | × | ○ | ○ | ○ | ○ |
| NUMBER OF DOTS | – | – | – | – | – | – | – | 1 | 2 | – | – | 3 | 4 | 5 | 6 | – |

GAMING MACHINE THAT DISPLAYS INSTRUCTION IMAGE OF GAME INPUT OPERATION ON DISPLAY

CROSS REFERENCE TO RELATED APPLICATIONS

This application claims benefit of U.S. Provisional Application No. 61/095,804, filed Sep. 10, 2008, and No. 61/114,337, filed Nov. 13, 2008, the entire contents of which are incorporated herein by reference.

BACKGROUND OF THE INVENTION

1. Field of the Invention

The present invention relates to a gaming machine that displays an instructional image of a game input operation on a display.

2. Related Art

Conventionally, various table games are well known and, for example, among table games, there exists a game genre of so-called dice games, as disclosed in WO 07/016776, U.S. Patent Application Publication No. 2007/0026947, and U.S. Pat. No. 5,413,351.

Among dice games, for example, as disclosed in U.S. Pat. No. 5,413,351, a game method is disclosed in which, upon a player placing a bet, a dealer throws dice and, in a case where a result thereof becomes a predetermined combination, the player is entitled to throw the dice, and has a chance to win a payout of a large amount. In addition, Sic Bo is known as an old and familiar dice game in Asia in which a player places a bet on predicted numbers of dots appearing on three thrown dice.

Sic Bo is well known as a dice game of ancient China, and is a dice game in which a player places a bet on predicted numbers of dots or a combination thereof appearing on three thrown dice. Ways of betting and odds are displayed on a player's table (these may be displayed using an image display unit). On the table are provided an area for placing a bet on a predicted number of dots appearing on a single die, an area for placing a bet on the same predicted number of dots appearing on two dice, an area for placing a bet on the same predicted number of dots appearing on three dice, an area for placing a bet on a predicted combination appearing on two dice, an area for placing a bet on a predicted total number of dots appearing on three dice, and the like. Odds cannot be uniformly determined due to regional or national conditions; however, these are typically set within a range from 1:1 to approximately 1:180 according to occurrence probabilities.

In a dice game in a casino facility, it is necessary for a dealer to be skillful in game progression in order for the dealer to advance a game. However, in a country in which the casino industry does not have a long history, there has been a problem in that there is a shortage of dealers skillful in game progression.

It is an object of the present invention to provide a gaming machine in which it is possible for a game to be advanced, even if the dealer is inexperienced, by displaying an instructional image of a game input operation on a display.

SUMMARY OF THE INVENTION

According to a first aspect of the present invention, a gaming machine is provided which includes: a plurality of stations; a controller that controls advancement of a game; and an input device that accepts a game input operation from a dealer and transmits a signal, which corresponds to the game input operation thus accepted, to the controller, in which the controller performs control to advance a game based on a game input operation signal accepted from the input device.

According to a second aspect of the present invention, a gaming machine is provided which includes: a playing unit on which a plurality of dice rolls and comes to rest; an oscillation device that causes the playing unit to oscillate; a plurality of stations; a display that is disposed so as to be visually recognizable to a dealer, disposed to be visually unrecognizable to all players among a plurality of players playing a game at the plurality of stations, and displays an instructional image of a game input operation to a dealer; an input device that accepts a game input operation from the dealer and outputs a signal corresponding to the game input operation thus accepted; and a controller that executes the following processing of: (a) displaying on the display an instructional image of an input operation to start accepting a bet from the plurality of stations on the display; (b) displaying on the display an instructional image of an input operation to end accepting a bet from the plurality of stations on the display, in response to a predetermined lapse of time after receiving a signal that indicates accepting an input operation to start accepting a bet; and (c) after receiving a signal that indicates accepting an input operation to terminate accepting a bet, controls an oscillation device to cause the playing board to oscillate.

According to the second aspect of the present invention, the controller displays on the display the instructional image of the input operation to start and end accepting a bet. Thus, even an inexperienced dealer can perform operations of starting and ending the acceptance of bets according to the instructional images.

Furthermore, since the controller controls the oscillation device to cause the playing unit to oscillate after receiving a signal that indicates accepting the operation to end accepting bets, oscillation of the playing unit can be automated.

In addition, since the display is disposed to be visually recognizable to a dealer and to be visually unrecognizable to all players among a plurality of players playing a game at the plurality of stations, only a dealer can visually recognize the display and a player cannot visually recognize the same.

According to a third aspect of the present invention, a gaming system includes: a plurality of stations; a composite unit that transmits and receives, with the plurality of stations, information relating to a game, and performs advancement of the game; and an operation unit in which a dealer can input a game operation, in which the composite unit includes a controller that controls the advancement of the game; in which the operation unit is detachable from the composite unit, and includes: a lid; a switch that detects whether the lid is opened; and an input device that accepts a game operation input from a dealer and transmits a signal corresponding to the game operation input thus accepted to the controller, and in which, for a case in which the operation unit is mounted to the composite unit, when the controller receives a signal indicating that the switch has detected that the lid is opened from the switch, the controller performs control to advance the game based on a game operation input signal received from the input device, and when the controller receives a signal indicating that the switch has detected that the lid is closed from the switch, the controller performs control to advance the game independently from the game operation input from a dealer.

According to the third aspect of the present invention, when the controller has received a signal indicating that the switch detected that the lid is opened from the switch, the controller advances the game based on a game operation input signal received from the input device. Therefore, in a case in which the lid provided to the operation unit is opened, a game can be advanced based on the game operation input from the dealer (in the semiautomatic mode).

On the other hand, when the controller has received a signal indicating that the switch detected that the lid is closed from the switch, the controller advances the game independently from the game operation input from a dealer. Therefore, in a case in which the lid provided to the operation unit is closed, a game can be advanced automatically (in the automatic mode).

Thus, a gaming system can be provided that can readily perform switching between performing game advancement in automatic and semiautomatic modes based on the opening and closing of a lid part.

In addition, since the operation unit can be detached from the composite unit, by mounting the operation unit to the composite unit, a gaming system can be provided that can perform switching between automatic and semiautomatic modes.

A fourth aspect of the present invention is the gaming system according to the third aspect, in which when the controller has received a signal indicating that the switch detected that the lid is opened from the switch, in a case where a unit game subsequent to a unit game executing at a reception time is started, the controller performs control to advance a game based on the game operation input signal received from the input device.

According to the fourth aspect of the present invention, a timing of switching between performing game advancement in automatic mode and semiautomatic mode can be set after a subsequent unit game is started. Therefore, even if a lid part is opened while a unit game is being executed, switching to the semiautomatic mode while a unit game is being executed can be prevented.

A fifth aspect of the present invention is the gaming system according to the fourth aspect, in which the controller further includes an instructional device that indicates a game operation input to a dealer, and in which, in a case a game being advanced based on the game operation input signal received from the input device, the controller transmits to the instructional device a signal for indicating the game operation input to the dealer.

According to the fifth aspect of the present invention, in a case in which an advancement of a game is performed in the semiautomatic mode, the controller transmits to the instructional device a signal for indicating a game operation input to a dealer. Thus, in response to the instructional device having received the signal, for example, by performing processing such as changing light emitting conditions of the instructional device, it is possible to report to the dealer that advancement of the game is being performed in the semiautomatic mode.

A sixth aspect of the present invention is the gaming system according to the third aspect, in which: the composite unit further includes an image output device that outputs live image data of a game; the operation unit further includes a microphone terminal that accepts audio data that has been converted to data from sounds spoken by a dealer, and transmits the audio data thus accepted to the image output device; the image output device outputs the live image data as well as the audio data received from the microphone terminal; and the controller transmits the audio data and the live image data thus received, or the live image data thus received, to the plurality of stations.

According to the sixth aspect of the present invention, the controller transmits the audio data of sounds spoken by the dealer and the live image data of the game or the live image data of the game thus received to the plurality of stations. Thus, in a case in which the audio data is transmitted, the player can enjoy the live image of the game and the live coverage by the dealer simultaneously at the station. Moreover, even when audio data is not transmitted, since the player can watch the live image at the station, even in a case in which conditions of a game (for example, conditions of dice rolling) cannot be visually recognized depending on an arrangement of the stations, the player can enjoy a realistic sensation of a game.

A seventh aspect of the present invention is the gaming system according to the sixth aspect, in which, in a case of a game being advanced based on the game operation input signal received from the input device, the controller transmits the audio data and the live image data thus received to the plurality of the stations, and in a case of a game being advanced independently from a game operation input from a dealer, the controller transmits the live image data received to the plurality of stations.

According to the seventh aspect of the present invention, in a case in which a game is advanced in the semiautomatic mode, the controller transmits the audio data of sounds spoken by the dealer and the live image data of the game to the plurality of stations. Thus, since live coverage by a dealer is performed only in the semiautomatic mode, a player can have an actual feeling that a dealer is involved in game advancement.

According to an eighth aspect of the present invention, a gaming machine is provided which includes: a playing unit on which a plurality of dice rolls and comes to rest; an oscillation device that causes the playing unit to oscillate; a plurality of stations; a display that is disposed so as to be visually recognizable to a dealer and to be visually unrecognizable to all players among a plurality of players playing a game at the plurality of stations, and displays an instructional image of a game input operation to a dealer; an input device that accepts a game input operation from the dealer and outputs a signal corresponding to the game input operation thus accepted; memory that stores, according to a dealer's level, data indicating which instructional image of a game input operation should be displayed among a plurality of instructional images of the game input operations from starting to ending a unit game; and a controller that executes the following processing of: (a) extracting, from the memory according to a dealer's level, data indicating which instructional image of a game input operation should be displayed; (b) determining whether to display on the display an instructional image of an input operation to start accepting a bet from the plurality of stations, based on the data thus extracted from the memory; (c) displaying on the display the instructional image of the input operation to start accepting a bet on the display, in a case of a determination to display in the processing (b); (d) determining whether to display on the display an instructional image of an input operation to end accepting a bet from the plurality of stations, based on the data thus extracted from the memory; (e) displaying on the display an instructional image of an input operation to end accepting a bet from the plurality of stations on the display, in response to a predetermined lapse of time after receiving a signal that indicates accepting an input operation to start accepting a bet, according to the processing (d); and (f) after receiving a signal that indicates accepting an input operation to end accepting a bet from the input device, controlling the oscillation device to cause the playing unit to oscillate.

According to the eighth aspect of the present invention, in addition to the effect of the first aspect, the gaming machine can change the type of instructional image of the game input operation displayed on the display, according to a dealer's level.

In a ninth aspect of the present invention, a gaming system includes: a plurality of stations in which players play a game; a controller that transmits and receives, with the plurality of stations, information relating to a game, and controls advancement of the game; and an operation unit in which a dealer can input a game operation, in which the operation unit includes: a lid; a switch that detects whether the lid is closed; and an input device that accepts a game operation input from a dealer and transmits a signal corresponding to the game operation input thus received to the controller, and in which, when the controller has received a signal indicating that the switch detected that the lid is closed from the switch, the controller switches from control that can advance a game based on the game operation input received from the input device, to control that can advance a game automatically.

According to the ninth aspect of the present invention, in a case of having received a signal indicating that the switch detected that the lid is closed from the switch, the controller switches from control that can advance a game based on the game operation input received from the input device to control that can advance a game automatically. Thus, in a case in which the lid included in the operation unit is closed, game advancement can be switched from the semiautomatic mode to the automatic mode.

A tenth aspect of the present invention is the gaming system according to the ninth aspect, in which, when the controller has received a signal indicating that the switch detected that the lid is opened from the switch, in a case where a unit game subsequent to a unit game executing at a reception time is started, the controller performs control to advance a game based on the game operation input signal received from the input device.

According to the tenth aspect of the present invention, a timing of switching between performing game advancement in automatic mode and semiautomatic mode can be set after a subsequent unit game is started. Thus, even if a lid part is opened while a unit game is executed, switching to the semiautomatic mode while a unit game is being executed can be prevented.

An eleventh aspect of the present invention is the gaming system according to the tenth aspect, in which the controller further includes an instructional device that indicates a game operation input to a dealer, and in which, in a case of a game being advanced based on the game operation input signal received from the input device, the controller transmits to the instructional device a signal for indicating the game operation input to the dealer.

According to the eleventh aspect of the present invention, in response to the instructional device having received the signal, for example, by performing processing such as changing light emitting conditions of the instructional device, it is possible to report to the dealer that advancement of the game is being in the semiautomatic mode.

A twelfth aspect of the present invention is the gaming system according to the ninth aspect, which further includes an image output device that outputs live image data of a game, in which: the operation unit further includes a microphone terminal that accepts audio data that has been converted to data from sounds spoken by a dealer, and transmits the audio data thus accepted to the image output device; the image output device outputs the live image data as well as the audio data received from the microphone terminal; and the controller transmits the audio data and the live image data thus received, or the live image data thus received, to the plurality of stations.

According to the twelfth aspect of the present invention, in a case in which the audio data is transmitted, the player can enjoy the live image of the game and the live coverage by the dealer simultaneously at the station. Moreover, even when the audio data is not transmitted, since the player can watch the live image at the station, even in a case in which conditions of a game (for example, conditions of dice rolling) cannot be visually recognized depending on an arrangement of the stations, the player can enjoy a realistic sensation of the game.

A thirteenth aspect of the present invention is the gaming system according to the twelfth aspect in which, in a case of a game being advanced based on the game operation input signal received from the input device, the controller transmits the audio data and the live image data thus received to the plurality of the stations, and in a case of a game being advanced automatically, the controller transmits the live image data thus received to the plurality of stations.

According to the thirteenth aspect of the present invention, since the live coverage by a dealer is performed only in the semiautomatic mode, a player can have an actual feeling that a dealer is involved in game advancement.

An fourteenth aspect of the present invention is the gaming machine according to the ninth aspect, which further includes a composite unit controlled by the controller, in which the operation unit can be detached from the composite unit.

According to the fourteenth aspect of the present invention, since the operation unit can be detached from the composite unit, by mounting the operation unit to the composite unit, a gaming system can be easily converted to be switchable between automatic and semiautomatic modes.

BRIEF DESCRIPTION OF THE DRAWINGS

FIG. 17 is a diagram showing an instructional image display determination table according to the embodiment of the present invention;

FIG. 18 is a diagram showing a bet existence determination table according to the embodiment of the present invention;

FIG. 19 is a diagram showing an oscillation mode data table according to the embodiment of the present invention;

FIG. 20 is a diagram showing a rendered effect table according to the embodiment of the present invention;

FIG. 21 is a diagram showing an IC tag data table according to the embodiment of the present invention;

FIG. 22 is an infrared camera capturing data table according to the embodiment of the present invention;

FIG. 23 is a dot pattern data classification table according to the embodiment of the present invention;

FIG. 24 is a number of dots-dot pattern data table according to the embodiment of the present invention;

FIGS. 14A to 16A are diagrams showing a display example of a bet time display area.

DETAILED DESCRIPTION OF THE INVENTION

Embodiments of the present invention will be described below with reference to the accompanying drawings.

Figure 1:
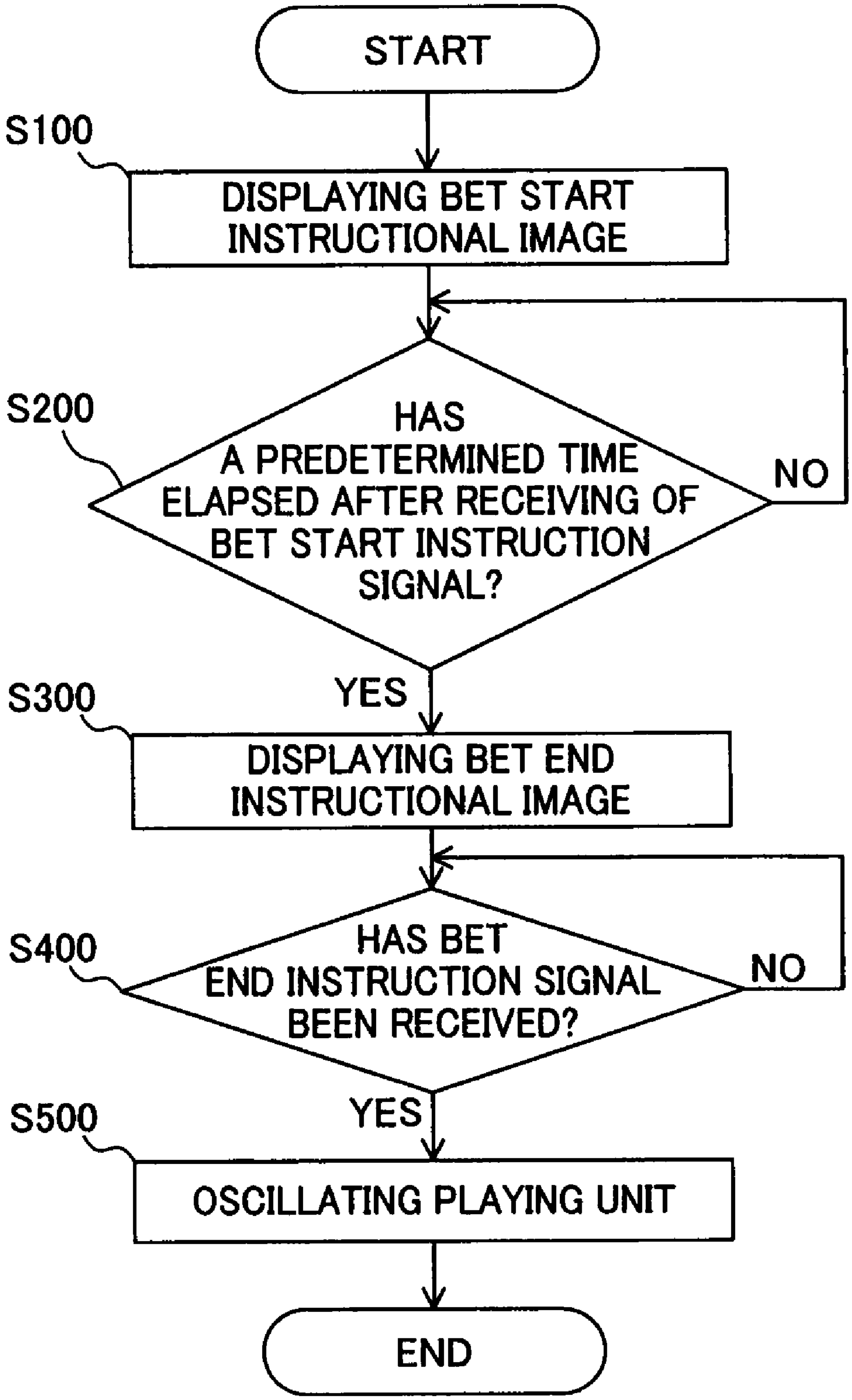
FIG. 1 is a flowchart schematically showing a processing sequence of a gaming machine according to an embodiment of the present invention.

Although described in detail later, as shown in FIG. 1, the CPU 81 displays on a dealer used display 210 an instructional image of an input operation (a bet start instructional image) in order to start accepting a bet from a plurality of stations 4 (Step S100), displays on the dealer used display 210 an instructional image of an input operation (a bet end instructional image) in order to end accepting a bet from the plurality of stations 4 (Step S300) in response to a predetermined lapse of time after receiving a signal (a bet start instruction signal) that indicates accepting an input operation in order to start accepting a bet (Step S200), and, after receiving a signal (a bet end instruction signal) that indicates a accepting an input operation in order to end accepting a bet (Step S400), controls an oscillation motor 300 to oscillate a playing board 3*a* (Step S500).

Figure 2:
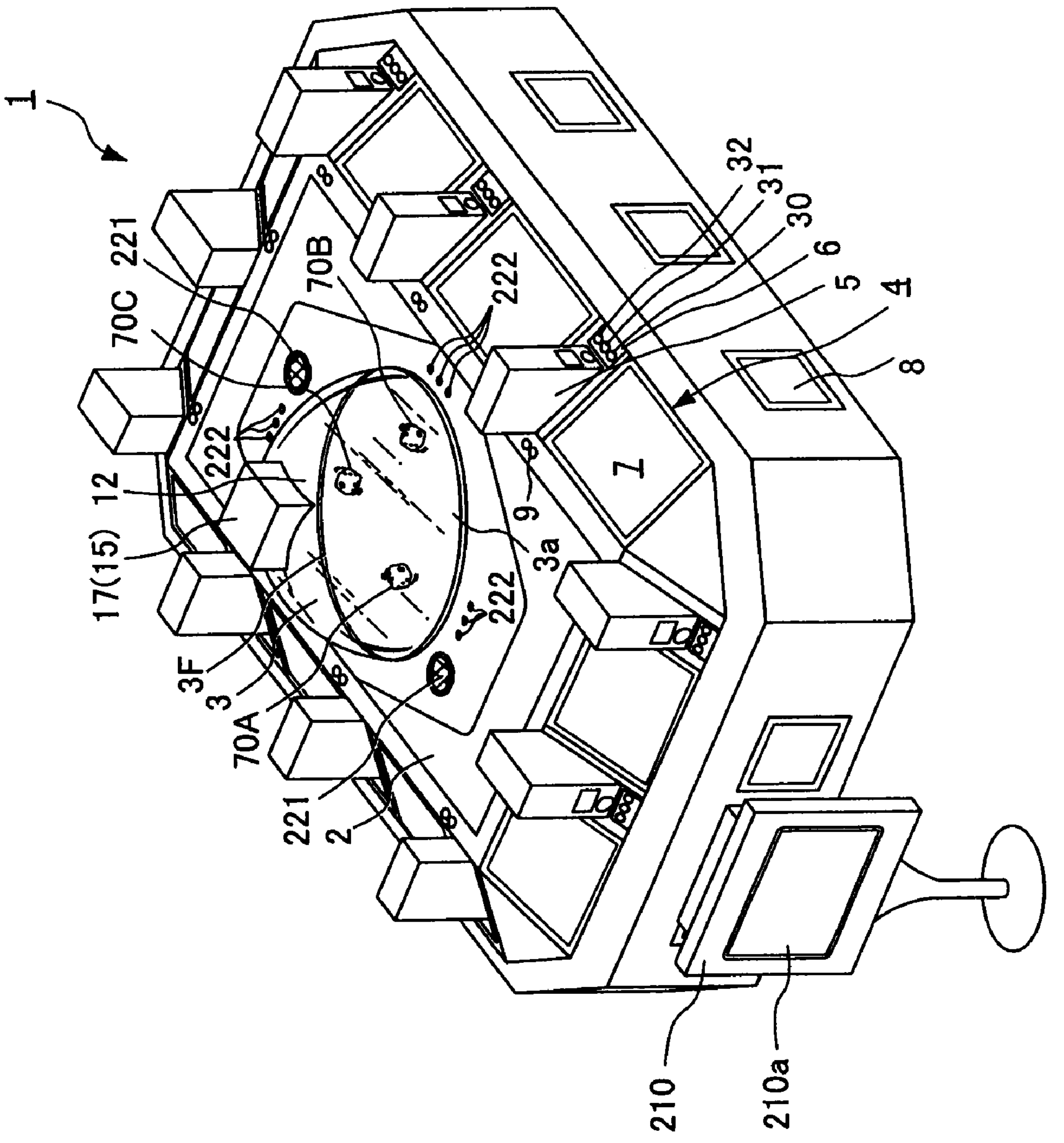
FIG. 2 is a perspective view of a gaming machine according to the embodiment of the present invention.
Figure 3:
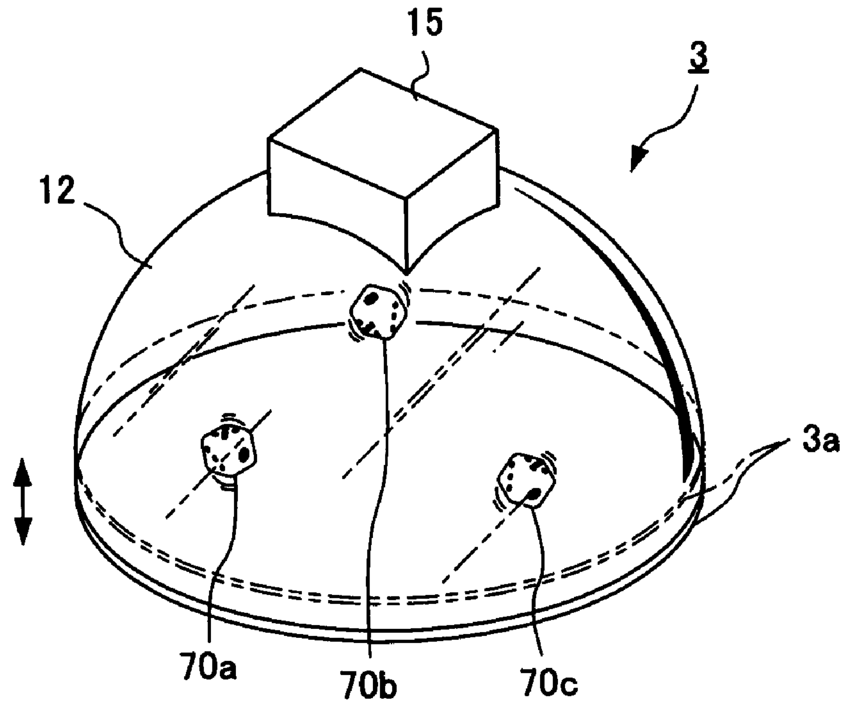
FIG. 3 is an enlarged view of a playing unit of the gaming machine shown in FIG. 2.

FIG. 2 is a perspective view schematically showing an example of a gaming machine according to the embodiment of this invention. FIG. 3 is an enlarged view of a playing unit of the gaming machine shown in FIG. 2. As shown in FIG. 2, a gaming machine 1 according to the present embodiment includes a housing 2 as a main body portion, a playing unit 3 that is provided substantially at the center of the top face of the housing 2 and in which a plurality of dice 70 are rolled and stopped, a plurality of stations 4 disposed so as to surround the playing unit 3, and a dealer used display 210 that is positioned so as not to be visually recognizable by a player seated at each station 4. The station 4 includes an image display unit 7. The player seated at each station 4 can participate in a game by predicting numbers of dots on the dice 70 and performing a normal bet input and a side bet input.

The gaming machine 1 includes a housing 2 as a main body portion, a playing unit 3 that is provided substantially at the center of the top face of the housing 2 and in which a plurality of dice 70 are rolled and stopped, and a plurality of stations 4 (ten in this embodiment) disposed so as to surround the playing unit 3.

The station 4 include a game media receiving device 5 into which game media such as medals to be used for playing the game are inserted, a control unit 6, which is configured with multiple control buttons by which a player enters predetermined instructions, and an image display unit 7, which displays images relating to a bet table. The player may participate in a game by operating the control unit 6 or the like while viewing the image displayed on the image display unit 7.

A payout opening 8, from which a player's game media are paid out, are provided on the sides of the housing 2 on which each station 4 is provided. In addition, a speaker 9, which can output sound, is disposed on the upper right of the image display unit 7 on each of the stations 4.

A control unit 6 is provided on the side part of the image display unit 7 on each of the stations 4. As viewed from a position facing the station 4, in order from the left side are provided a select button 30, a payout (cash-out) button 31, and a help button 32.

The select button 30 is a button that is pressed when confirming a bet operation after the bet operation is complete. Furthermore, in a case other than the bet operation, the button is pressed when a player confirms an input performed.

The payout button 31 is a button which is usually pressed at the end of a game, and when the payout button 31 is pressed, game media corresponding to credits that the player has acquired is paid out from the payout opening 8.

The help button 32 is a button that is pressed in a case where a method of operating the game is unclear, and upon the help button 32 being pressed, a help screen showing various kinds of operation information is displayed immediately thereafter on the image display unit 7.

The playing unit 3 is configured so as to allow a plurality of dice to roll and stop. The present embodiment is configured to use three dice 70 (dice 70*a*, 70*b*, and 70*c*) at the playing unit 3.

A speaker 221 and a lamp 222 are disposed around the playing unit 3. The speaker 221 performs rendered effects by outputting sounds while the dice 70 are being rolled. The lamp 222 performs rendered effects by emitting lights while the dice 70 are being rolled.

The playing unit 3 includes a playing board 3*a*, which is formed to be a circular shape, to roll and then stop the dice 70. An IC tag reader 16, which is described later in FIGS. 6 to 9, are provided below the playing board 3*a*.

Since the playing board 3*a* is formed to be substantially planar, as shown in FIG. 3, the dice 70 are rolled by oscillating the playing board 3*a* substantially in the vertical direction with respect to the horizontal direction of the playing board 3*a*. Then, the dice 70 are stopped after the oscillation of the playing board 3*a* ceases. The playing board 3*a* is oscillated by a CPU 81 (described later) driving an oscillating motor 300.

Furthermore, as shown in FIG. 3, the playing unit 3 is covered with a cover member 12 of which the entire upper area is made of a transparent acrylic material formed in a hemispherical shape, and regulates the rolling area of the dice 70. In the present embodiment, an infrared camera 15 is provided at the top of the cover member 12 to detect numbers of dots and the like (such as positions of the dice 70 on the playing board 3*a*, types of the dice 70, and numbers of dots of the dice 70) of the dice 70. Furthermore, the cover member 12 is covered with a special film (not shown) which blocks infrared radiation. In this way when the numbers of dots of the dice 70 on which an infrared absorption ink has been applied is detected with the infrared camera 15, false detection can be prevented that arises, for example, in a case where a blink rate of a light irradiated from a circumference of the playing unit 3 is fast.

Figure 4:
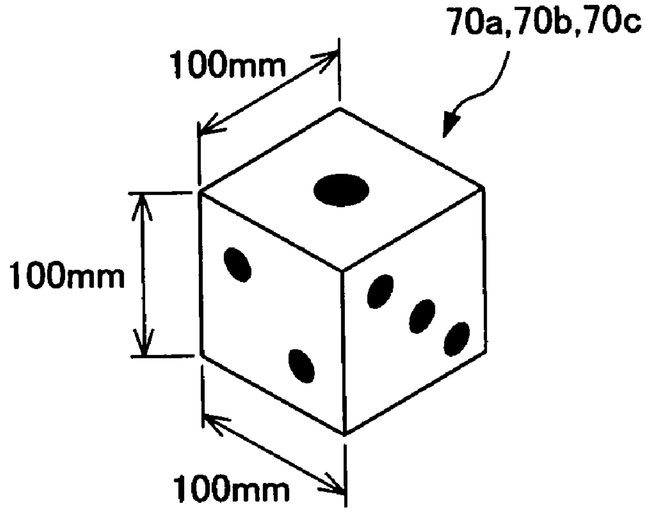
FIG. 4 is an external perspective view of a die according to the embodiment of the present invention.

FIG. 4 is an external perspective view of a die 70. As shown in FIG. 4, the die 70 is a cube of which the length of a side is 100 mm.

Figure 5A:
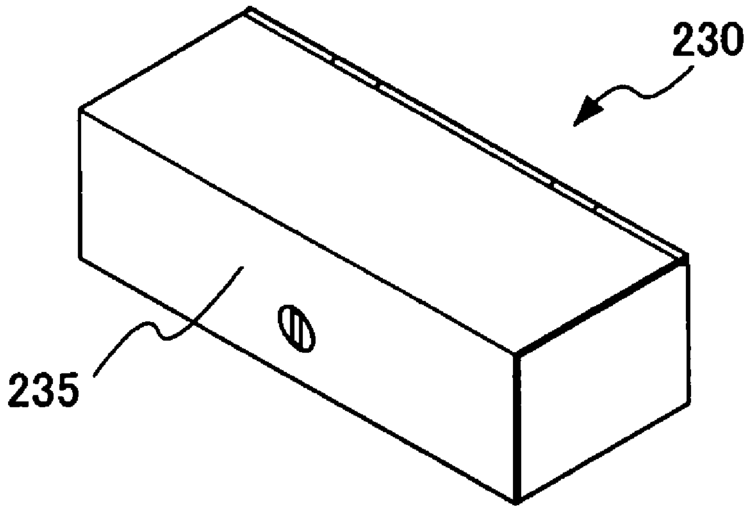
FIG. 5A is a perspective view of a dealer used console in which a lid is closed.
Figure 5:
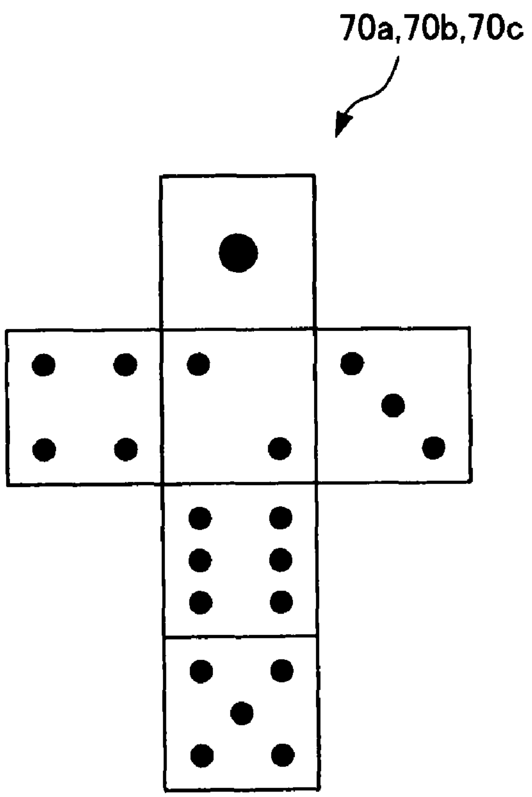
FIG. 5 is a development view of a die according to the embodiment of the present invention.

FIG. 5 is a development view of the die 70. As shown in FIG. 5, the combinations of two faces opposing each other are "1 and 6", "2 and 5", and "3 and 4".

FIGS. 6 to 9 show IC tag readable areas by an IC tag reader 16 disposed below the playing board 3*a*.

Here, a way of reading information stored in the IC tag by the IC tag reader 16 is described below.

The IC tag reader 16 is a non-contact type IC tag reader. For example, it is possible to read information stored in the IC tag by RFID (Radio Frequency Identification). The RFID system performs near field communication that reads and writes data stored in semi-conductor devices by an induction field or radio waves in a non-contact manner. In addition, since this technology is known conventionally and is described in Japanese Unexamined Patent Application Publication No. H8-21875, an explanation thereof is abbreviated.

In the present embodiment, a plurality of IC tags is read by a single IC tag reader 16. Under the abovementioned RFID system, an anti-collision function can be employed which can read a plurality of IC tags by a single reader. The anti-collision function includes FIFO (first in first out) type, multi-access type, and selective type, and communicates with a plurality of the IC tags sequentially. The FIFO type is a mode to communicate with a plurality of the IC tags sequentially in the order that each IC tag enters an area in which an antenna can communicate therewith. The multi-access type is a mode that is able to communicate with all the IC tags, even if there is a plurality of the IC tags simultaneously in the area in which an antenna can communicate with the IC tags. The selective type is a mode that is able to communicate with a specific IC tag among a plurality of the IC tags in the area in which an antenna can communicate therewith. By employing the abovementioned modes, it is possible to read a plurality of the IC tags with a single IC tag reader. In addition, reading the IC tags may not only be done by the non-contact type, but also a contact type. In addition, the IC tag reader is not limited thereto, and anything that is appropriately designed with the object of being read may be employed.

In the present embodiment, a readable area of the IC tag reader 16 is 10 mm in substantially a vertical direction from substantially an entire horizontal face on the playing board 3*a*.

Figure 6:
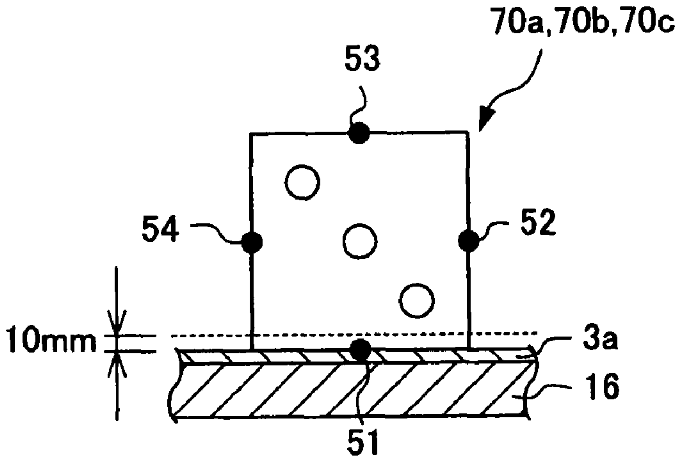
FIGS. 6 to 9 show IC tag readable areas by IC tag readers according to the embodiment of the present invention.

With reference to FIG. 6, a face of the die 70 (for example, a face of which the number of dots is six) is in contact with the playing board 3*a*. Furthermore, the IC tag is embedded substantially at the center of each face of the die 70 (the IC tags for the faces on which the numbers of dots are "3" and "4" are not shown). An IC tag 51 is embedded substantially at the center of a face on which the number of dots is six. An IC tag 52 is embedded substantially at the center of a face on which the number of dots is five. An IC tag 53 is embedded substantially at the center of a face on which the number of dots is one. An IC tag 54 is embedded substantially at the center of a face on which the number of dots is two.

Here, only the IC tag 51 exists in the readable area of the IC tag reader 16. Therefore, the number of dots (in this case, "one") of a face, opposing the face on which the IC tag 51 is embedded, is determined as the number of dots of the die 70.

Furthermore, since the number of dots of a face, opposing a face on which an IC tag is embedded, is determined as the number of dots of the die 70, "one" is stored, as data of the number of dots, in the IC tag 51 on the face of which the number of dots is "six". "Two" is stored, as data of the number of dots, in the IC tag 52 on the face of which the number of dots is "five". "Six" is stored, as data of the number of dots, in the IC tag 53 on the face of which the number of dots is "one". "Five" is stored, as data of the number of dots, in the IC tag 54 on the face of which the number of dots is "two". "Three" is stored, as data of the number of dots, in the IC tag (not shown) on the face of which the number of dots is "four". Finally, "four" is stored, as data of the number of dots, in the IC tag (not shown) on the face of which the number of dots is "three".

Furthermore, as described above, since a side of the die 70 is 10 mm, it is not physically possible for an IC tag reader 16 to detect more than one IC tag with respect to one die.

Figure 7:
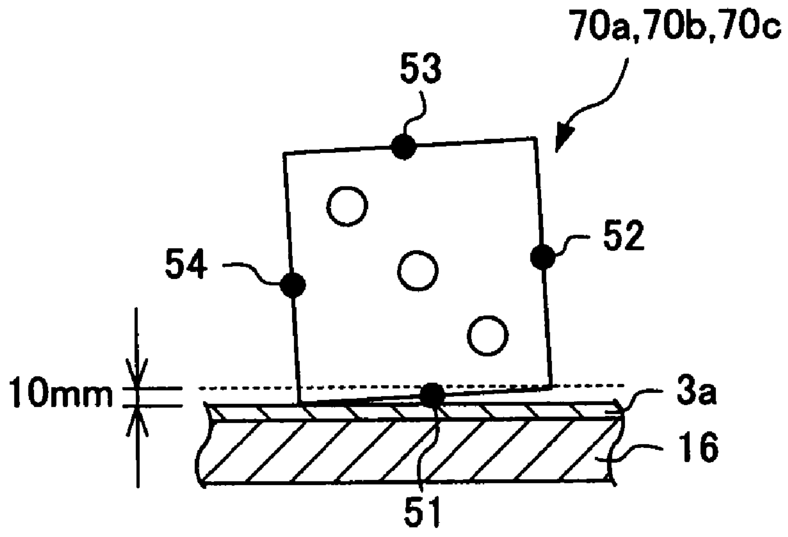

With reference to FIG. 7, a die 70 is inclined. However, since the IC tag 51 still exists in the readable area of the IC tag reader 16, the number of dots of the die 70 is determined as "one".

Figure 8:
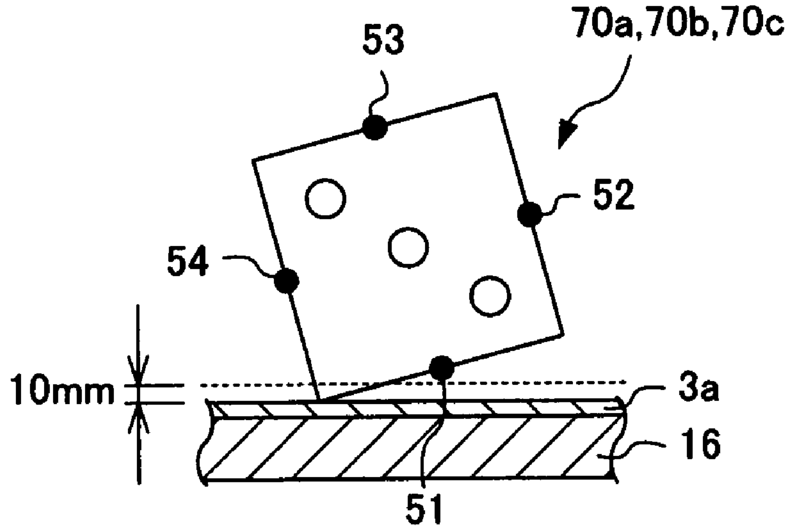

With respect to FIG. 8, the die 70 is inclined at a greater angle than the case shown in FIG. 7. Then, since there is no IC tag which exists in the readable area of the IC tag reader 16, the IC tag reader 16 cannot detect the number of dots of the die 70.

Figure 9A:
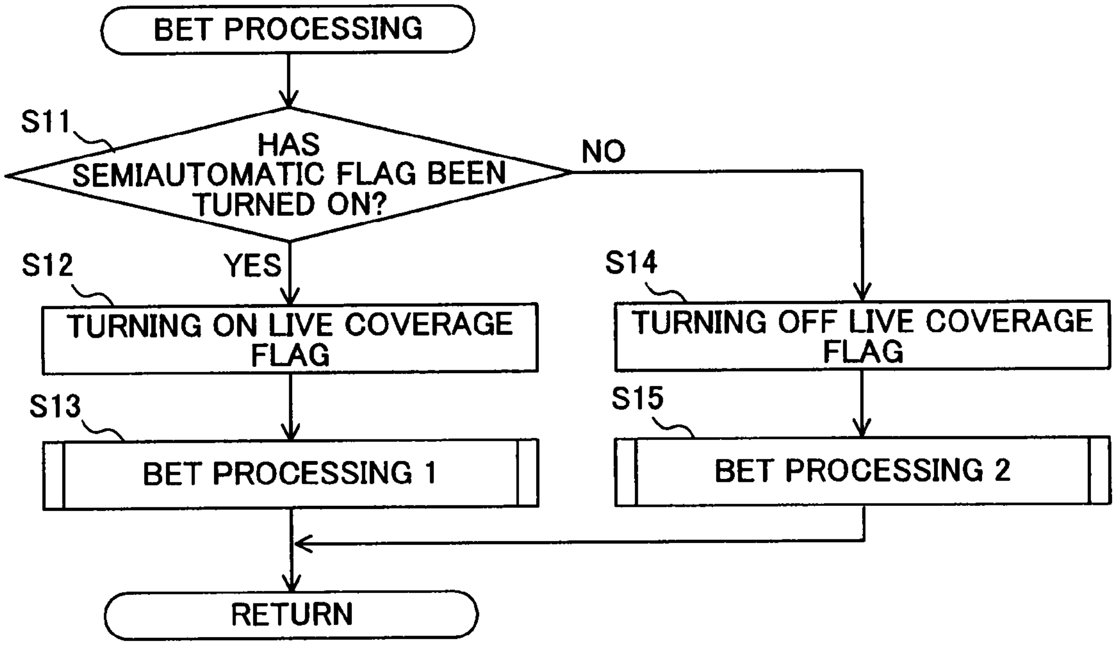
FIG. 9A is a flowchart of bet processing.
Figure 9:
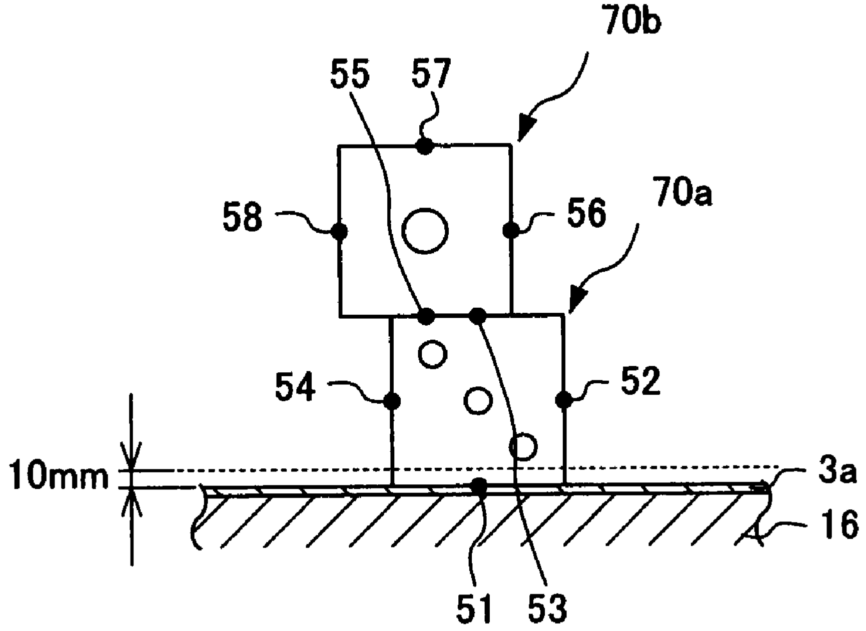

With reference to FIG. 9, the die 70*b* is superimposed on the die 70*a*. In this case, neither of the IC tags 55, 56, 57, and 58, which are embedded in the die 70*b*, exists in the readable area of the IC tag reader 16. Therefore, in this case, the IC tag reader 16 cannot detect the number of dots of the die 70*b*.

Figure 10:
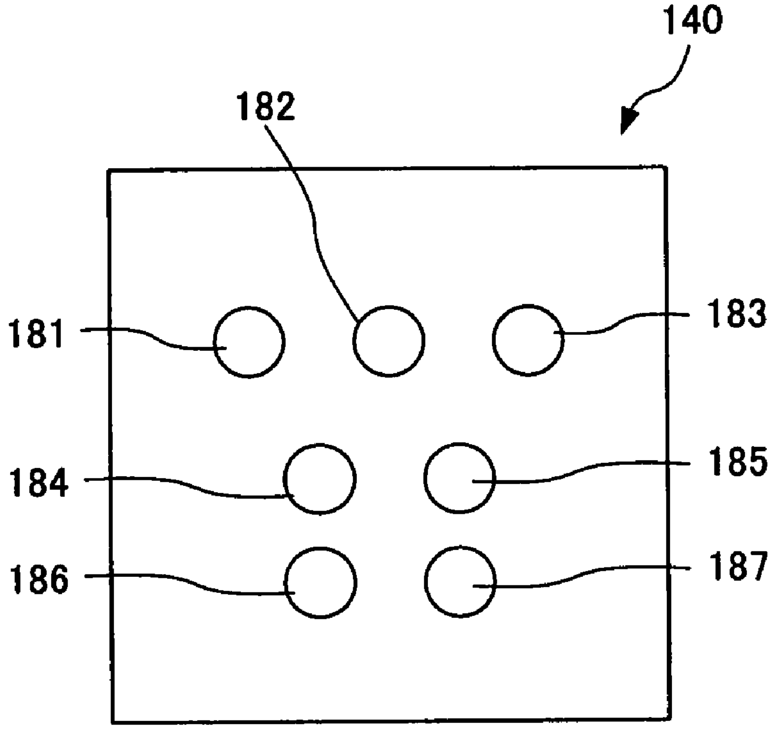
FIG. 10 shows a sheet attached to each face of a die according the embodiment of the present invention.

FIG. 10 shows a sheet 140 attached to each face of the die 70.

As shown in FIG. 10, on each face of the die 70, the sheet 140, to which infrared absorption ink is applied to identify the number of dots and the type of the die 70, is provided so as to be covered by a sheet on which the number of dots is printed. According to FIG. 10, the infrared absorption ink can be applied to dots 181, 182, 183, 184, 185, 186, and 187.

The number of dots of the die 70 can be identified by a combination of the dots to which the infrared absorption ink is applied among the dots 184, 185, 186, and 187. In addition, the type of the die 70 can be identified by a combination of the dots to which the infrared absorption ink is applied among the dots 181, 182, and 183.

Figure 11:
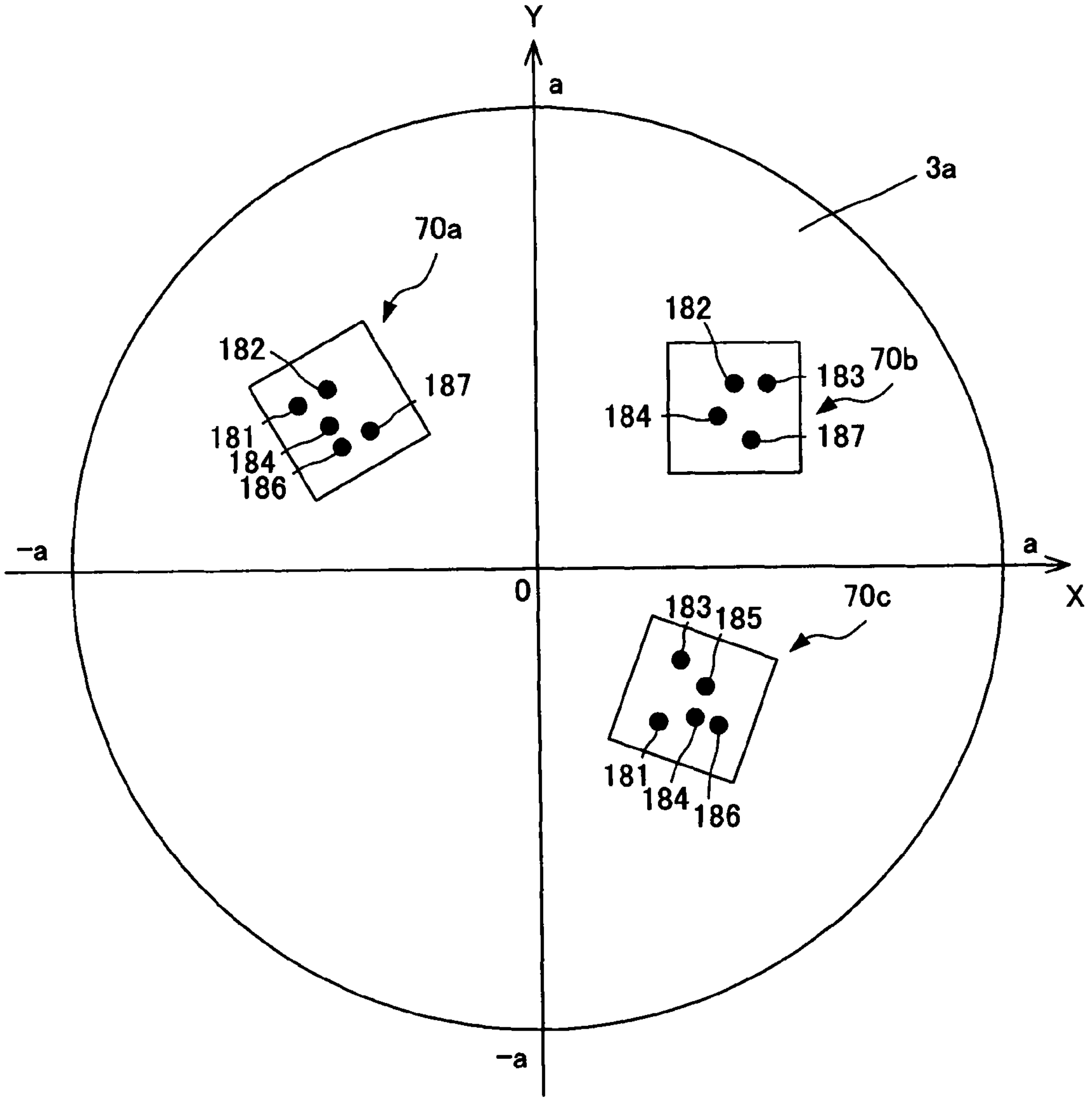
FIG. 11 is an image showing a state in which a die according to the embodiment of the present invention is captured substantially in the vertically upward direction by an infrared camera.

FIG. 11 shows an image in which the dice 70, which comes to rest on the playing board 3*a*, are captured substantially in the vertically upward direction using an infrared camera 15.

With reference to FIG. 11, dots to which the infrared absorption ink is applied on each of the dice 70*a*, 70*b*, and 70*c* are captured in black. The type and the number of dots for each of the dice 70*a*, 70*b*, and 70*c* are determined based on a combination of the dots to which the ink is applied. In addition, the playing board 3*a* is formed in a disc shape having a radius a, and each position of the dice 70*a*, 70*b*, and 70*c* is detected as an x component and y component on an x-y coordinate.

Figure 12A:
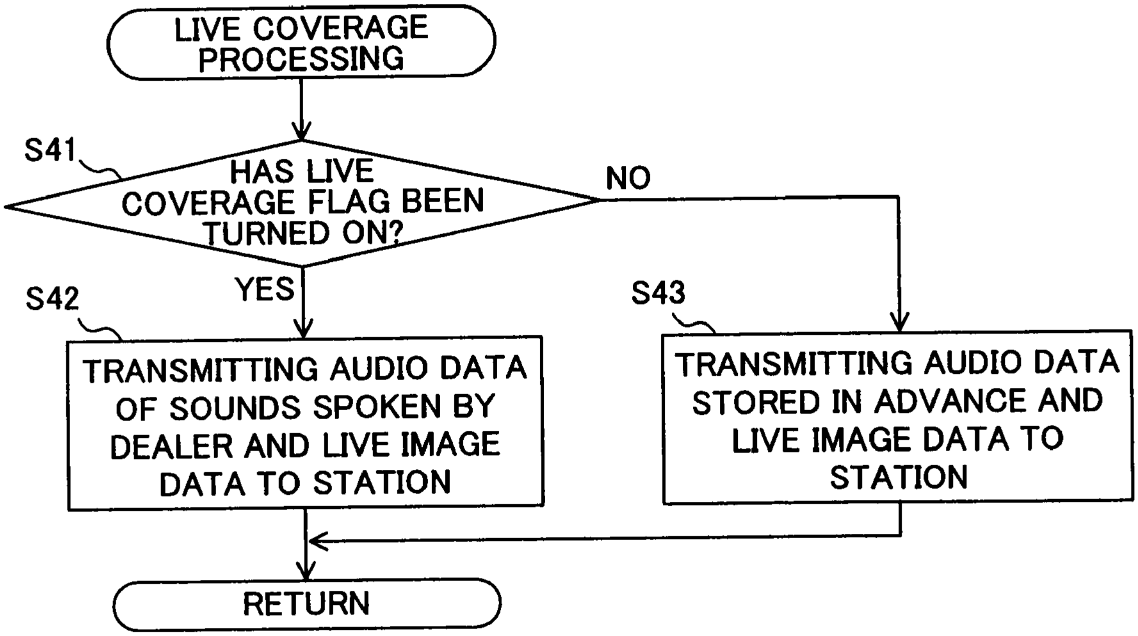
FIG. 12A is a flowchart of live coverage processing.
Figure 12:
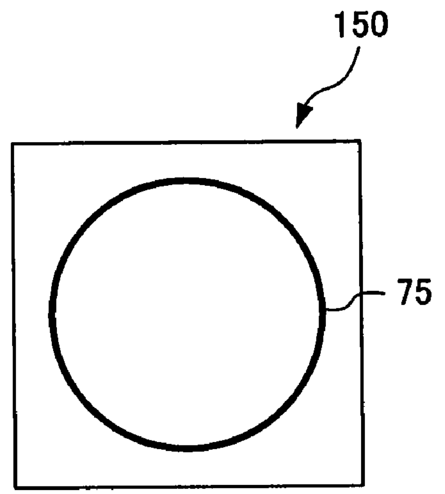
FIG. 12 shows a sheet attached to each face of a die according the embodiment of the present invention.

FIG. 12 shows a sheet 150 which is attached to each face of the dice 70.

As shown in FIG. 12, a circular profile 75 having a certain area on each face of the dice 70 in common is depicted by way of applying the infrared absorption ink on each face of the dice 70. The sheet 150 on which the circular profile 75 is depicted is provided so as to be covered by the abovementioned sheet 140.

Figure 13:
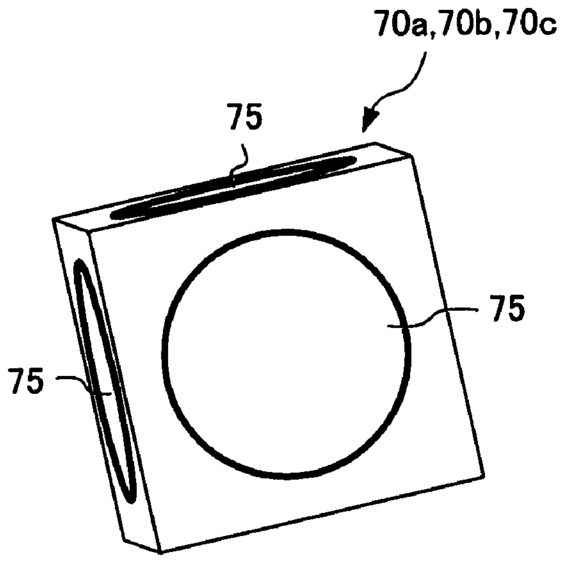
FIG. 13 shows an image in which a die according to the embodiment of the present invention that has come to rest at a tilt on a playing board, is captured substantially in the vertically upward direction by an infrared camera.

FIG. 13 shows an image in which the die 70, which comes to rest at a tilt on a playing board 3*a*, is captured substantially in the vertically upward direction using the infrared camera 15.

With reference to FIG. 13, three faces of the die 70 are captured. Therefore, it is necessary to distinguish the number of dots of which face is correct. Consequently, the number of dots having the largest area among the three faces is determined as the face that should be read. In a case of this distinction, the CPU (not shown) in the infrared camera 15 calculates the areas of the circular profiles 75 thus captured, and distinguishes the number of dots of the face on which the circular profile 75 having the largest area among the areas thus calculated is printed as the correct number of dots.

Figure 14:
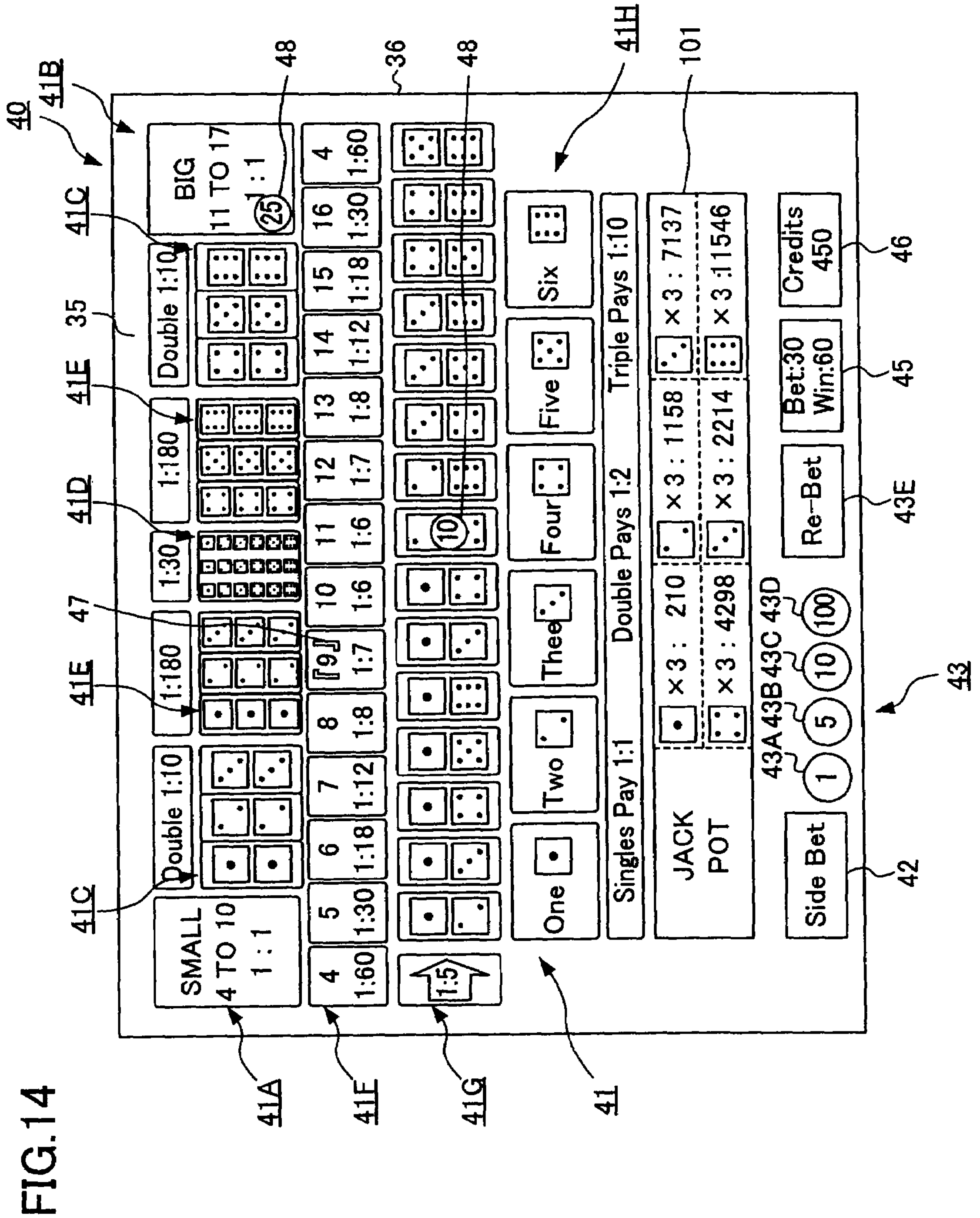
FIG. 14 shows an example of a display screen according to the embodiment of the present invention.

FIG. 14 shows an example of a display screen displayed on an image display unit. As shown in FIG. 14, an image display unit 7 is a touch-panel type of liquid crystal display, on the front surface of which a touch panel 35 is attached, allowing a player to perform selection such as of icons displayed on a liquid crystal screen 36 by contacting the touch panel 35, e.g., with a finger.

A table-type betting board (a bet screen) 40 for predicting the number of dots of the dice 70 is displayed in a game at a predetermined timing on the image display unit 7.

A detailed description is now provided regarding the bet screen 40. On the bet screen 40 are displayed a plurality of normal bet areas 41 and a side bet area 42. The plurality of normal bet areas 41 includes a normal bet area 41A, a normal bet area 41B, a normal bet area 41C, a normal bet area 41D, a normal bet area 41E, a normal bet area 41F, a normal bet area 41G, and a normal bet area 41H. By contacting the touch panel 35, e.g., with a finger, the normal bet area 41 is designated, and by displaying chips in the normal bet area 41 thus designated, a normal bet operation is performed. Furthermore, by contacting the touch panel 35, e.g., with a finger, the side bet area 42 is designated, and by displaying chips in the side bet area 42 thus designated, a side bet operation is performed.

A unit bet button 43, a re-bet button 43E, a payout result display unit 45, and a credit amount display unit 46 are displayed at the right side of the side bet area 42 in order from the left side.

The unit bet button unit 43 is a group of buttons that are used by a player to bet chips on the normal bet area 41 and the side bet area 42 designated by the player. The unit bet button unit 43 is configured with four types of buttons including a 1 bet button 43A, a 5 bet button 43B, a 10 bet button 43C, and a 100 bet button 43D. It should be noted that in the case of an incorrect bet operation, the player can start a bet operation again by touching a re-bet button 43E.

Firstly, the player designates the normal bet area 41 or the side bet area 42 using a cursor 47 by way of contacting the touch panel 35, e.g., with a finger. At this time, contacting the 1 bet button 43A, e.g., with a finger, allows for betting one chip at a time (number of chips to be bet increases one by one in the order of 1, 2, 3, every time the 1bet button 43A is contacted, e.g., by a finger). Similarly, when contacting the 5 bet button 43B, e.g., with a finger, five chips at a time can be bet (number of chips to be bet increases five by five in the order of 5, 10, 15, every time the 5 bet button 43B is contacted, e.g., by a finger). Similarly, when contacting the 10 bet button 43C, e.g., with a finger, ten chips at a time can be bet (number of chips to be bet increases ten by ten in the order of 10, 20, 30, every time the 10 bet button 43C is contacted, e.g., by a finger). Similarly, when contacting the 100 bet button 43D, e.g., with a finger, a hundred chips at a time can be bet (number of chips to be bet increases hundred by hundred in the order of 100, 200, 300,. . . every time the 100 bet button 43D is contacted, e.g. by a finger). The number of chips bet up to the current time is displayed as a chip mark 48, and the number displayed on the chip mark 48 indicates the number of bet chips.

The number of bet chips and payout credit amount for a player in a previous game are displayed in the payout result display unit 45. The number calculated by subtracting the number of bet chips from the payout credit amount is a newly acquired credit amount for the player in the previous game.

The credit amount display unit 46 displays the credit amount which the player possesses. The credit amount decreases according to the number of bet chips (1 credit amount for 1 chip) when the player bets chips. If the bet chips are entitled to an award and credits are paid out, the credit amount increases in accordance with the number of paid out chips. It should be noted that the game is over when the player's credit amount becomes zero.

The normal bet area 41 in the bet screen 40 is described next. The normal bet areas 41A and 41B are portions where the player places a bet on a predicted sum of dots appearing on the dice 70A to 70C. In other words, the player selects the normal bet area 41A if the predicted sum falls in a range of 4 to 10, or the normal bet area 41B if the predicted sum falls in a range of 11 to 17. Odds are set to 1:1 (2 chips are paid out for 1 chip bet).

The normal bet area 41C is a portion where the player places a bet, predicting that two dice 70 have the same number of dots. In other words, the player wins an award if one of the combinations occurs, such as (1, 1), (2, 2), (3, 3), (4, 4), (5, 5), and (6, 6), and the odds are set to 1:10.

The normal bet area 41D is a portion where the player places a bet, predicting that all three dice have the same number of dots. In other words, the player wins an award if one of the combinations occurs, such as (1, 1, 1), (2, 2, 2), (3, 3, 3), (4, 4, 4), (5, 5, 5), and (6, 6, 6), and the odds are set to 1:30.

The bet area 41E is a portion where the player places a bet on a predicted number of dots appearing commonly on all three dice. In other words, the player places a bet on one of the combinations of (1, 1, 1), (2, 2, 2), (3, 3, 3), (4, 4, 4), (5, 5, 5), or (6, 6, 6), and the odds are set to 1:180.

The normal bet area 41F is where the player places a bet, predicting a total, a summation of dots appearing on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 41G is a portion where the player places a bet on predicted dots appearing on the two dice selected from the three, and the odds are set to 1:5.

The normal bet area 41H is a region where the player places a bet on the number of dots appearing on the dice 70, and the odds are set according to the number of dots of the dice 70 matching the predicted number of dots.

Figure 15A:
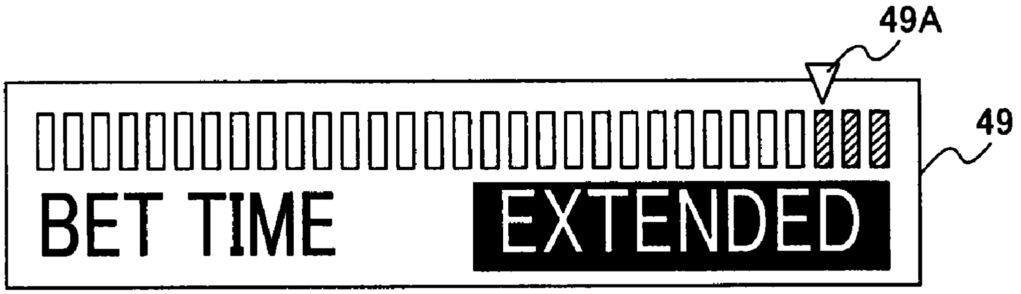
FIG. 15 is a block diagram showing the internal configuration of the gaming machine shown in FIG. 2.
Figure 15:
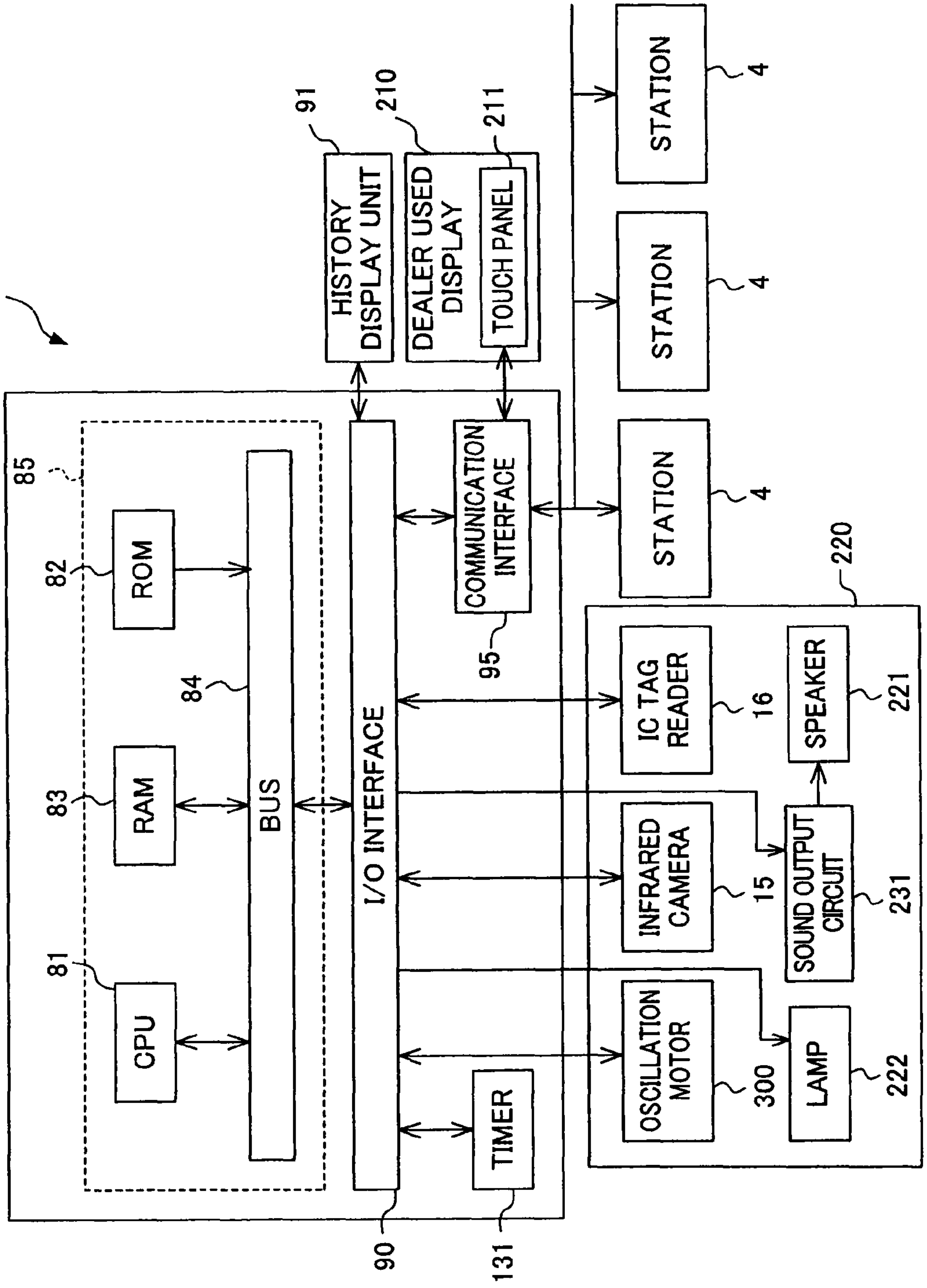

FIG. 15 is a block diagram showing the internal configuration of the gaming machine shown in FIG. 2. A main control unit 80 of the gaming machine 1 includes a microcomputer 85, which is configured with a CPU 81, ROM 82, RAM 83, and a bus 84 that transfers data therebetween.

The CPU 81 is connected with an oscillating motor 300 via an I/O interface 90. Furthermore, the CPU 81 is connected with a timer 131, which can measure time via the I/O interface 90. In addition, the CPU 81 is connected with a lamp 222 via the I/O interface 90. The lamp 222 emits various colors of light for performing various types of rendered effects, based on output signals from the CPU 81. Furthermore, the CPU 81 is connected with a speaker 221 via the I/O interface 90 and a sound output circuit 231. The speaker 221 emits various sound effects for performing various types of rendered effects, based on output signals from the sound output circuit 231. Furthermore, the I/O interface 90 is connected with the abovementioned infrared camera 15 and/or the IC tag reader 16, thereby transmitting and receiving information in relation to the number of dots of the three dice 70, which comes to rest on the playing board 3*a*, between the infrared camera 15 and/or the IC tag reader 16.

Here, the oscillating motor 300, the infrared camera 15, the IC tag reader 16, the lamp 222, the sound output circuit 231, and the speaker 221 are provided within a single composite unit 220.

In addition, via a communication interface 95 connected to the I/O interface 90, the main control unit 80 transmits and receives data such as bet information, payout information, and the like to and from each station 4, as well as data such as bet start instructional images, bet start instruction signals, and the like to and from the dealer used display 210.

Furthermore, the I/O interface 90 is connected with a history display unit 91, and the main control unit 80 transmits and receives information in relation to the number of dots on the die, to and from the history display unit 90.

ROM 82 in the main control unit 80 is configured to store a program for implementing basic functions of the gaming machine 1; more specifically, a program for controlling various devices which drive the playing unit 3, a program for controlling each station 4, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 4, information on respective number of dots that appear on the dice 70 transmitted from the infrared camera 15 and/or the IC tag reader 16, data relating to the results of processing executed by CPU 81, and the like. A jackpot storage area is provided in the RAM 83. In the jackpot storage area, the data indicating the number of playing media stored cumulatively is stored so as to correspond to each number of dots of matching dice. The data is provided to the station 4 at a predetermined timing, and a jackpot image is displayed.

The CPU 81 controls the oscillating motor 300, which oscillates the playing unit 3, based on data and a program stored in the ROM 82 and the RAM 83, and oscillates the playing board 3*a* of the playing unit 3. Furthermore, after oscillation of the playing board 3*a* ceases, a control processing associated with game progression, such as confirmation processing for confirming the number of dots on each of the dice 70 resting on the playing board 3*a*.

In addition to the control processing described above, the CPU 81 has a function of executing a game by transmitting and receiving data to and from each station 4 so as to control each station 4. More specifically, the CPU 81 accepts bet information transmitted from each station 4. Furthermore, the CPU 81 performs win determination processing based on the number of dots on the dice 70 and the bet information transmitted from each station 4, and calculates the amount of an award paid out in each station 4 with reference to the payout table stored in the ROM 82.

Figure 16A:
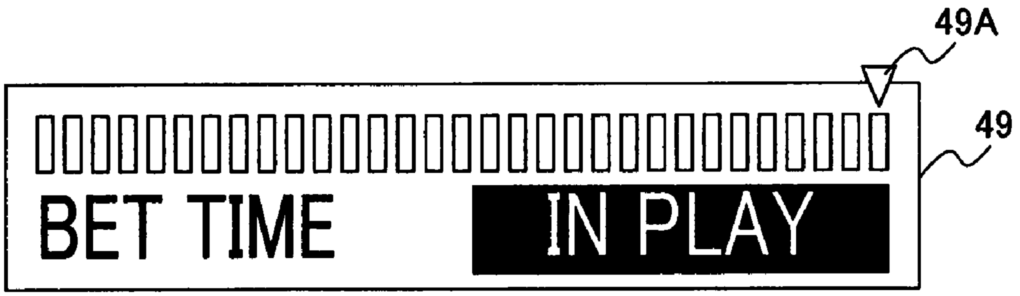
Figure 16:
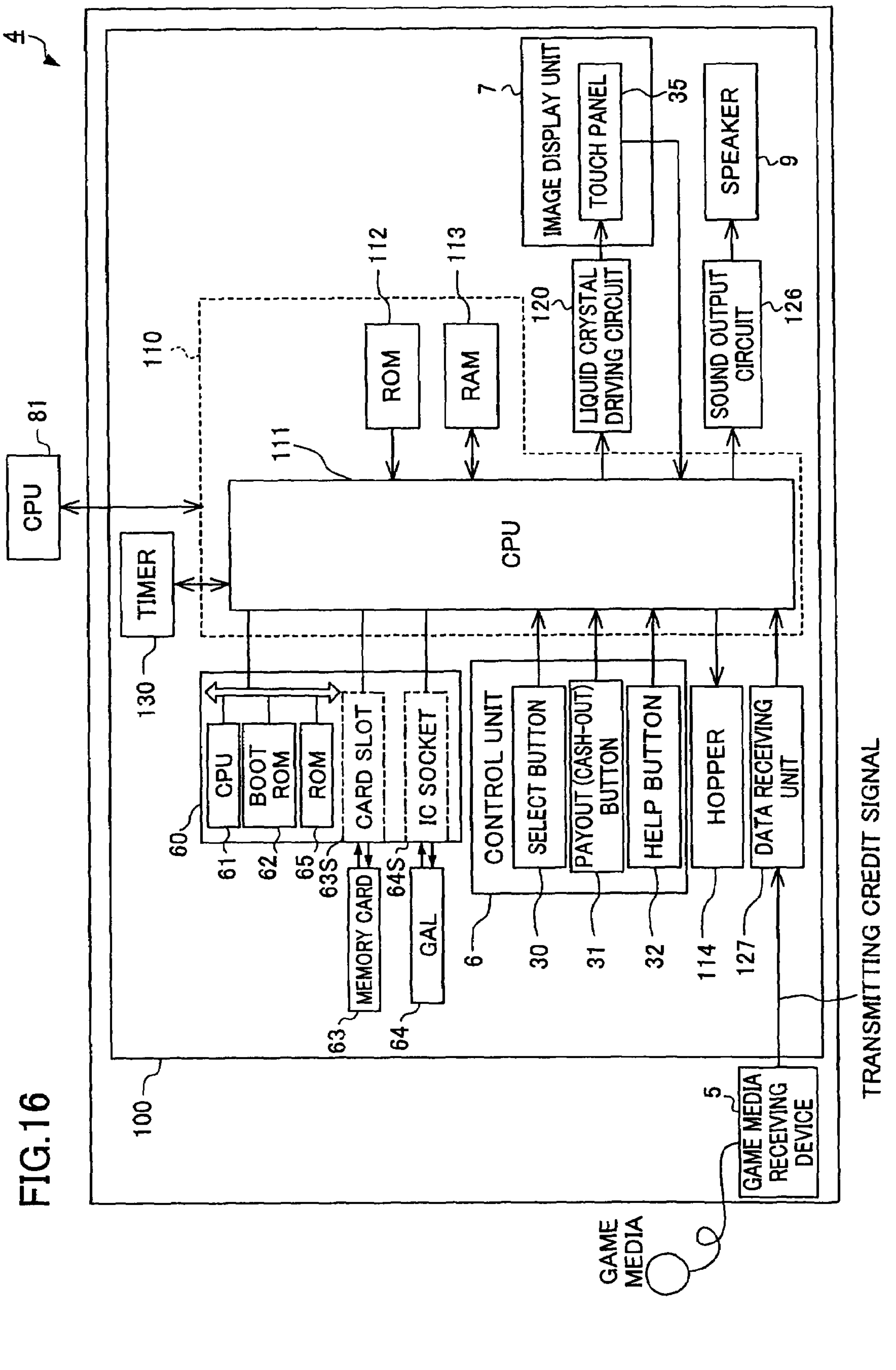
FIG. 16 is a block diagram showing the internal configuration of the station shown in FIG. 2.

FIG. 16 is a block diagram showing the internal configuration of the station shown in FIG. 2. The station 4 includes a main body 100 in which an image display unit 7 and the like are provided, and a game media receiving device 5, which is attached to the main body 100. The main body 100 further includes a station control unit 110 and several peripheral devices.

The station control unit 110 includes a CPU 111, ROM 112, and RAM 113.

ROM 112 stores a program for implementing basic functions of the station 4, other various programs needed to control the station 4, a data table, and the like.

Moreover, a decision button 30, a payout button 31, and a help button 32 provided in the control unit 6 are connected to the CPU 111, respectively. The CPU 111 controls the execution of various corresponding operations in accordance with manipulation signals, which are generated in response to each button pressed by a player. More specifically, the CPU 111 executes various processing, based on input signals transmitted from the control unit 6 in response to a player's operation which has been inputted, and the data and programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the station 4. The CPU 111 performs various kinds of processing based upon the input signals supplied from the control unit 6 and the touch panel 35, and the data and the programs stored in the ROM 112 and the RAM 113. Then, the CPU 111 controls the peripheral devices which configure the station 4 based on the results of the processing. It should be noted that the mode whereby processing is performed is set for each processing depending on the content of the processing. For example, the former approach is applied to payout processing of game media for respective numbers of dots appearing on the dice, and the latter approach is applied to bet operation processing by a player.

Furthermore, a hopper 114, which is connected to the CPU 111, pays out a predetermined amount of game media through the payout opening 8, receiving the instruction signals from the CPU 111.

Moreover, the image display unit 7 is connected to the CPU 111 via a liquid crystal driving circuit 120. The liquid crystal driving circuit 120 includes program ROM, image ROM, an image control CPU, work RAM, a video display processor (VDP), video RAM, and the like. Here, the program ROM stores an image control program with respect to the display functions of the image display unit 7, and various kinds of selection tables. The image ROM stores dot data for creating an image to be displayed on the image display unit 7, and dot data for displaying a jackpot image, for example. In addition, the image control CPU determines an image to be displayed on the image display unit 7, selected from the dot data previously stored in the image ROM according to the image control program previously stored in the program ROM based on parameters specified by the CPU 111. The work RAM is configured as a temporary storage means when executing the image control program by the image control CPU. The VDP forms an image corresponding to the display contents determined by the image control CPU and outputs the resulting image on the image display unit 7. It should be noted that the video RAM is configured as a temporary storage device used by the VDP for creating an image.

As mentioned above, the touch panel 35 is attached to the front side of the image display unit 7, and the information related to operation on the touch panel 35 is transmitted to the CPU 111. The touch panel 35 detects an input operation by the player on a bet screen 40 and the like. More specifically, selection of the normal bet area 41 and the side bet area 42 in the bet screen 40, manipulation of the bet button unit 43 and the like, are performed by touching the touch panel 35, and the information thereof is transmitted to the CPU 111. Then, a player's bet information is stored in the RAM 113 based on the information stored. Furthermore, the bet information is transmitted to the CPU 81 in the main control unit 80, and stored in a bet information storage area in the RAM 83.

Moreover, a sound output circuit 126 and a speaker 9 are connected to the CPU 111. The speaker 9 emits various sound effects for performing various kinds of rendered effects, based on output signals from the sound output circuit 126. In addition, the game media receiving device 5, into which game media such as coins or medals are inserted, is connected to the CPU 111 via a data receiving unit 127. The data receiving unit 127 receives credit signals transmitted from the game media receiving device 5, and the CPU 111 increases a player's credit amount stored in the RAM 113 based on the credit signals transmitted.

A timer 130, which can measure time, is connected to the CPU 111.

A gaming board 60 includes a CPU (Central Processing Unit) 61, ROM 65 and boot ROM 62, a card slot 63S compatible with a memory card 63, and an IC socket 64S compatible with a GAL (Generic Array Logic) 64, which are connected to one another via an internal bus.

The memory card 63 comprises nonvolatile memory such as compact flash (trademark) or the like, which stores a game program and a game system program.

Furthermore, the card slot 63S has a configuration that allows the memory card 63 to be detachably inserted, and is connected to the CPU 111 via an IDE bus. Such an arrangement allows the kinds or content of the game provided by the station 4 to be changed by performing the following operation. More specifically, the memory card 63 is first extracted from the card slot 63S, and another game program and another game system program are written to the memory card 63. Then, the memory card 63 thus rewritten is inserted into the card slot 63S. In addition, the kinds or content of the games provided by the station 4 can be changed by replacing the memory card 63 storing a game program and a game system program with another memory card 63 storing another game program and game system program. The game program includes a program for advancing a game and the like. The game program also includes a program related to image data and sound data outputted during a game.

The GAL 64 is one type of PLD that has a fixed OR array structure. The GAL 64 includes multiple input ports and output ports and, upon receiving predetermined data via each input port, outputs output data that corresponds to the input data via the corresponding output port. In addition, an IC socket 64S has a structure that allows the GAL 64 to be detachably mounted, and is connected to the CPU 111 via the PCI bus.

The CPU 61, the ROM 65, and the boot ROM 62, which are connected to one another via the internal bus, are connected to the CPU 111 via the PCI bus. The PCI bus performs signal transmission between the CPU 111 and the gaming board 60, as well as supplying electric power from the CPU 111 to the gaming board 60. The ROM 65 stores country identification information and an authentication program. The boot ROM 62 stores a preliminary authentication program, a program (boot code) which instructs the CPU 61 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e. the procedure for authenticating the game program and the game system program. The preliminary authentication program is a program for authenticating the aforementioned authentication program. The preliminary authentication program is defined to follow the procedure for verifying that the authentication program has not been forged, i.e. the procedure for authenticating the authentication program (authentication procedure).

An instructional image display determination table is described with reference to FIG. 17.

Figure 31:
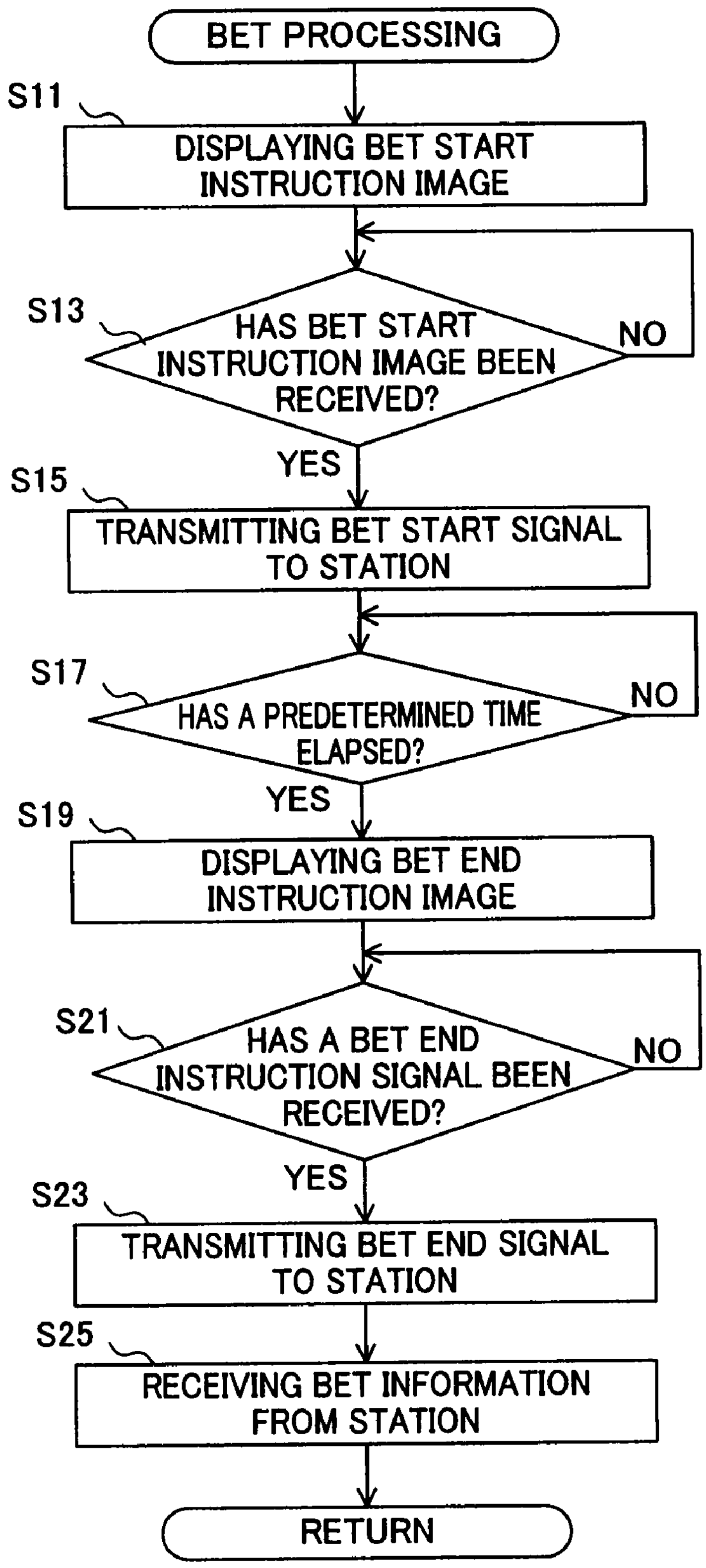
FIG. 31 is a flowchart showing bet processing executed in a gaming machine according to the embodiment of the present invention.

In Steps S11 and S19 of FIG. 31, the instructional image display determination table is referred to by the CPU 81 upon determining whether a bet start instructional image or a bet end instructional image is displayed on the display screen 210*a* of the dealer used display 210.

According to this table, "X" is data for indicating that the bet start instructional image and the like is not displayed on the display screen 210*a*, and "O" is data for indicating that the bet start instructional image and the like is displayed on the display screen 210*a*. For example, in a case in which a dealer belongs to an intermediate level, the bet start instructional image is not displayed on the display screen 210*a*, but the bet end instructional image is displayed on the display screen 210*a*. In addition, this table is stored in the ROM 82.

In the present embodiment, as described later in FIG. 31, although the CPU 81 determines according to a dealer's level whether to display on the display screen 210*a* only for the bet start instructional image and the bet end instructional image, the present invention is not limited thereto. The CPU 81 may determine according to a dealer's level whether to display on the display screen 210*a* also for a dice rolling start instructional image in order to start rolling dice, a dice rolling end instructional image in order to end rolling dice, and a result input instructional image in order to input a result of a number of dots through the touch panel 211.

The bet existence determination table is described with reference to FIG. 18.

Figure 32:
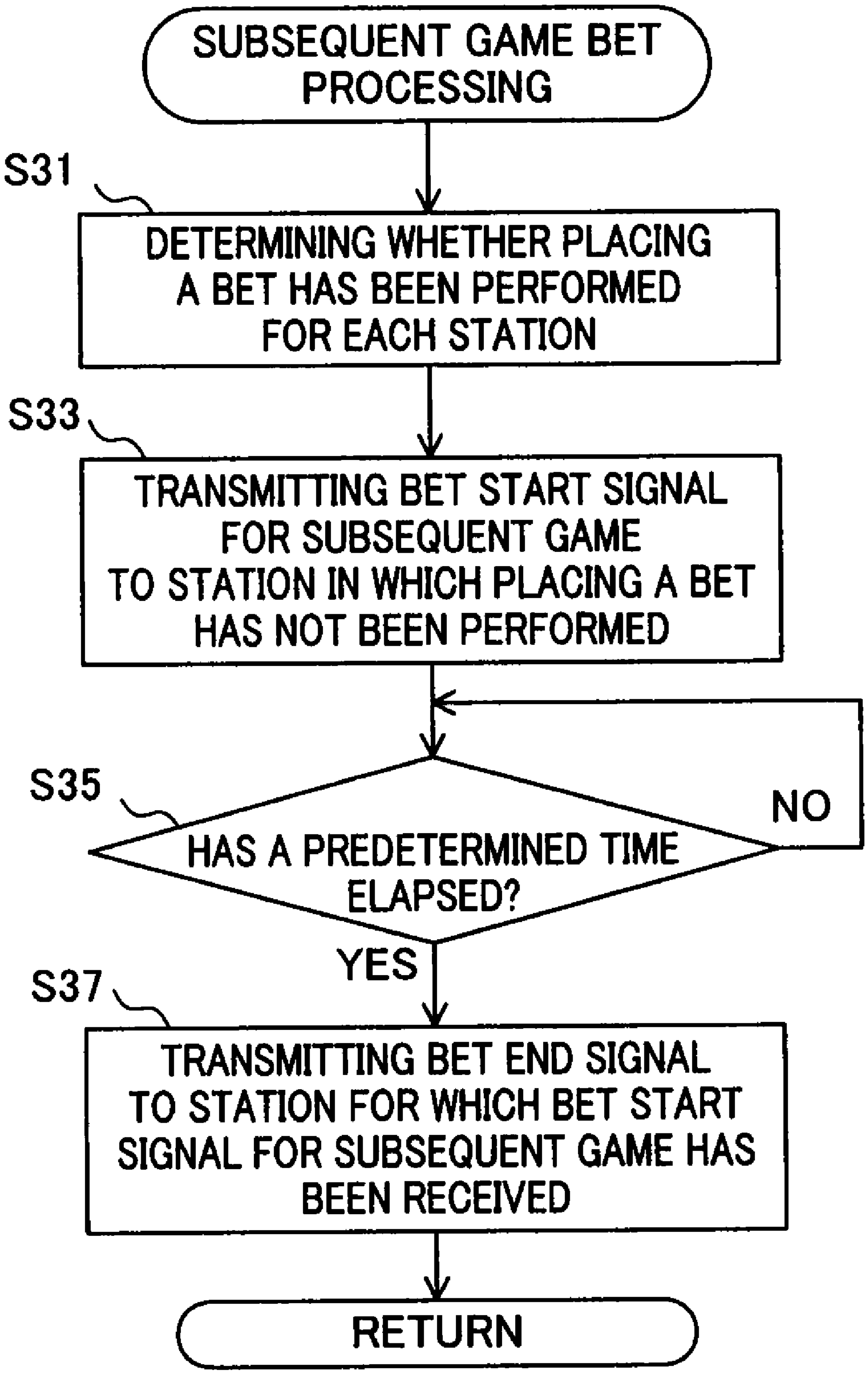
FIG. 32 is a flowchart showing subsequent game bet processing executed in a gaming machine according to the embodiment of the present invention.

The CPU 81 refers to this bet existence determination table upon determining for each station 4 whether a bet operation is performed at each station 4 in Step S31 of FIG. 32.

Data indicating whether the bet operation has been performed or not at each station number is stored in this table. "P" is data indicating that a bet operation was performed, and "A" is data indicating that a bet operation was not performed. In addition, this table is updated in every game, and stored in the RAM 83.

An oscillation mode data table is described with reference to FIG. 19.

The CPU 81 refers to this oscillation mode data table upon determining combination patterns of the oscillation modes of the playing board 3*a*. In addition, this table is stored in the ROM 82.

According to this table, in a case of a pattern 3, the roll of dice 70 is performed in the order of a small oscillation for six seconds, a large oscillation for four seconds, and a subtle oscillation for five seconds. Here, the order of oscillation amplitude of the playing board 3*a* is equal to large oscillation>small oscillation>subtle oscillation. It should be noted that the oscillation speed for the large oscillation, the small oscillation, and the subtle oscillation are all the same speed. Furthermore, the small oscillation is enough to be able to roll a die, the large oscillation is enough to jump a die, and the subtle oscillation is enough to level off a die that comes to rest at a tilt.

A rendered effect table is described with reference to FIG. 20.

Figure 33:
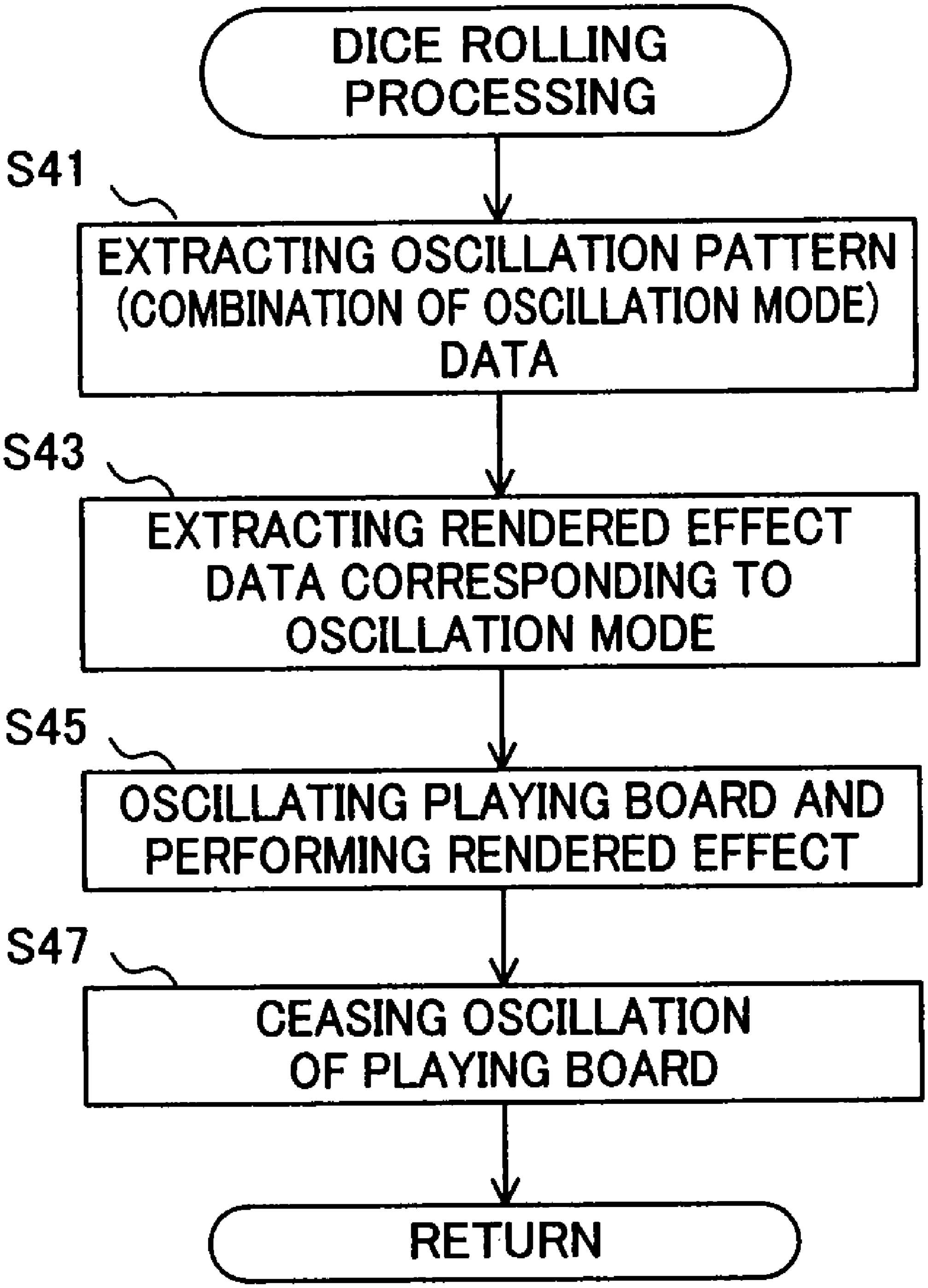
FIG. 33 is a flowchart showing dice rolling processing executed in a gaming machine according to the embodiment of the present invention.

The CPU 81 refers to this rendered effect table upon determining rendered effect data in response to an oscillation pattern of the playing board 3*a* in Step S43 of FIG. 33. In addition, this table is stored in the ROM 82.

According to this table, oscillation modes correspond to sound types and, for example, in the case of a large oscillation, "sound 2" is determined. For example, in the case of "sound 2", the sound indicating that a die jumps is outputted from the speaker 221.

It should be noted that, by way of associating an oscillation mode with a certain type of emitted light, rendered effects with a light emitting mode associated with an oscillation mode may be performed by lighting or flashing of the lamp 222.

An IC tag data table is described with reference to FIG. 21.

The IC tag data table is a table showing data as identification data 1 to 3 which is created by the CPU 81 based on the results of the type of dice and the number of dots on the dice, when information stored in IC tags embedded in the dice 70*a*, 70*b*, and 70*c* is detected by the IC tag reader 16.

According to this table, for example, when an IC tag embedded in each die is detected in the order of 70*c*, 70*a*, and 70*b*, by the IC tag reader 16, the die 70*c* is associated with identification data 1 of which the type is "red" and the number of dots is "six", the die 70*a* is associated with identification data 2 of which the type is "white" and the number of dots is "three", and the die 70*b* is associated with identification data 3 of which the type is "black" and the number of dots is "five".

On the other hand, when three dice are not detected, for example, in a case where only two dice are detected, identification data is created for only 2 sets, identification data 1 and 2.

In addition, the data table is transmitted from the IC tag reader 16 to the CPU 81, and then the CPU 81 receives it to analyze the number of dots on a die and the like.

An infrared camera capturing data table is described with reference to FIG. 22.

The infrared camera capturing data table is a data table showing dot patterns of the infrared absorption inks applied to the dice 70 and location data of the dice 70 on the playing board 3*a*.

For example, regarding the die 70*a* shown in FIG. 11, in the infrared camera capturing data table, the CPU (not shown) inside the infrared camera 15 stores −50 for X and 55 for Y as location data, stores "O" for 181, 182, 184, 186, and 187, to which the infrared absorption inks are being applied, and stores "X" for 183 and 185, which are not being applied. The same is true of the dice 70*b* and 70*c*.

On the other hand, as shown in FIG. 13, in a case where a plurality of faces of the dice 70 is captured, the number of dots cannot be specified uniquely. In this case, the CPU (not shown) inside the infrared camera 15 calculates the area of the profiles 75 on the plurality of faces thus captured, and generates the infrared camera capturing data table based on the dot patterns on the face that has a maximum area.

Therefore, even if the dice 70 come to rest at a tilt and a plurality of faces of the dice 70 is captured, the number of dots can be specified uniquely.

In addition, this data table is transmitted from the infrared camera 15 to the CPU 81, and then the CPU 81 receives it to analyze the number of dots on a die and the like.

A dot pattern data classification table is described with reference to FIG. 23.

According to this table, colors as the classification for the dice 70 are set so as to correspond to dot combinations to which the infrared absorption ink is applied, among the abovementioned dots 181 to 183 in FIG. 10. "O" indicates that the infrared absorption ink is applied to the dot, and "X" indicates that the infrared absorption ink is not applied to the dot.

For example, in a case where the infrared camera capturing data table described in FIG. 22 is transmitted to the CPU 81, the CPU 81 determines the classification of the dice 70 as "red" by comparing the infrared camera capturing data table with the dot pattern data classification table.

A number of dots-dot pattern data table is described with reference to FIG. 24.

According to this table, numbers as the number of dots on the dice 70 are set so as to correspond to dot combinations to which the infrared absorption ink is applied, among the abovementioned dots 184 to 187 in FIG. 10. "O" indicates that the infrared absorption ink is applied to the dot, and "X" indicates that the infrared absorption ink is not applied to the dot.

For example, in a case where the infrared camera capturing data table shown in FIG. 22 is transmitted from the infrared camera 15 to the CPU 81, the CPU 81 determines the number of dots on the dice 70 as "five" by comparing the infrared camera capturing data table thus received with the dot pattern data classification table.

Figure 25:
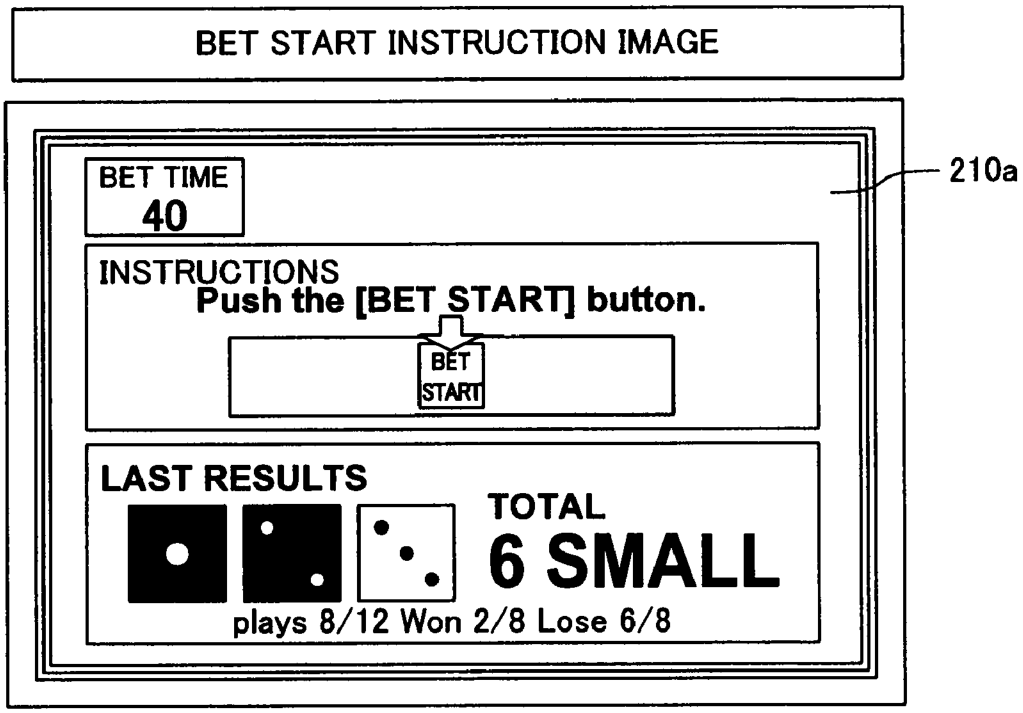
FIGS. 25 to 29 show examples of display screens according to the embodiment of the present invention.

A bet start instructional image is described with reference to FIG. 25.

The bet start instructional image is displayed by the CPU 81 on the display screen 210*a* of the dealer used display 210 before the CPU 81 accepts a bet from each station 4.

This bet start instructional image instructs a dealer to touch a "bet start" button. When a touch panel 211 detects that the dealer has touched the "bet start" button, the touch panel 211 transmits a bet start instruction signal to the CPU 81 via a communication interface 95.

Figure 26:
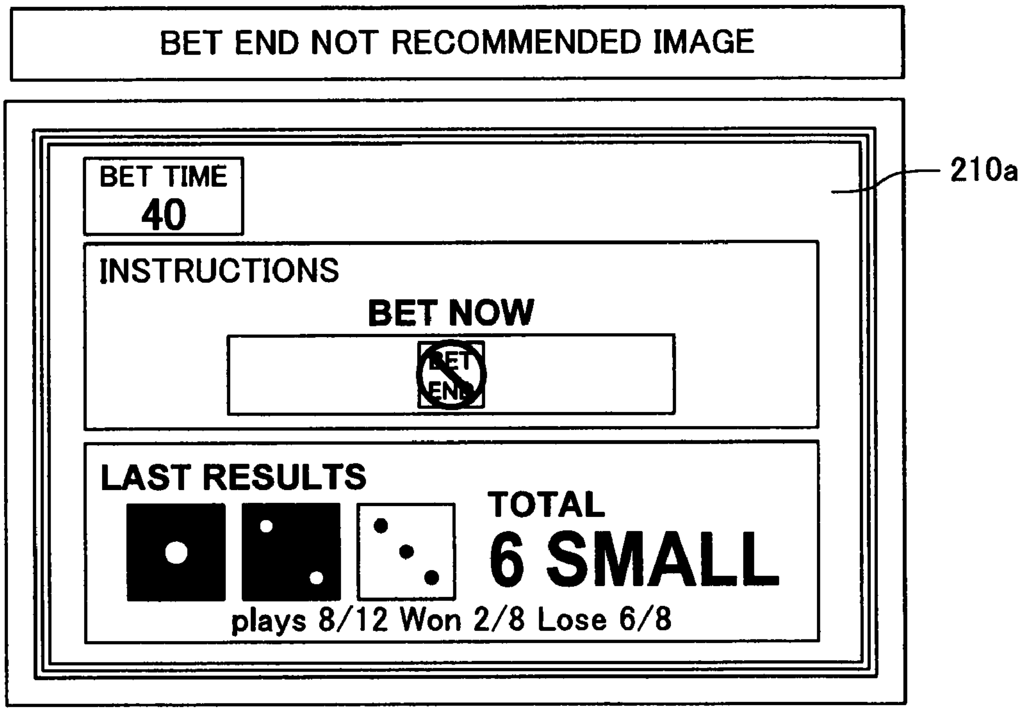

A bet end not recommended image is described with reference to FIG. 26.

This bet end not recommended image is displayed by the CPU 81 on the display screen 210*a* of the dealer used display 210 while the CPU 81 accepts a bet from each station 4.

This bet end not recommended image instructs the dealer not to touch a "bet end" button.

Figure 27:
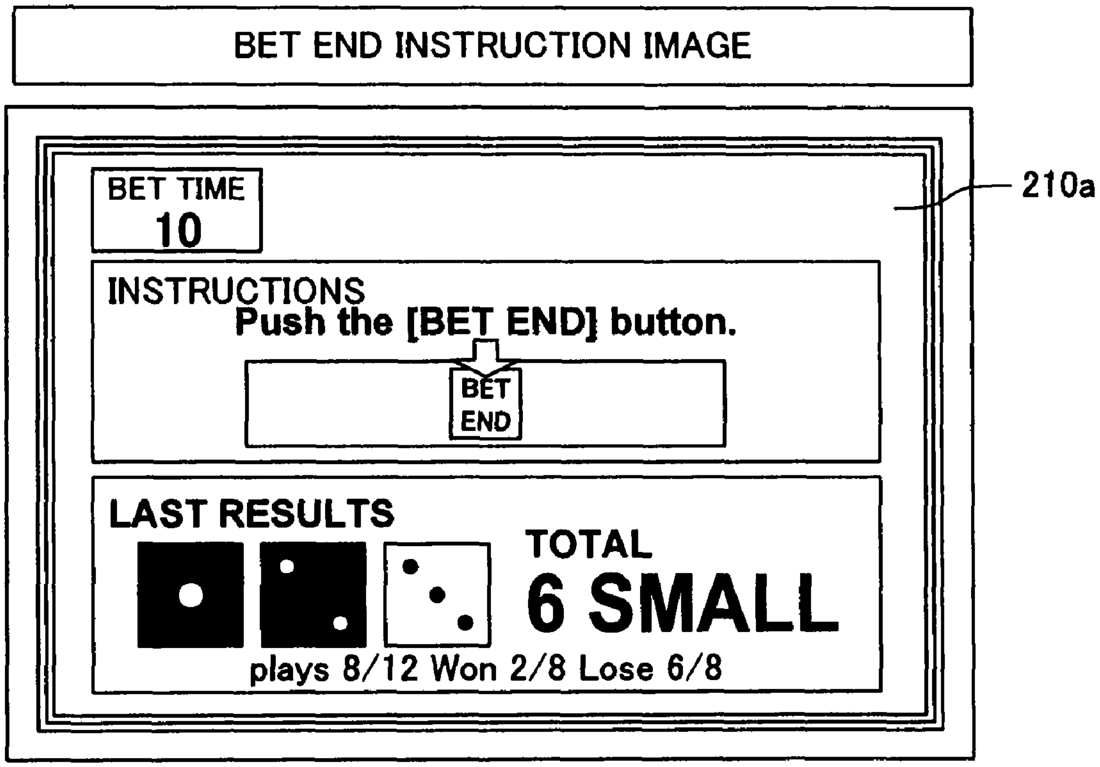

A bet end instructional image is described with reference to FIG. 27.

The bet end instructional image is displayed by the CPU 81 on the display screen 210*a* of the dealer used display 210 after elapse of a predetermined time from when the CPU 81 starts accepting a bet from each station 4.

This bet end instructional image instructs the dealer to touch the "bet end" button. When the touch panel 211 detects that the dealer has touched the "bet end" button, the touch panel 211 transmits a bet end instruction signal to the CPU 81 via the communication interface 95.

A display example on the image display unit 7 of each station 4 is described with reference to FIG. 28.

Figure 28:
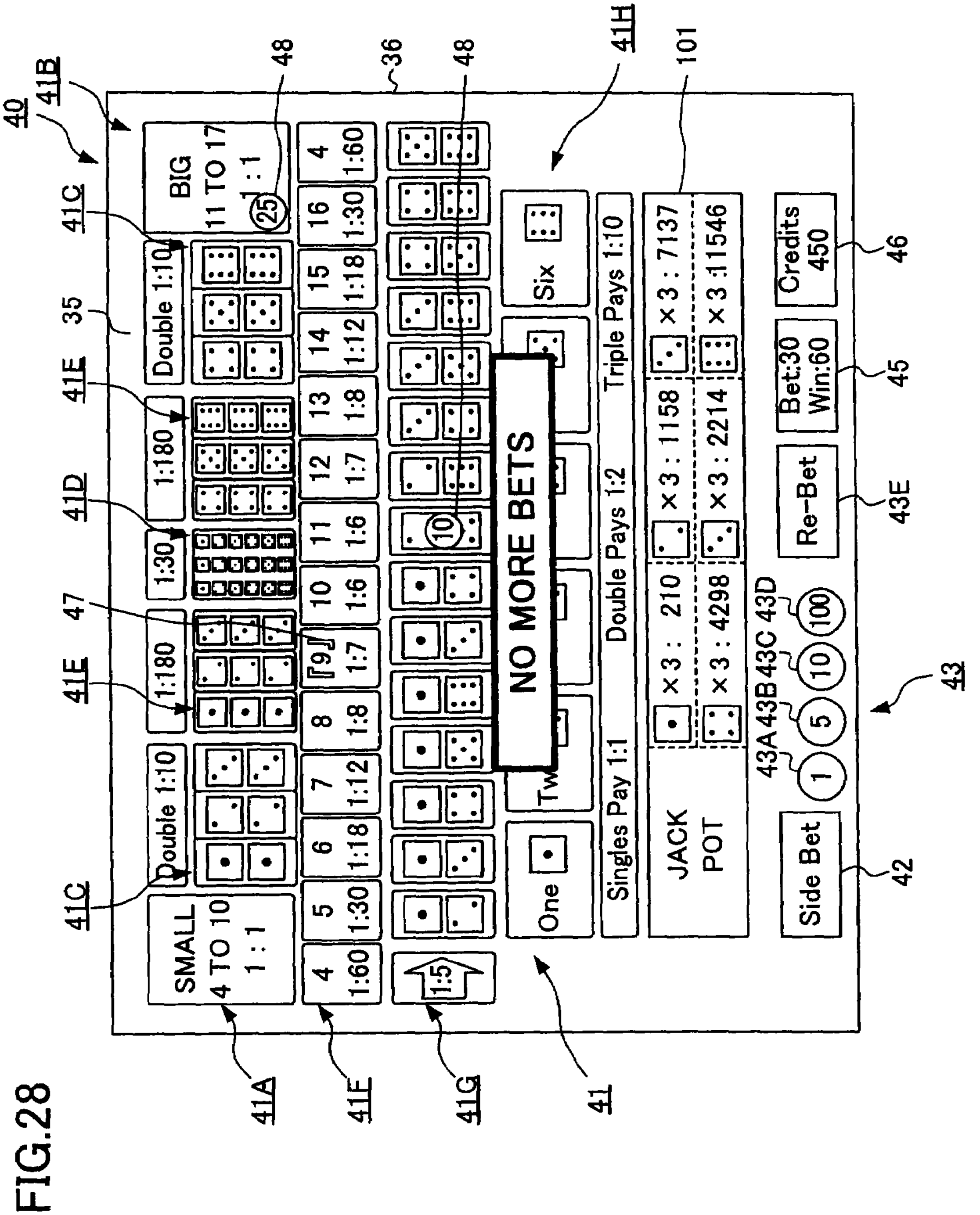

An image shown in FIG. 28 is configured to report to each station 4 that accepting of bets has ended. A player can recognize that the accepting of bets has ended by confirming that a message "NO MORE BETS" is displayed.

A display example on the image display unit 7 of each station 4 is described with reference to FIG. 29.

Figure 29:
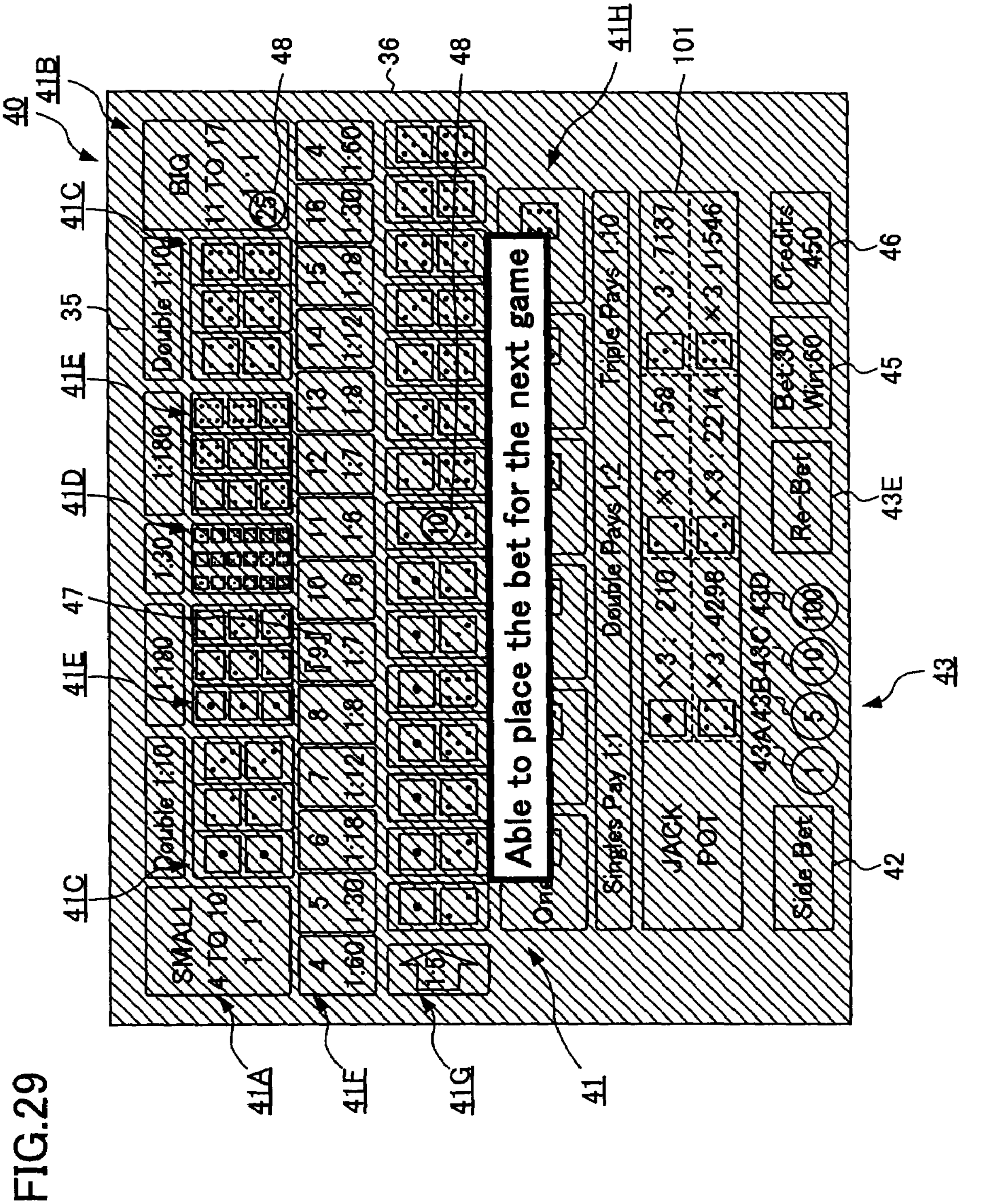

The image shown in FIG. 29 is configured to report to the station 4 in which a bet was not placed that a bet can be placed on a subsequent game. A player can recognize that a bet on the subsequent game is possible by confirming that a message "ABLE TO PLACE THE BET FOR THE NEXT GAME" is displayed.

Subsequently, with reference to FIGS. 30 to 34, processing performed in the main control unit of a gaming machine according to the present embodiment is described.

Figure 30:
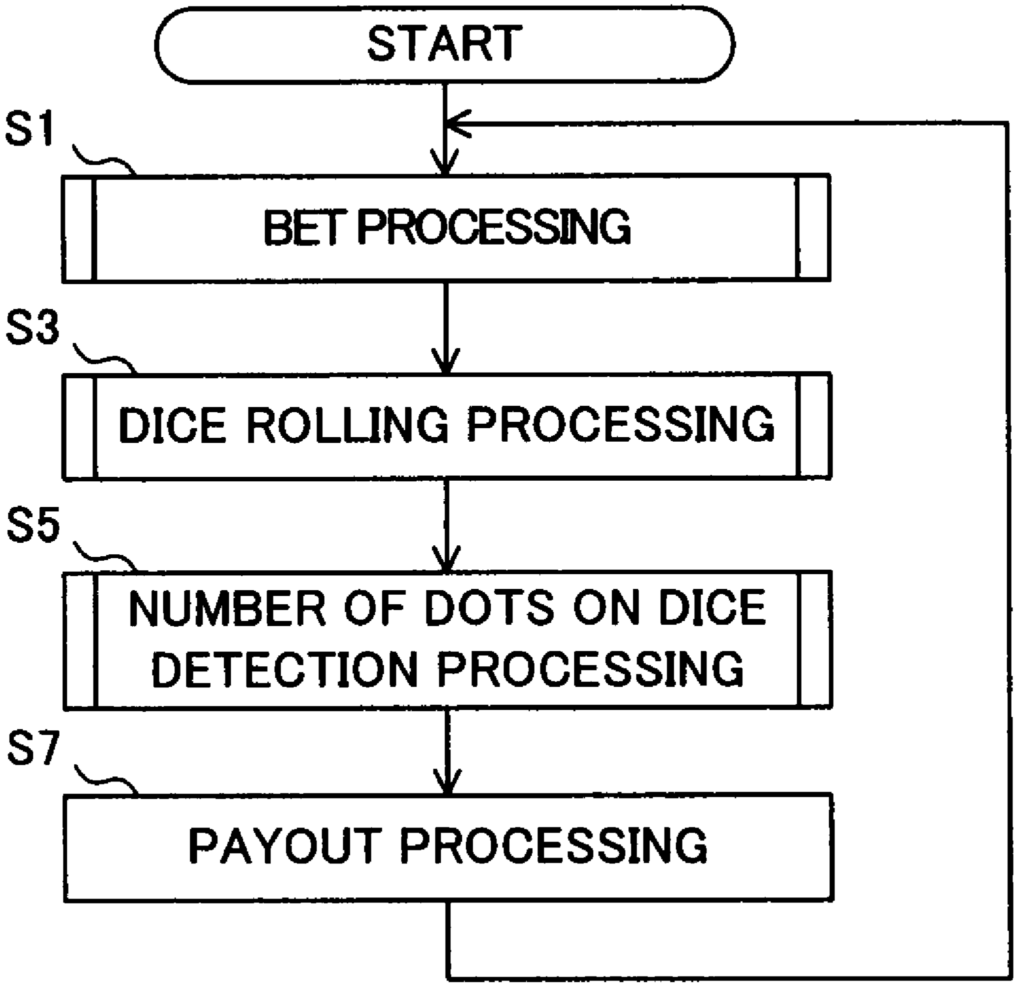
FIG. 30 is a flowchart showing dice game processing executed in a gaming machine according to the embodiment of the present invention.

FIG. 30 is a flowchart showing dice game execution processing. Initially, in Step S1, the CPU 81 executes bet processing, which is described later in FIG. 31, and in Step S3, the CPU 81 executes dice rolling processing, which is described later in FIG. 33. In Step S5, the CPU 81 executes number of dots on dice detection processing, which is described later in FIG. 34 and, in Step 7, executes payout processing corresponding to the number of dots, and then the flow returns to Step 1.

FIG. 31 is a flowchart showing bet processing.

In Step S11, the CPU 81 displays the bet start instructional image (see FIG. 25) on the display screen 210*a* of the dealer used display 210. It should be noted that, whether or not the bet start instructional image is displayed may be determined according to a dealer's level with reference to the instructional image display determination (see FIG. 17).

Thus, according to the dealer's level, it becomes possible to determine whether the bet start instructional image is displayed on the display screen 210*a* of the dealer used display 210.

In Step S13, the CPU 81 determines whether the bet start instruction signal has been received from the touch panel 211 disposed on the dealer used display 210. In the case of a NO determination, the CPU 81 returns the processing to Step S13, and in the case of a YES determination, the CPU 81 advances the processing to Step S15.

In Step S15, the CPU 81 transmits the bet start signal to each of the stations 4. When the bet start signal is received, bet placement can be performed at each station 4.

In Step S17, the CPU 106 determines whether or not a predetermined time has elapsed. More specifically, the CPU 81 starts to measure a predetermined lapse of time t by the timer 131, compares the predetermined lapse of time t with a predetermined time T1 stored in the ROM 82, and determines whether the predetermined lapse of time t measured by the timer 131 has reached the predetermined time T1. In the case of a NO determination, the CPU 81 returns the processing to Step S17, and in the case of a YES determination, the CPU 81 advances the processing to Step S19.

In Step S19, the CPU 81 displays the bet end instructional image (see FIG. 27) on the display screen 210*a* of the dealer used display 210. It should be noted that, whether or not the bet end instructional image is displayed may be determined according to a dealer's level with reference to the instructional image display determination (see FIG. 17).

In Step S21, the CPU 81 determines whether the bet end instruction signal has been received from the touch panel 211 disposed on the dealer used display 210. In the case of a NO determination, the CPU 81 returns the processing to Step S21, and in the case of a YES determination, the CPU 81 advances the processing to Step S23.

In Step S23, the CPU 81 transmits the bet end signal to each station 4. When the bet end signal is received, bet placement cannot be accepted at each station 4, and then the CPU 111 inside the station control unit 110 displays an image which reports on the image display unit 7that an accepting of bet placement has been terminated (FIG. 28).

In Step S25, the CPU 81 receives bet information from each station 4. The bet information relates to a normal bet input and a side bet input performed at each station 4. In addition, the bet information includes information indicating whether bet placement has been performed or not which is included in the bet existence determination table (FIG. 18). Upon terminating the processing of Step S25, the CPU 81 terminates the bet processing.

With the bet processing of the present embodiment, even an inexperienced dealer can perform start operations for bet placement and end operations according to instructional images.

FIG. 32 is a flowchart showing subsequent game bet processing.

The subsequent game bet processing is started by the CPU 81 and executed parallel to the dice rolling processing in FIG. 30 when the bet processing described in FIG. 31 is terminated. Therefore, placing a bet on the subsequent game becomes possible even during the dice rolling after termination of the bet processing.

In Step S31, the CPU 81 determines whether bet placement has been performed for each station 4. More specifically, the CPU 81 distinguishes stations at which bet placement has been performed from stations at which bet placement has not been performed with reference to the bet existence determination table (FIG. 18).

In Step S33, the CPU 81 transmits a bet start signal for a subsequent game to the stations 4 at which bet placement has not been performed. When the station 4 receives the bet start signal for a subsequent game, the CPU 111 inside the station control unit 110 displays an image which reports that bet placement for a subsequent game is possible (FIG. 29) on the image display unit 7.

Thus, even during a game, a player who has not participated in the game can place a bet on a subsequent game.

In Step S35, the CPU 81 determines whether or not a predetermined time has elapsed. More specifically, the CPU 81 starts to measure a predetermined lapse of time t by the timer 131, compares the predetermined lapse of time t with a predetermined time T2 stored in the ROM 82, and determines whether the predetermined lapse of time t measured by the timer 131 has reached the predetermined time T2. In the case of a NO determination, the CPU 81 returns the processing to Step S35, and in the case of a YES determination, the CPU 81 advances the processing to Step S37.

In Step S37, the CPU 81 transmits a bet end signal to the station 4 at which the bet start signal for a subsequent game has been received. When the station 4 receives the bet end signal, the player cannot place a bet on a subsequent game, and the CPU 81 terminates acceptance of bet placement for a subsequent game. Upon terminating the process in Step S37, the CPU 81 terminates the subsequent game bet processing.

FIG. 33 is a flowchart showing dice rolling processing.

In Step S41, the CPU 81 extracts an oscillation pattern (combinations of oscillation modes) data from the ROM 82. More specifically, the CPU 81 refers to an oscillation mode data table (see FIG. 19) and extracts the oscillation pattern data at random.

In Step S43, the CPU 81 extracts a rendered effect corresponding to an oscillation mode from the ROM 82. More specifically, the CPU 81 refers to the rendered effect table (see FIG. 20) and extracts rendered effect data corresponding to an oscillation mode based on an oscillation pattern data thus extracted in Step S41.

In Step S45, the CPU 81 oscillates the playing board 3*a* and performs a rendered effect. More specifically, the CPU 81 oscillates the playing board 3*a* by controlling the oscillation motor 300 based on the oscillation pattern data thus extracted in Step S41, and performs a rendered effect with sounds and/or lights based on rendered effect data corresponding to an oscillation mode.

Thus, since a rendered effect corresponding to an oscillation mode of the playing board 3*a* is performed, games do not become monotonous and interest therein can be improved. Furthermore, since an oscillation pattern is randomly determined, games do not become monotonous and interest therein can be improved.

In Step S47, the CPU 81 ceases oscillation of the playing board 3*a*. More specifically, the CPU 81 ceases the oscillation of the playing board 3*a* by stopping the oscillation motor 300. Upon terminating the processing in Step S47, the CPU 81 terminates the dice rolling processing.

Figure 34:
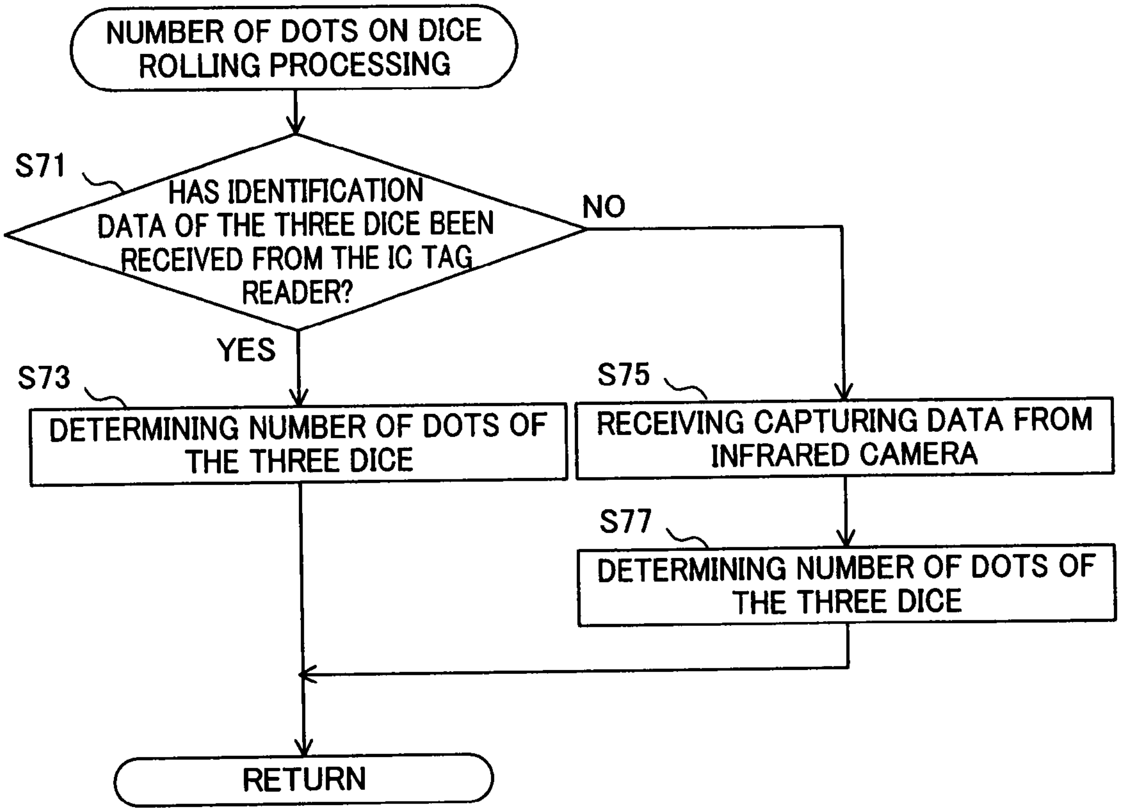
FIG. 34 is a flowchart showing dot detection processing executed in a gaming machine according to the embodiment of the present invention.

FIG. 34 is a flowchart showing number of dots on dice detection processing.

In Step S71, the CPU 81 determines whether identification data of the three dice has been received from the IC tag reader 16. In the case of a YES determination, the CPU 81 advances the processing to Step S73, and in the case of a NO determination, the CPU 81 advances the processing to Step S75. More specifically, the CPU 81 determines whether there are three sets of identification data, which are identification data 1 to 3, in the IC tag data table (see FIG. 21) received from the IC tag reader 16.

In Step S73, the CPU 81 determines the number of dots on the three dice. More specifically, the CPU 81 determines the number of dots of the three dice by analyzing the identification data 1 to 3. For example, in a case where the identification data is data as shown in FIG. 21, the number of dice of which type is red is "six", the number of dice of which type is white is "three", and the number of dice of which type is black is "five". Upon finishing the processing in Step S73, the CPU 81 terminates the number of dots detection processing.

In Step S75, the CPU 81 receives capturing data from the infrared camera. More specifically, the CPU 81 receives the infrared camera capturing data table (see FIG. 22) for each of the dice 70*a*, 70*b*, and 70*c*, from the infrared camera 15.

In Step S77, the CPU 81 determines numbers of dots on the dice. More specifically, the CPU 81 determines positions of the dice on the playing board 3*a* based on the infrared camera capturing data table (see FIG. 22), determines types (colors) of the dice based on the infrared camera capturing data table (see FIG. 22) and the dot pattern data classification table (see FIG. 23), and determines numbers of the dice based on the infrared camera capturing data table (see FIG. 22) and the number of dots-dot pattern data table (see FIG. 24). This processing is executed for the three dice 70*a*, 70*b*, and 70*c*. Upon terminating the processing in Step S77, the CPU 81 terminates the number of dots detection processing.

Thus, even in a case where, for example, a die is inclined and the number of dots thereof cannot be identified by the IC tag reader 16, since the number of dots can be determined using the infrared camera 15, the accuracy of detection and identification of numbers of dots can be improved.

Descriptions regarding the present embodiment have been provided above. Although a case has been described in which the number of dice 70 is three according to the present embodiment, the number of in the present invention is not limited to three and, for example, the number of the dice may be five.

In the present embodiment, although the controller of the present invention is described for a case of being configured from a CPU 81 which the main controller 80 includes and a CPU 111 which the station 4 includes, the controller of the present invention may be configured by only a single CPU.

Although embodiments of the present invention are described above, they are merely exemplified specific examples, and the present invention is not particularly limited thereto. Specific configurations such as each means can be modified appropriately. Moreover, it should be understood that the advantages described in association with the embodiments are merely a listing of most preferred advantages, and that the advantages of the present invention are by no means restricted to those described in connection with the embodiments.

Embodiments of the present invention are described below with reference to the accompanying drawings.

Figure 1A:
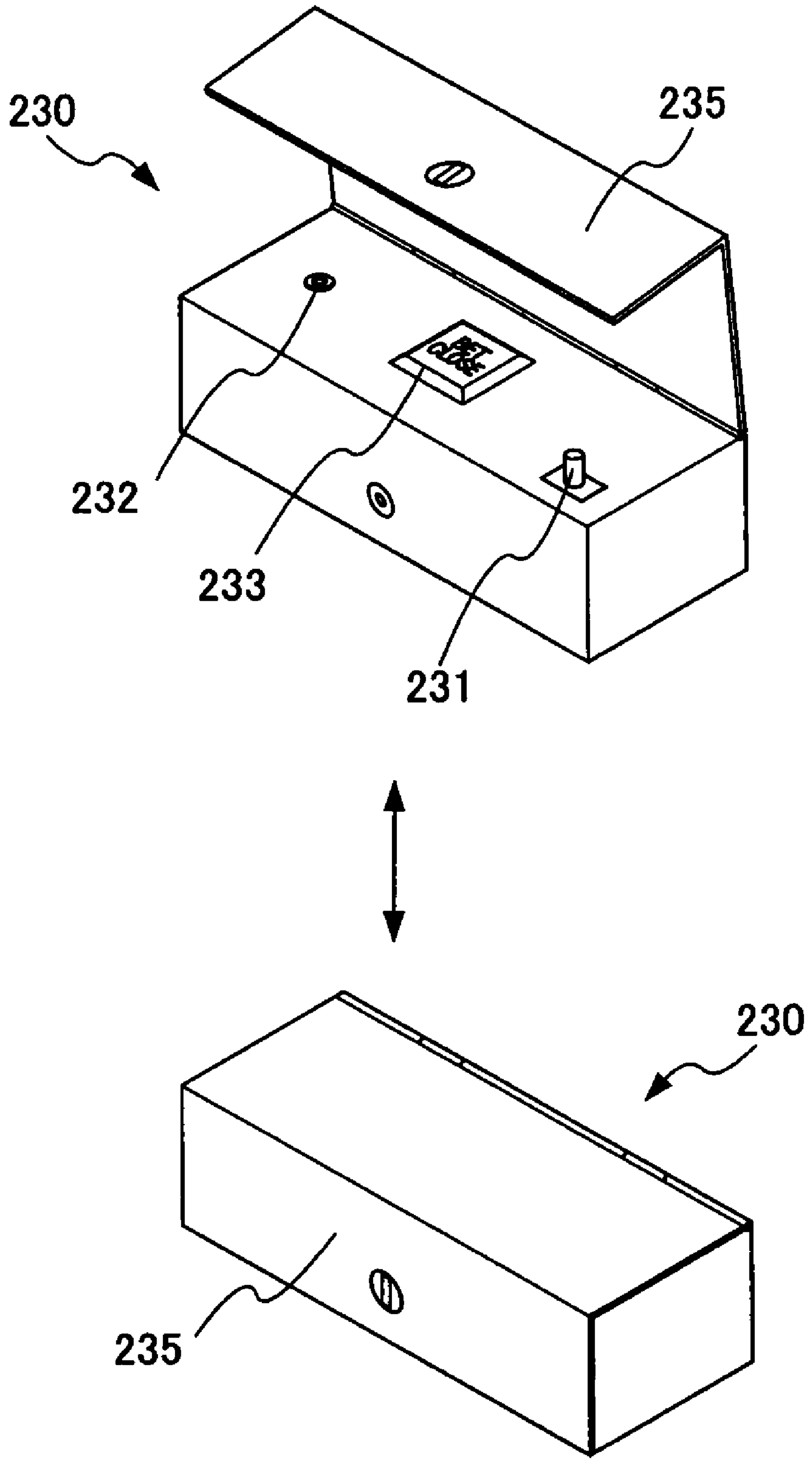
FIG. 1A is a diagram showing a main part of a gaming system according to an embodiment of the present invention.

Although details are described later, as shown in FIG. 1A, a dealer used console 230 is configured so that a lid 235 can be opened and closed. Furthermore, in a state in which the lid 235 is opened, a pushing operation of a bet close button 233 can be performed. Furthermore, when a CPU 81 receives a signal indicating that the lid 235 is opened from a lid open/close detection switch 231, the CPU 81 performs control to advance a game based on a bet end instruction signal received from the bet close button 233. When the CPU 81 receives a signal indicating that the lid 235 is closed, the CPU 81 performs control to automatically advance the game.

Figure 2A:
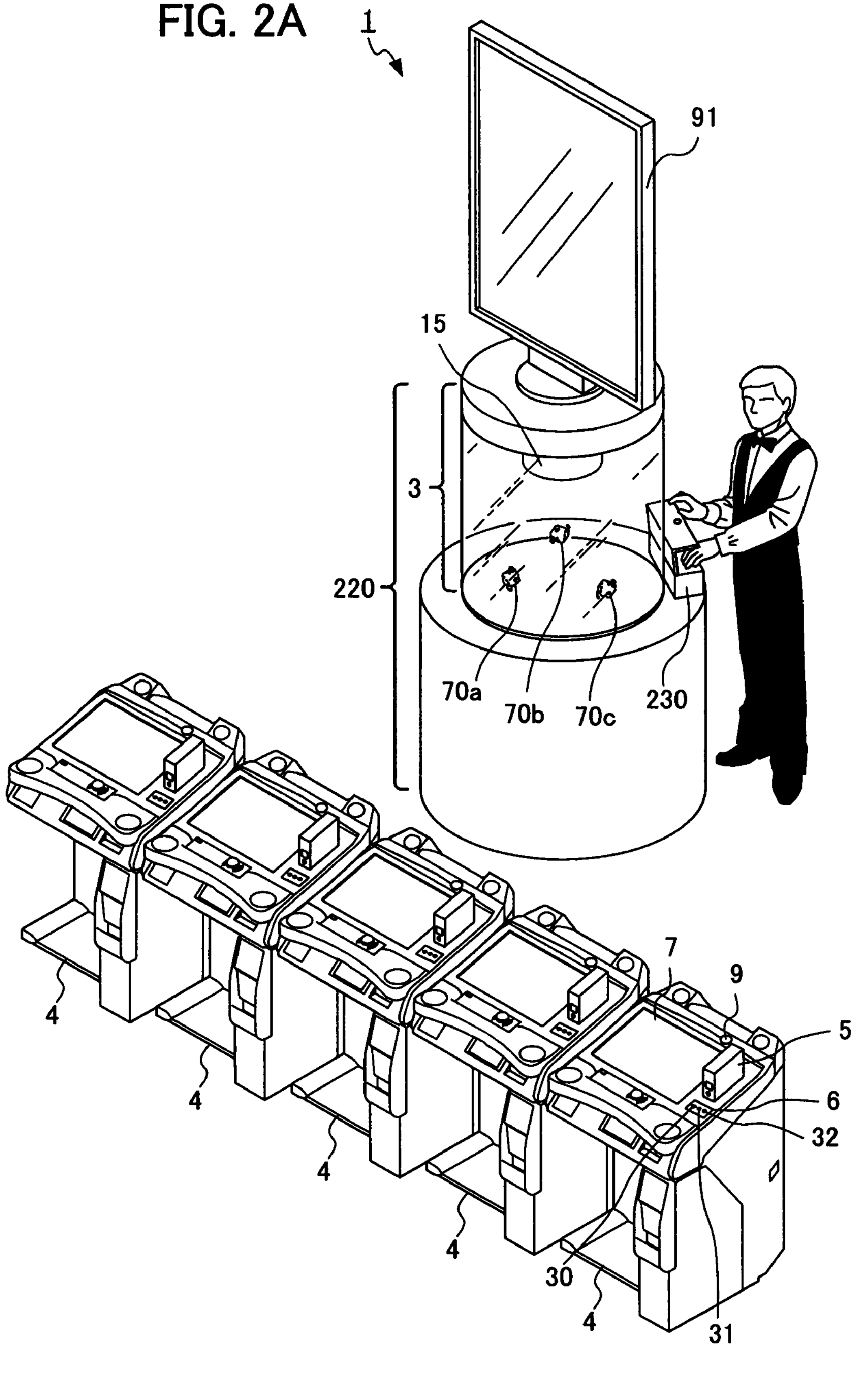
FIG. 2A is a perspective view of a gaming system according to an embodiment of the present invention.
Figure 3A:
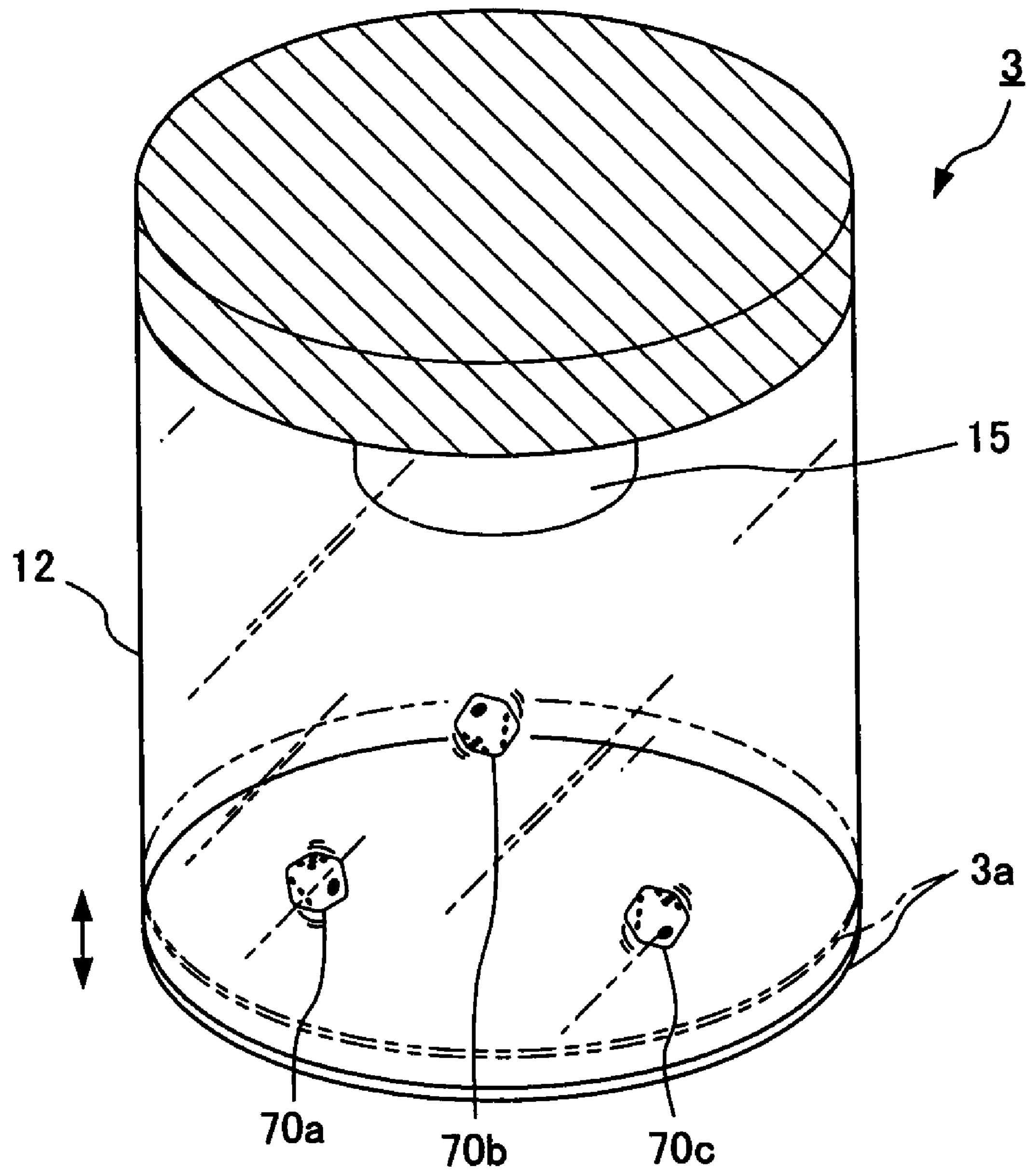
FIG. 3A is an enlarged view of a playing unit of the gaming system shown in FIG. 2A.

With reference to FIGS. 2A and 3A, a gaming system 1 of the present embodiment is described. FIG. 2A is a perspective diagram schematically showing an example of the gaming system 1. FIG. 3A is an enlarged view of a playing unit of the gaming system shown in FIG. 2A.

The gaming system 1 of the present embodiment includes a plurality of stations 4, a composite unit 220, and a dealer used console 230. Furthermore, a history display unit 91 is disposed at a position above the composite unit 220 that can be visually recognized by players playing a game at the plurality of stations 4.

The composite unit 220 controls the overall gaming system 1. Furthermore, the composite unit 220 includes a playing unit 3, a CCD camera 15, and a CPU 81 (described later) and, in a state in which the dealer used console 230 used by a dealer for operating a game is mounted to the composite unit 220, controls the overall gaming system 1 according to the operation by the dealer.

It should be noted that the dealer used console 230 can be detached from the composite unit 220. In a case in which the dealer used console 230 is detached from the composite unit 220, the composite unit 220 executes advancement of a game in automatic mode without an operation of the dealer. In a case in which the dealer used console 230 is attached to the composite unit 220, the composite unit 220 executes advancement of a game in an automatic or semiautomatic mode. Switching between automatic and semiautomatic is described later.

The stations 4 are terminals that players operate. The stations 4 accept bet operations by players sitting on chairs (not shown) provided in front of the stations 4 and pay out awards of games. The station 4 includes an image display unit 7. The player seated at each station 4 can participate in a game by predicting numbers of dots on the dice 70 and performing a normal bet input and a side bet input.

The station 4 includes a game media receiving device 5 into which game media such as medals to be used for playing the game are inserted, a control unit 6, which is configured with multiple control buttons by which a player enters predetermined instructions, and an image display unit 7, which displays images relating to a dice game. The player may participate in a game by operating the control unit 6 or the like while viewing the image displayed on the image display unit 7.

In addition, a speaker 9, which can output sound, is disposed on the upper right of the image display unit 7 on each of the stations 4.

A control unit 6 is provided on the side part of the image display unit 7 on each of the stations 4. A select button 30, a payout button 31, and a help button 32 are disposed at the control unit 6.

The select button 30 is a button that is pressed when confirming a bet operation after the bet operation is complete. Furthermore, in a case other than the bet operation, the button is pressed when a player confirms an input performed.

The payout button 31 is a button which is usually pressed at the end of a game, and when the payout button 31 is pressed, game media corresponding to credits that the player has acquired is paid out from the payout opening.

The help button 32 is a button that is pressed in a case where a method of operating the game is unclear, and upon the help button 32 being pressed, a help screen showing various kinds of operation information is displayed immediately thereafter on the image display unit 7.

The playing unit 3 is configured so as to allow a plurality of dice to roll and stop. The present embodiment is configured to use three dice 70 (dice 70*a*, 70*b*, and 70*c*) at the playing unit 3.

The playing unit 3 is formed in a cylindrical shape and includes a playing board 3*a* that causes the dice 70 to roll and then come to rest. An IC tag reader 16 that detects a number of dots on the dice 70 (described later in FIG. 6A) are provided below the playing board 3*a*.

Since the playing board 3*a* is formed to be substantially planar, as shown in FIG. 3A, the dice 70 are rolled by oscillating the playing board 3*a* substantially in the vertical direction with respect to the horizontal direction of the playing board 3*a*. Then, the dice 70 are stopped after the oscillation of the playing board 3*a* ceases. The playing board 3*a* is oscillated by a CPU 81 (described later) driving an oscillating motor 300.

Furthermore, as shown in FIG. 3A, the playing unit 3 is covered with a cover member 12 of which the entire lateral area is made of a transparent acrylic material formed in a cylindrical shape, and regulates the rolling area of the dice 70. Furthermore, the CCD camera 15 is disposed to capture an image in which the dice 70 roll on the playing board 3*a*.

The history display unit 91 is a display device that displays a history of games such as winnings of a player side or a banker side in a each previous game thus far. Details thereof are described later.

Figure 4A:
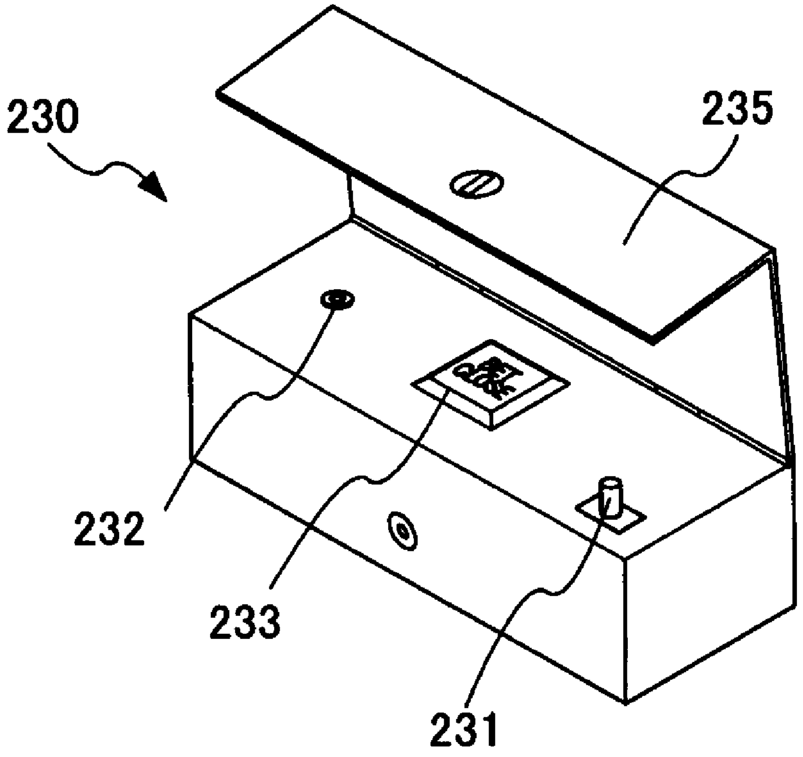
FIG. 4A is a perspective view of a dealer used console in which a lid is opened.

A dealer used console is described with reference to FIGS. 4A and 5A. FIG. 4A is a perspective view showing a dealer used console in a state in which a lid is opened. FIG. 5A is a perspective view showing a dealer used console in a state in which a lid is closed.

The dealer used console 230 includes a lid open/close detection switch 231, a microphone terminal 232, a bet close button 233, and a lid 235.

In the following, a case in which the dealer used console 230 is mounted to the composite unit 220 is described.

The lid open/close detection switch 231 detects whether the lid 235 is opened or closed. In a case in which the lid open/close detection switch 231 detects that the lid 235 is opened, the lid open/close detection switch 231 transmits a signal indicating that the lid 235 is opened. In a case in which the lid open/close detection switch 231 detects that the lid 235 is closed, the lid open/close detection switch 231 transmits a signal indicating that the lid 235 is closed. In a case in which the CPU 81 receives a signal indicating that the lid 235 is opened, the CPU 81 advances a game in a semiautomatic mode. In a case in which the CPU 81 receives a signal indicating that the lid 235 is closed, the CPU 81 advances a game in an automatic mode.

Therefore, in a case in which the lid 235 is opened, the CPU 81 can advance a game based on an input of a game operation from a dealer (semiautomatic mode). On the other hand, in a case in which the lid 235 is closed, the CPU 81 can advance a game automatically (automatic mode). Therefore, a gaming system that can readily perform switching between performing game advancement in automatic and semiautomatic modes can be provided based on whether the lid 235 is opened or closed.

The microphone terminal 232 is a terminal that connects to a microphone (not shown) which accepts audio data that is converted as data from the sounds spoken by the dealer through the microphone, and transmits the audio data thus accepted to the abovementioned CCD camera 15. The CCD camera 15 transmits to the CPU 81 data of live images of the playing board 3*a* including the dice 70 as well as the audio data thus accepted. The CPU 81 transmits the audio data thus received and/or the data of live images to each of the stations 4.

The bet close button 233 is a button that is operated in order to close acceptance of the bet operation by a player at the station 4. When a dealer pushes the bet close button 233, the bet close button 233 transmits a signal indicating that the button has been pushed to the CPU 81. The CPU 81 transmits a signal that indicates closing acceptance of betting at each of the stations 4 to each of the stations 4, upon receiving a signal indicating that the button was pushed.

In addition, the bet close button 233 is covered by a member such as that made of translucent plastic, and "BET CLOSE" is printed on a surface thereof. Furthermore, the bet close button 233 includes a light emitting device (LED) (not shown). In a case of advancing game in semiautomatic mode, the CPU 81 transmits a signal for instructing the dealer to push the button to the LED included in the bet close button 233, and performs control so as to blink the LED.

It should be noted that, in a state in which the lid 235 is being closed, the bet close button 233 is covered by the lid 235, which means that the dealer cannot touch the button.

It should be noted that, since the dealer used console 230 can be detached from the composite unit 220, it can be readily converted from a dedicated-automatic gaming system to a gaming system that is switchable between an automatic and semiautomatic modes by attaching the dealer used console 230 to the composite unit 220.

Moreover, by detaching the dealer used console 230 from the composite unit 220, the gaming system switchable between automatic and semiautomatic modes can be readily converted to a dedicated-automatic gaming system.

Figure 6A:
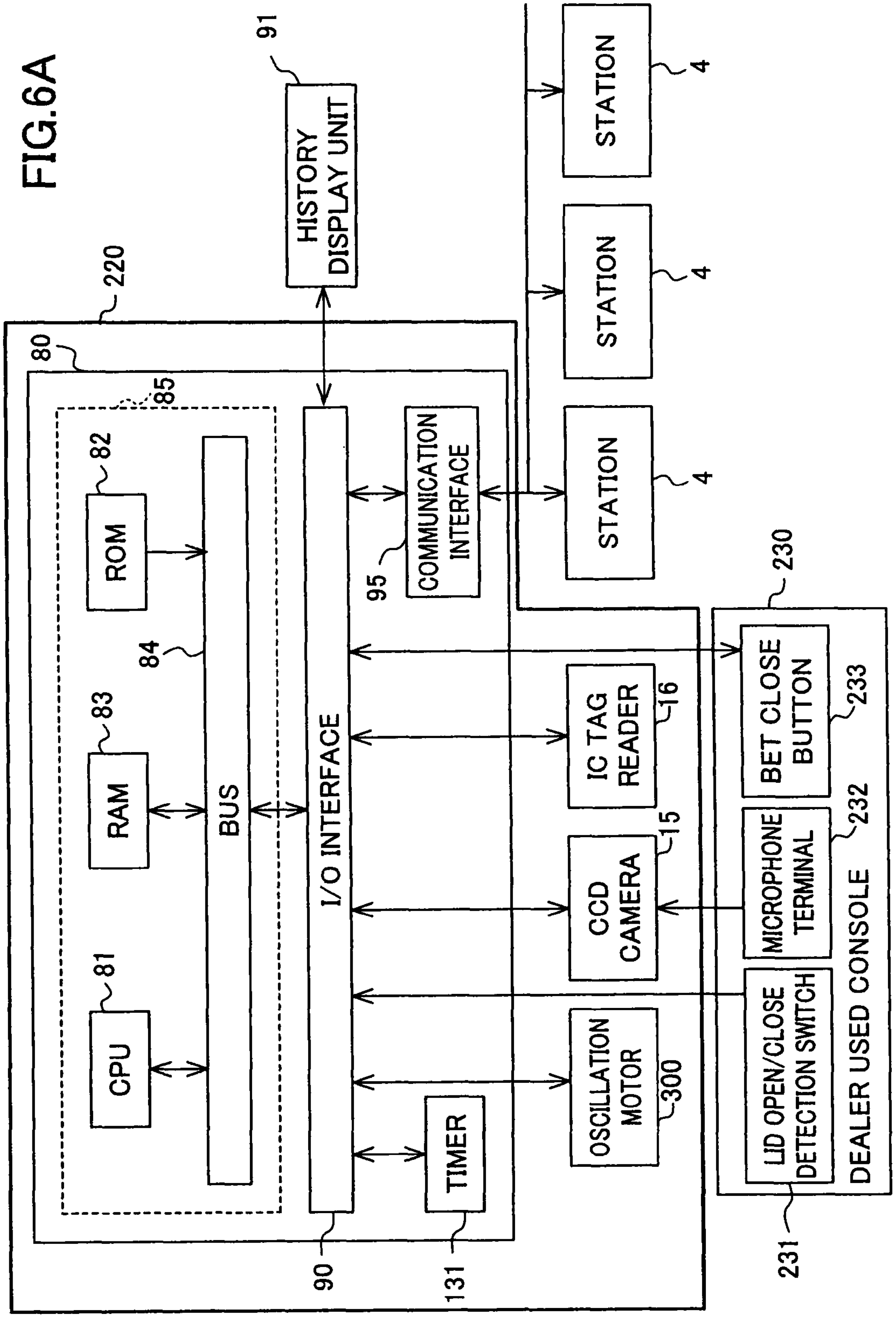
FIG. 6A is a block diagram showing an internal configuration of a composite unit and a dealer used console.

FIG. 6A is a block diagram showing an internal configuration of a composite unit and a dealer used console. A main control unit 80 of the composite unit 220 includes a microcomputer 85, which is configured with a CPU 81, ROM 82, RAM 83, and a bus 84 that transfers data therebetween.

The CPU 81 is connected with an oscillating motor 300 via an I/O interface 90. Furthermore, the CPU 81 is connected with the CCD camera 15 via an I/O interface 90. Furthermore, the CPU 81 is connected with a timer 131, which can measure time via the I/O interface 90. The CPU 81 is also connected to the lid open/close detection switch 231 and the bet close button 233 via the I/O interface 90. The CPU 81 is also connected with the microphone 232 via the I/O interface 90 and the CCD camera 15. Furthermore, the I/O interface 90 is connected with the IC tag reader 16, thereby transmitting and receiving information in relation to the number of dots of the three dice 70, which comes to rest on the playing board 3*a*, between the IC tag reader 16.

Here, the main control unit 80, the oscillating motor 300, the CCD camera 15, and the IC tag reader 16 are provided within a single composite unit 220. Furthermore, the lid open/close detection switch 231, the microphone terminal 232, and the bet close button 233 are provided within the dealer used console 230.

In addition, via a communication interface 95 connected to the I/O interface 90, the main control unit 80 transmits and receives data such as bet information, payout information, and the like to and from each station 4.

Furthermore, the I/O interface 90 is connected with a history display unit 91, and the main control unit 80 transmits and receives information in relation to the number of dots on the die, to and from the history display unit 90.

ROM 82 in the main control unit 80 is configured to store a program for implementing basic functions of the composite unit 220; more specifically, a program for controlling various devices which drive the playing unit 3, a program for controlling each station 4, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 4, information on respective number of dots that appear on the dice 70 transmitted from the IC tag reader 16, data relating to the results of processing executed by CPU 81, and the like.

A jackpot storage area is provided in the RAM 83. In the jackpot storage area, the data indicating the number of playing media stored cumulatively is stored so as to correspond to each number of dots of matching dice. The data is provided to the station 4 at a predetermined timing, and a jackpot image is displayed.

The CPU 81 controls the oscillating motor 300, which oscillates the playing unit 3, based on data and a program stored in the ROM 82 and the RAM 83, and oscillates the playing board 3*a* of the playing unit 3. Furthermore, after oscillation of the playing board 3*a* ceases, a control processing associated with game progression, such as confirmation processing for confirming the number of dots on each of the dice 70 resting on the playing board 3*a*.

In addition to the control processing described above, the CPU 81 has a function of executing a game by transmitting and receiving data to and from each station 4 so as to control each station 4. More specifically, the CPU 81 accepts bet information transmitted from each station 4. Furthermore, the CPU 81 performs win determination processing based on the number of dots on the dice 70 and the bet information transmitted from each station 4, and calculates the amount of an award paid out in each station 4 with reference to the payout table stored in the ROM 82.

Figure 7A:
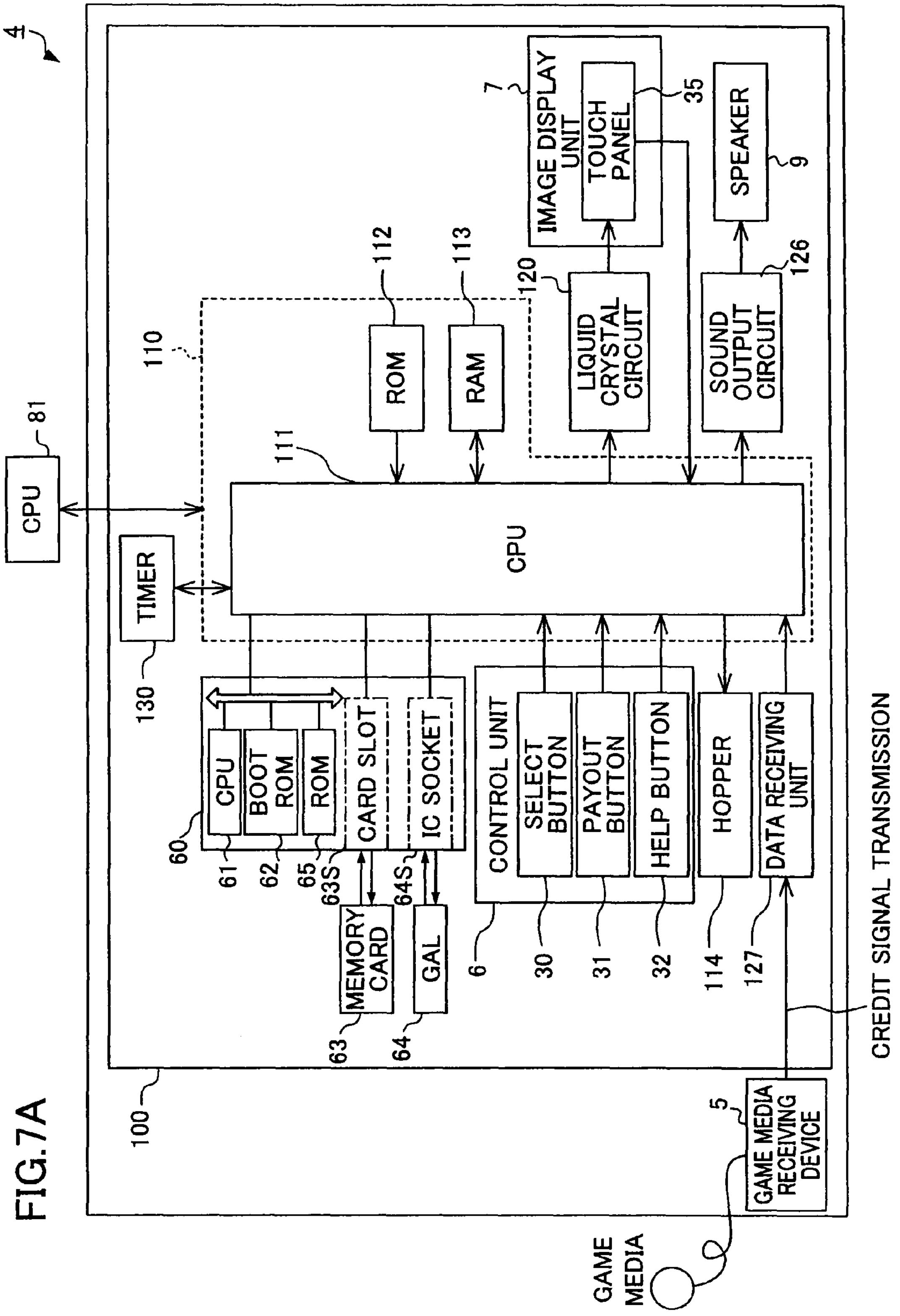
FIG. 7A is a block diagram showing an internal configuration of a station shown in FIG. 2A.

FIG. 7A is a block diagram showing an internal configuration of a station shown in FIG. 2A.

The station 4 includes a main body 100 in which an image display unit 7 and the like are provided, and a game media receiving device 5, which is attached to the main body 100. The main body 100 further includes a station control unit 110 and several peripheral devices.

The station control unit 110 includes a CPU 111, ROM 112, and RAM 113.

ROM 112 stores a program for implementing basic functions of the station 4, other various programs needed to control the station 4, a data table, and the like.

Moreover, a decision button 30, a payout button 31, and a help button 32 provided in the control unit 6 are connected to the CPU 111, respectively. The CPU 111 controls the execution of various corresponding operations in accordance with manipulation signals, which are generated in response to each button pressed by a player. More specifically, the CPU 111 executes various processing, based on input signals transmitted from the control unit 6 in response to a player's operation which has been inputted, and the data and programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the station 4. The CPU 111 performs various kinds of processing based upon the input signals supplied from the control unit 6 and the touch panel 35, and the data and the programs stored in the ROM 112 and the RAM 113. Then, the CPU 111 controls the peripheral devices which configure the station 4 based on the results of the processing. It should be noted that the mode whereby processing is performed is set for each processing depending on the content of the processing. For example, the former approach is applied to payout processing of game media for respective numbers of dots appearing on the dice, and the latter approach is applied to bet operation processing by a player.

Furthermore, a hopper 114, which is connected to the CPU 111, pays out a predetermined amount of game media through the payout opening upon receiving the instruction signals from the CPU 111.

Moreover, the image display unit 7 is connected to the CPU 111 via a liquid crystal driving circuit 120. The liquid crystal driving circuit 120 includes program ROM, image ROM, an image control CPU, work RAM, a video display processor (VDP), video RAM, and the like. Here, the program ROM stores an image control program with respect to the display functions of the image display unit 7, and various kinds of selection tables. The image ROM stores dot data for creating an image to be displayed on the image display device 7, for example. In addition, the image control CPU determines an image to be displayed on the image display unit 7, selected from the dot data previously stored in the image ROM according to the image control program previously stored in the program ROM based on parameters specified by the CPU 111. The work RAM is configured as a temporary storage means when executing the image control program by the image control CPU. The VDP forms an image corresponding to the display contents determined by the image control CPU and outputs the resulting image on the image display unit 7. It should be noted that the video RAM is configured as a temporary storage device used by the VDP for creating an image.

Moreover, a sound output circuit 126 and a speaker 9 are connected to the CPU 111. The speaker 9 emits various sound effects for performing various kinds of rendered effects, based on output signals from the sound output circuit 126. In addition, the game media receiving device 5, into which game media such as coins or medals are inserted, is connected to the CPU 111 via a data receiving unit 127. The data receiving unit 127 receives credit signals transmitted from the game media receiving device 5, and the CPU 111 increases a player's credit amount stored in the RAM 113 based on the credit signals transmitted.

A timer 131, which can measure time, is connected to the CPU 111.

A gaming board 60 includes a CPU (Central Processing Unit) 61, ROM 65 and boot ROM 62, a card slot 63S compatible with a memory card 63, and an IC socket 64S compatible with a GAL (Generic Array Logic) 64, which are connected to one another via an internal bus.

The memory card 63 comprises nonvolatile memory such as compact flash (trademark) or the like, which stores a game program and a game system program.

Furthermore, the card slot 63S has a configuration that allows the memory card 63 to be detachably inserted, and is connected to the CPU 111 via an IDE bus. Such an arrangement allows the kinds or content of the game provided by the station 4 to be changed by performing the following operation. More specifically, the memory card 63 is first extracted from the card slot 63S, and another game program and another game system program are written to the memory card 63. Then, the memory card 63 thus rewritten is inserted into the card slot 63S. In addition, the kinds or content of the games provided by the station 4 can be changed by replacing the memory card 63 storing a game program and a game system program with another memory card 63 storing another game program and game system program. The game program includes a program for advancing a game and the like. The game program also includes a program related to image data and sound data outputted during a game.

The GAL 64 is one type of PLD that has a fixed OR array structure. The GAL 64 includes multiple input ports and output ports and, upon receiving predetermined data via each input port, outputs output data that corresponds to the input data via the corresponding output port. In addition, an IC socket 64S has a structure that allows the GAL 64 to be detachably mounted, and is connected to the CPU 111 via the PCI bus.

The CPU 61, the ROM 65, and the boot ROM 62, which are connected to one another via the internal bus, are connected to the CPU 111 via the PCI bus. The PCI bus performs signal transmission between the CPU 111 and the gaming board 60, as well as supplying electric power from the CPU 111 to the gaming board 60. The ROM 65 stores country identification information and an authentication program. The boot ROM 62 stores a preliminary authentication program, a program (boot code) which instructs the CPU 61 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e. the procedure for authenticating the game program and the game system program. The preliminary authentication program is a program for authenticating the aforementioned authentication program. The preliminary authentication program is defined to follow the procedure for verifying that the authentication program has not been forged, i.e. the procedure for authenticating the authentication program (authentication procedure).

Subsequently, with reference to FIGS. 8A to 12A, processing performed in the main control unit of the composite unit according to the present embodiment is described.

Figure 8A:
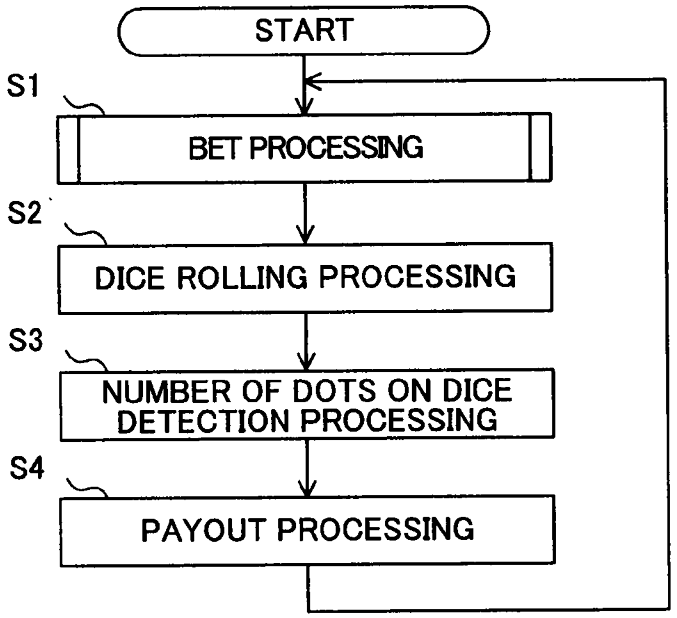
FIG. 8A is a flowchart showing dice game execution processing.

FIG. 8A is a flowchart showing dice game execution processing. Initially, in Step S1, the CPU 81 executes bet processing, which is described later in FIG. 9A, and in Step S2, the CPU 81 executes dice rolling processing. In Step S3, the CPU 81 executes number of dots on dice detection processing, in Step 4, executes payout processing corresponding to the number of dots, and then returns the processing to Step 1.

FIG. 9A is a flowchart showing bet processing.

In Step S11, the CPU 81 determines whether or not the semiautomatic flag is in the ON state. More specifically, the CPU 81 determines whether the semiautomatic flag stored in a predetermined area of the RAM 83 is in the ON state. In a case of a YES determination, the CPU 81 advances the processing to Step S12. On the other hand, in a NO determination, the CPU 81 advances the processing to Step S14.

Here, a timing at which the semiautomatic flag becomes ON or OFF is described.

The CPU 81 updates the semiautomatic flag so as to become ON at a timing at which the CPU 81 receives a signal indicating that the state in which the lid 235 is opened was detected, and updates the semiautomatic flag so as to become OFF at a timing at which the CPU 81 receives a signal indicating that the state in which the lid 235 is closed was detected.

In Step S12, the CPU 81 turns on a live coverage flag. The live coverage flag is stored in a predetermined area of the RAM 83. When the live coverage flag is turned on, as described in FIG. 12A, live coverage sounds of a dealer as well as live images can be broadcasted at each of the stations 4.

Figure 10A:
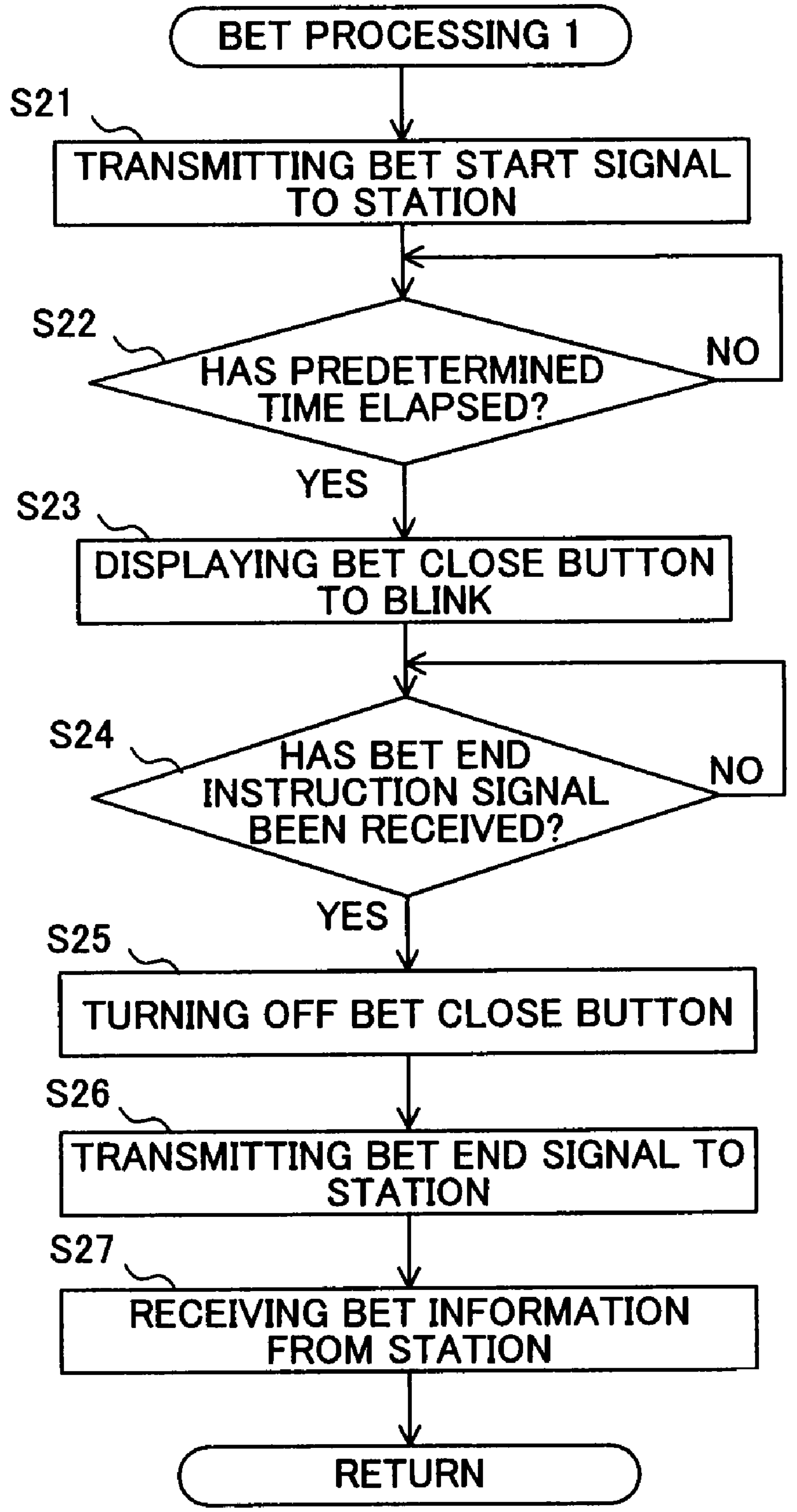
FIG. 10A is a flowchart of bet processing 1.

In Step S13, the CPU 81 performs bet processing 1 (processing in a case of advancing a game in the semiautomatic mode) illustrated in FIG. 10A, and then ends the bet processing.

In Step S14, the CPU 81 turns on the live coverage flag. The live coverage flag is stored in a predetermined area of the RAM 83. As illustrated in FIG. 12A later, not the live coverage sounds of the dealer, but sounds based on audio data stored in the ROM 82 in advance as well as live images are broadcasted at each of the stations 4.

Figure 11A:
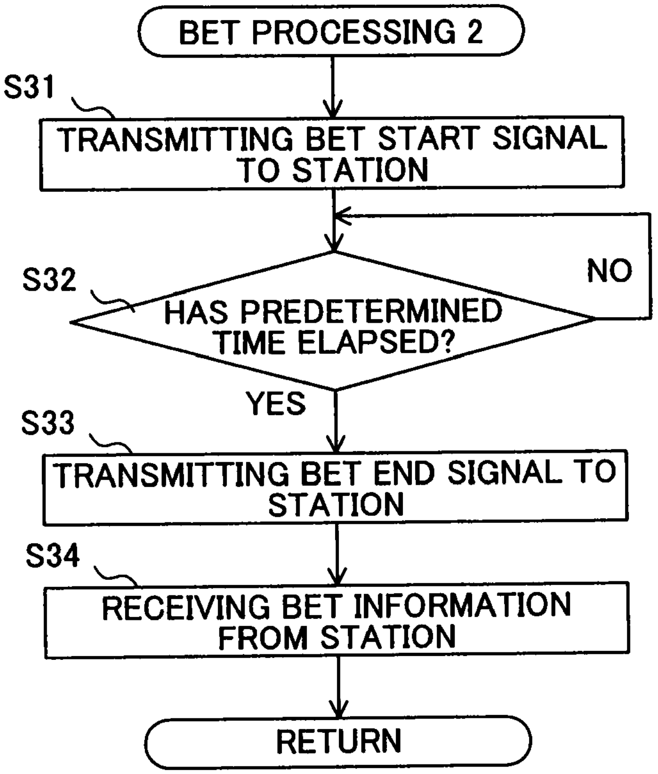
FIG. 11A is a flowchart of bet processing 2.

In Step S15, the CPU 81 performs bet processing 2 (processing in a case of advancing a game in the automatic mode) illustrated in FIG. 11A, and then ends the bet processing.

According to the bet processing shown in FIG. 9A, a timing of switching between game advancement in the automatic and semiautomatic modes can be set after starting a subsequent unit game. Therefore, even if the lid 235 is opened while the unit game is being executed, switching to the semiautomatic mode while the unit game is being executed can be prevented.

FIG. 10A is a flowchart showing bet processing 1. This bet processing 1 is processing for a case in which advancement of a game is in the semiautomatic mode.

In Step S21, the CPU 81 transmits the bet start signal to each of the stations 4. When the bet start signal is received, bet placement can be performed at each station 4.

In Step S22, the CPU 81 determines whether or not a predetermined time has elapsed. More specifically, the CPU 81 starts to measure a predetermined lapse of time t by the timer 131, compares the predetermined lapse of time t with a predetermined time T1 (for example, 5 seconds) stored in the ROM 82, and determines whether the predetermined lapse of time t measured by the timer 131 has reached the predetermined time Ti. In the case of a NO determination, the CPU 81 returns the processing to Step S22, and in the case of a YES determination, the CPU 81 advances the processing to Step S23.

In Step S23, the CPU 81 displays the bet close button to be blinking. More specifically, the CPU 81 transmits a signal for causing the dealer to push the bet close button 233 to the bet close button 233 and controls to blink the LED included in the bet close button 233.

According to the processing of Step S23, the dealer can be informed of game advancement being performed in semiautomatic mode, and moreover, the dealer can be instructed so as to push the bet close button 233.

In Step S24, the CPU 81 determines whether the bet end instruction signal has been received from the bet close button 233. In the case of a NO determination, the CPU 81 returns the processing to Step S24, and in the case of a YES determination, the CPU 81 advances the processing to Step S25.

In Step S25, the CPU 81 turns off the bet close button. More specifically, the CPU 81 transmits a signal for instructing the dealer not to push the bet close button 233 to the bet close button 233, and performs control so as to turn off the LED included in the bet close button 233.

In Step S26, the CPU 81 transmits the bet end signal to each station 4. When the bet end signal is received, bet placement cannot be accepted at each station 4, and then the CPU 111 inside the station control unit 110 displays an image (not shown) which reports on the image display unit 7 that an accepting of bet placement has been terminated.

In Step S27, the CPU 81 receives bet information from each station 4. The bet information relates to a bet input performed at each station 4. In addition, the bet information includes information indicating whether bet placement has been performed or not which is included in the bet existence determination table (not shown). Upon terminating the processing of Step S27, the CPU 81 terminates the bet processing 1.

With the bet processing 1 of the present embodiment, even an inexperienced dealer can perform an end operation for bet acceptance according to light emitting state of the LED included in the bet close button 233.

FIG. 11A is a flowchart showing bet processing 2. This bet processing 2 is processing for a case in which advancement of a game is in the automatic mode.

In Step S31, the CPU 81 transmits the bet start signal to each of the stations 4. When the bet start signal is received, bet placement can be performed at each station 4.

In Step S32, the CPU 81 determines whether or not a predetermined time has elapsed. More specifically, the CPU 81 starts to measure a predetermined lapse of time t by the timer 131, compares the predetermined lapse of time t with a predetermined time T2 (for example, 25 seconds) stored in the ROM 82, and determines whether the predetermined lapse of time t measured by the timer 131 has reached the predetermined time T2. In the case of a NO determination, the CPU 81 returns the processing to Step S32, and in the case of a YES determination, the CPU 81 advances the processing to Step S33.

In Step S33, the CPU 81 transmits the bet end signal to each station 4. When the bet end signal is received, bet placement cannot be accepted at each station 4, and then the CPU 111 inside the station control unit 110 displays an image (not shown) which reports on the image display unit 7that an accepting of bet placement has been terminated.

In Step S34, the CPU 81 receives bet information from each station 4. The bet information relates to a bet input performed at each station 4. In addition, the bet information includes information indicating whether bet placement has been performed or not which is included in the bet existence determination table (not shown). Upon terminating the processing of Step S34, the CPU 81 terminates the bet processing 2.

FIG. 12A is a flowchart showing live coverage processing. This processing is started after termination of the processing in Step S19 of FIG. 9A (processing of turning on the live coverage flag) or the processing in Step S14 of FIG. 9A (processing of turning off the live coverage flag), and is continuously performed until the processing of Step S4 in FIG. 8A ends.

In Step S41, the CPU 81 determines whether the live coverage flag is ON. In a case of a YES determination, the CPU 81 advances the processing to Step S42. On the other hand, in a case of a NO determination, the CPU 81 advances the processing to Step S43.

In Step S42, the CPU 81 transmits audio data of sounds spoken by the dealer and live image data to each of the stations 4. More specifically, the CPU 81 transmits the audio data thus received and the live image data to each of the stations 4 in response to having received the audio data of sounds spoken by the dealer speaks as well as the data of live images of the playing board 3*a* including the dice 70. Upon ending the processing of Step S42, the CPU 81 ends the live coverage processing.

Based on the processing of Step S42, since a live coverage of the dealer is broadcasted only in a case in which game advancement is in the semiautomatic mode, the player can feel an actual sensation that the dealer is involved in the advancement of the game.

In Step S23, the CPU 81 transmits the audio data stored in advance and live image data to each station 4. More specifically, the CPU 81 transmits the audio data stored in the ROM 82 in advance and the live image data to each of the stations 4 in response to having received the data of live images of the playing board 3*a* including the dice 70. Upon ending the processing in Step S43, the CPU 81 ends the live coverage processing.

Based on the processing of Step S43, in a case of the game advancement in automatic mode, the audio data stored in advance as well as the live images can be seen at the stations 4. Therefore, a realistic sensation of the game can be enjoyed even in a case in which the game (for example, rolling of the dice) cannot be visually recognized, depending on the arrangement of the stations.

Figure 13A:
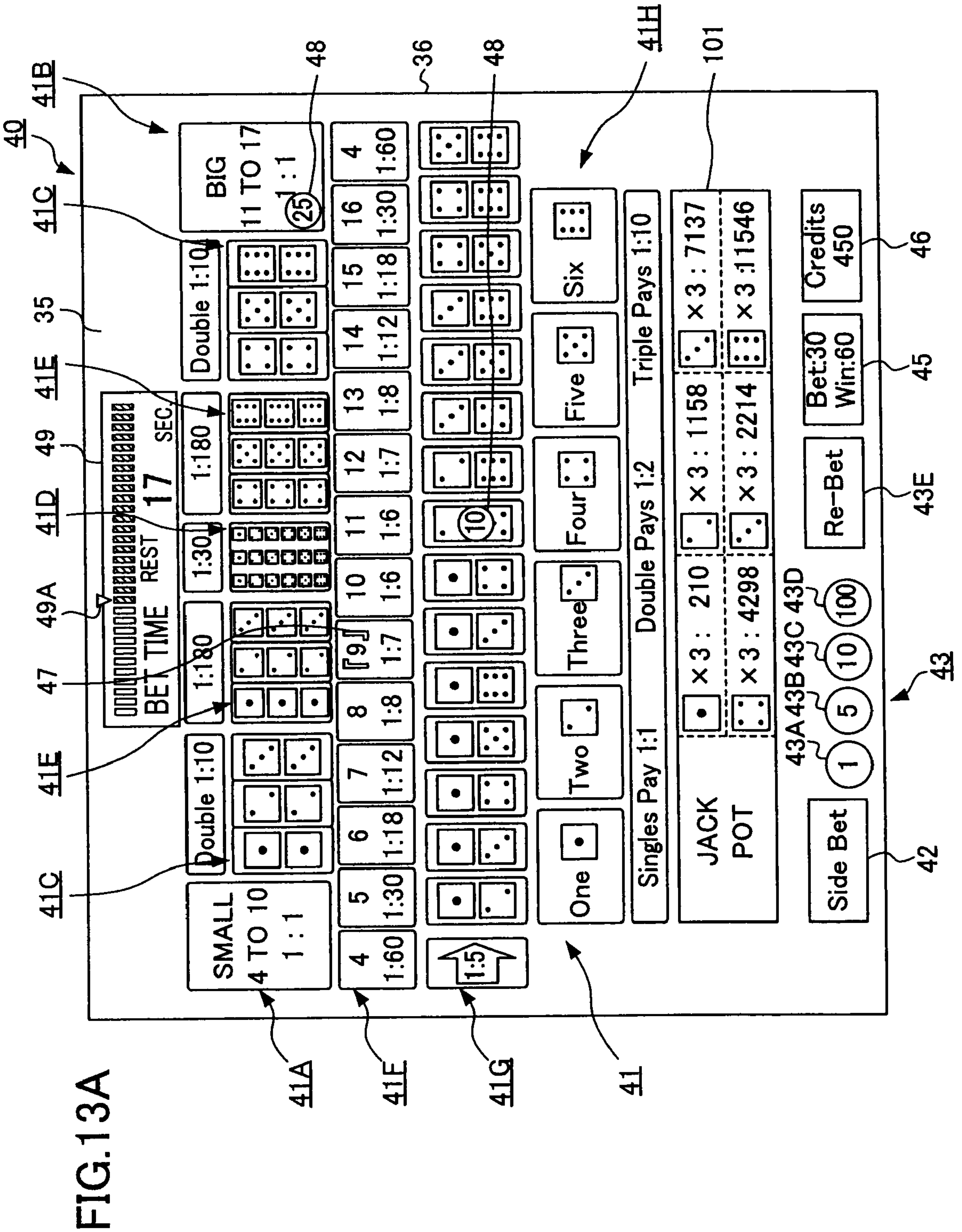
FIG. 13A is a diagram showing an example of a display screen displayed on an image display device.

FIG. 13A shows an example of a display screen displayed on an image display unit. As shown in FIG. 13A, an image display unit 7 is a touch-panel type of liquid crystal display, on the front surface of which a touch panel 35 is attached, allowing a player to perform selection such as of icons displayed on a liquid crystal screen 36 by contacting the touch panel 35, e.g., with a finger.

A table-type betting board (a bet screen) 40 for predicting the number of dots of the dice 70 is displayed in a game at a predetermined timing on the image display unit 7.

A detailed description is now provided regarding the bet screen 40. On the bet screen 40 are displayed a plurality of normal bet areas 41 and a side bet area 42. The plurality of normal bet areas 41 includes a normal bet area 41A, a normal bet area 41B, a normal bet area 41C, a normal bet area 41D, a normal bet area 41E, a normal bet area 41F, a normal bet area 41G, and a normal bet area 41H. By contacting the touch panel 35, e.g., with a finger, the normal bet area 41 is designated, and by displaying chips in the normal bet area 41 thus designated, a normal bet operation is performed. Furthermore, by contacting the touch panel 35, e.g., with a finger, the side bet area 42 is designated, and by displaying chips in the side bet area 42 thus designated, a side bet operation is performed.

A unit bet button 43, a re-bet button 43E, a payout result display unit 45, and a credit amount display unit 46 are displayed at the right side of the side bet area 42 in order from the left side.

The unit bet button unit 43 is a group of buttons that are used by a player to bet chips on the normal bet area 41 and the side bet area 42 designated by the player. The unit bet button unit 43 is configured with four types of buttons including a 1 bet button 43A, a 5 bet button 43B, a 10 bet button 43C, and a 100 bet button 43D. It should be noted that in the case of an incorrect bet operation, the player can start a bet operation again by touching a re-bet button 43E.

Firstly, the player designates the normal bet area 41 or the side bet area 42 using a cursor 47 by way of contacting the touch panel 35, e.g., with a finger. At this time, contacting the 1 bet button 43A, e.g., with a finger, allows for betting one chip at a time (number of chips to be bet increases one by one in the order of 1, 2, 3, every time the 1bet button 43A is contacted, e.g., by a finger). Similarly, when contacting the 5 bet button 43B, e.g., with a finger, five chips at a time can be bet (number of chips to be bet increases five by five in the order of 5, 10, 15, every time the 5 bet button 43B is contacted, e.g., by a finger). Similarly, when contacting the 10 bet button 43C, e.g., with a finger, ten chips at a time can be bet (number of chips to be bet increases ten by ten in the order of 10, 20, 30, every time the 10 bet button 43C is contacted, e.g., by a finger). Similarly, when contacting the 100 bet button 43D, e.g., with a finger, a hundred chips at a time can be bet (number of chips to be bet increases hundred by hundred in the order of 100, 200, 300,. . . every time the 100 bet button 43D is contacted, e.g. by a finger). The number of chips bet up to the current time is displayed as a chip mark 48, and the number displayed on the chip mark 48 indicates the number of bet chips.

The number of bet chips and payout credit amount for a player in a previous game are displayed in the payout result display unit 45. The number calculated by subtracting the number of bet chips from the payout credit amount is a newly acquired credit amount for the player in the previous game.

The credit amount display unit 46 displays the credit amount which the player possesses. The credit amount decreases according to the number of bet chips (1 credit amount for 1 chip) when the player bets chips. If the bet chips are entitled to an award and credits are paid out, the credit amount increases in accordance with the number of paid out chips. It should be noted that the game is over when the player's credit amount becomes zero.

The normal bet area 41 in the bet screen 40 is described next. The normal bet areas 41A and 41B are portions where the player places a bet on a predicted sum of dots appearing on the dice 70A to 70C. In other words, the player selects the normal bet area 41A if the predicted sum falls in a range of 4 to 10, or the normal bet area 41B if the predicted sum falls in a range of 11 to 17. Odds are set to 1:1 (2 chips are paid out for 1 chip bet).

The normal bet area 41C is a portion where the player places a bet, predicting that two dice 70 have the same number of dots. In other words, the player wins an award if one of the combinations occurs, such as (1, 1), (2, 2), (3, 3), (4, 4), (5, 5), and (6, 6), and the odds are set to 1:10.

The normal bet area 41D is a portion where the player places a bet, predicting that all three dice have the same number of dots. In other words, the player wins an award if one of the combinations occurs, such as (1, 1, 1), (2, 2, 2), (3, 3, 3), (4, 4, 4), (5, 5, 5), and (6, 6, 6), and the odds are set to 1:30.

The bet area 41E is a portion where the player places a bet on a predicted number of dots appearing commonly on all three dice. In other words, the player places a bet on one of the combinations of (1, 1, 1), (2, 2, 2), (3, 3, 3), (4, 4, 4), (5, 5, 5), or (6, 6, 6), and the odds are set to 1:180.

The normal bet area 41F is where the player places a bet, predicting a total, a summation of dots appearing on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 41G is a portion where the player places a bet on predicted dots appearing on the two dice selected from the three, and the odds are set to 1:5.

The normal bet area 41H is a region where the player places a bet on the number of dots appearing on the dice 70, and the odds are set according to the number of dots of the dice 70 matching the predicted number of dots.

The bet time display area 49 in the bet screen 40 is described next. This bet time display area 49 displays a remaining time for betting. A position of the indicator 49A represents a rough indication of a remaining time and indicates that the remaining time decreases as the position of the indicator 49A moves to the right. This drawing shows that the remaining time of the bet time is 17 seconds.

Figure 14A:
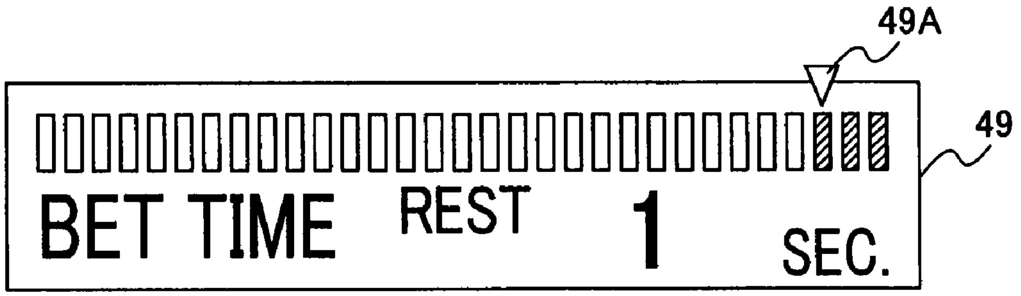

FIG. 14A is a diagram illustrating a display example of a bet time display area.

According to FIG. 14A, the indicator 49A specifies the third frame from the right, which indicates that the remaining time is 1 second.

FIG. 15A is a diagram illustrating a display example of a bet time display area.

FIG. 15A shows that a bet time has been extended while the indicator 49A still specifies the third frame from the right. In this drawing, an image including "EXTENDED" is displayed at a position for displaying a remaining time.

Here, the requirement for extending a bet time is that the bet close button 233 has not been pushed, even when the remaining time of the bet time becomes zero in a case in which advancement of a game was in the semiautomatic mode.

More specifically, the CPU 81 extends the bet time when the remaining time of the bet time becomes zero and in a case in which the bet end instruction signal has not been received from the bet close button 233.

FIG. 16A is a diagram illustrating a display example of a bet time display area.

According to FIG. 16A, the indicator 49A specifies the first frame from the right, which indicates that the bet time has been ended. In this drawing, an image including "IN PLAY" is displayed at a position for displaying a remaining time in the bet time display area 49.

The requirement for displaying the image of FIG. 16A is that the bet close button 233 was pushed 5 seconds after the bet time was started when advancement of a game was in the semiautomatic mode.

More specifically, 5 seconds after the bet time was started (including a case in which the bet time was extended), when the CPU 81 receives the bet end instruction signal from the bet close button 233, the bet time is terminated and the image "IN PLAY" is displayed at a position for displaying a remaining time in the bet time display area 49.

Figure 17A:
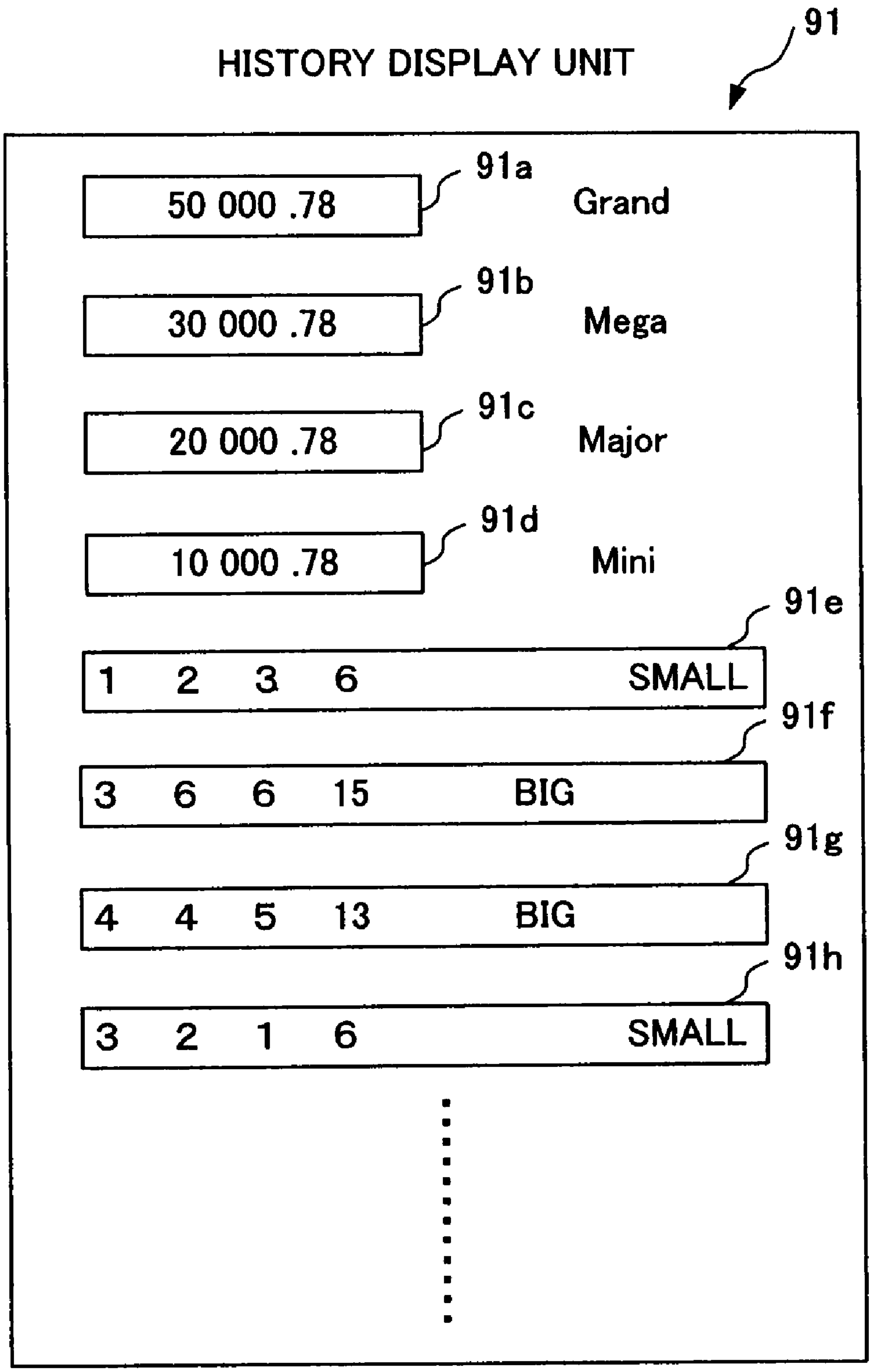
FIG. 17A is a diagram showing a display example of a display screen of a history display unit.

FIG. 17A is a diagram showing an example of an image displayed on a display screen of a history display unit.

On the display screen of the history display unit 91, display areas 91*a*, 91*b*, 91*c*, and 91*d* are set for displaying cumulative amounts of four types of progressive awards. Display areas 91*e*, 91*f*, 91*g*, and 91*h* displays game histories, and in the display area 91*e*, information such as a number of dots in the last game before a present game is displayed.

"1", "2", "3", "6", and "Small" are displayed in the order from left as a displayed content in the display area 91*e*. The leftmost "1" represents a number of dots on a blue die by being displayed in blue. The second "2" from the left represents a number of dots on a red die by being displayed in red. The third "3" from the left represents a number of dots on a white die by being displayed in white. The fourth "6" from the left represents a sum total value of each of the dice (blue, red, and white). The display areas 91*f* to 91*h* are similar to the display areas 91*e*. In addition, "Small" is displayed, for example, in a case in which a sum total value of numbers of dots on the dice belongs to a numeral range of 4 to 10 among tow numeral ranges 4 to 10 and 11 and 17. "Big" is displayed in a case in which a sum total value of numbers of dots on the dice belongs to a numeral range of 11 to 17.

It should be noted that a plurality of light emitting devices (LED) (not shown) is disposed around the history display unit 91 and these LEDs emit light in various light emitting modes according to game advancements.

Descriptions regarding the present embodiment have been provided above. In the present invention, although it is described that, when Step S25 in FIG. 10A is ended or in a case of a YES determination in Step S32 in FIG. 11A, the CPU 81 transmits the bet end signal to each of the stations 4, the present invention is not limited thereto.

For example, it may be configured so that the CPU 81 slightly delays the timing of transmitting the bet end signal to each of the stations 4 (for example, by 0.2 second). Thus, in a case in which the player pushes the select button 30 before the end of the bet time, a case in which a bet cannot be accepted due to the delay of the timing of pushing can be prevented.

In addition, this allows a player who wants to anticipate selecting a bet before the end of the bet time to be satisfied.

In the present embodiment, although it is configured that the bet close button 233 includes the LED as an instructional device, the present invention is not limited thereto. For example, it may be configured that the dealer used console 233 includes the LED at a position other than the bet close button 233 and instructs a dealer to operate the bet close button 233 by blinking or illuminating the LED.

Furthermore, it is not limited that the LED is provided with the dealer used console 230. The LED may be provided with the composite unit 220 and the like as long as it is disposed at a position that the dealer can visually recognize.

In addition, an instruction may be performed using sounds for instructing the dealer to operate the bet close button 233. In this case, the sounds for instructing may be generated from a speaker (not shown) included in the composite unit 220, the dealer used console 230, and the like.

In the present embodiment, although the controller of the present invention is described for a case of being configured from a CPU 81 which the main controller 80 includes and a CPU 111 which the station 4 includes, the controller of the present invention may be configured by only a single CPU.

Although embodiments of the present invention are described above, they are merely exemplified specific examples, and the present invention is not particularly limited thereto. Specific configurations such as each means can be modified appropriately. Moreover, it should be understood that the advantages described in association with the embodiments are merely a listing of most preferred advantages, and that the advantages of the present invention are by no means restricted to those described in connection with the embodiments.

What is claimed is:

1. A gaming system comprising:
- a plurality of stations;
- a composite unit that transmits and receives, with the plurality of stations, information relating to a game, and performs advancement of the game; and
- an operation unit in which a dealer can input a game operation,
- wherein the composite unit includes a controller that controls the advancement of the game;
- wherein the operation unit is detachable from the composite unit, and includes:
- a lid;
- a switch that detects whether the lid is opened; and
- an input device that accepts a game operation input from the dealer and transmits a signal corresponding to the game operation input thus accepted to the controller, and
- wherein, when the operation unit is mounted to the composite unit, (a) if the switch has detected that the lid is open, the controller: (i) receives a first signal from the switch indicating that the switch has detected that the lid is opened, and (ii) advances the game based on the game operation input signal received from the input device, and
- (b) if the switch has detected that the lid is closed, the controller: (i) receives a second signal from the switch indicating that the switch has detected that the lid is closed, and (ii) advances the game independent from the game operation input from the dealer.

2. The gaming system according to claim 1, wherein if the controller has received the first signal from the switch while a first unit game of the game is being executed, the controller advances the game based on the game operation input signal received from the input device when a second unit game subsequent to the first unit game of the game is started.

3. The gaming system according to claim 2,
- wherein the controller further comprises an instructional device that indicates the game operation input to the dealer, and
- wherein, in a case a game being advanced based on the game operation input signal received from the input device, the controller transmits to the instructional device a signal for indicating the game operation input to the dealer.

4. The gaming system according to claim 1, wherein:

the composite unit further comprises an image output device that outputs live image data of the game;

the operation unit further comprises a microphone terminal that accepts audio data that has been converted to data from sounds spoken by the dealer, and transmits the audio data thus accepted to the image output device;

the image output device outputs the live image data as well as the audio data received from the microphone terminal; and the controller transmits the audio data and the live image data thus received, or the live image data thus received, to the plurality of stations.

5. The gaming system according to claim 4, wherein, in a case of a game being advanced based on the game operation input signal received from the input device, the controller transmits the audio data and the live image data thus received to the plurality of the stations, and in a case of a game being advanced independently from a game operation input from the dealer, the controller transmits the live image data received to the plurality of stations.

* * * * *